US008814279B2

(12) United States Patent
Sekiya et al.

(10) Patent No.: US 8,814,279 B2
(45) Date of Patent: Aug. 26, 2014

(54) BRAKE SYSTEM

(75) Inventors: Yoshihide Sekiya, Chiryu (JP); Yutaka Ohnuma, Miyoshi (JP); Siro Monzaki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 139 days.

(21) Appl. No.: 13/501,865

(22) PCT Filed: Oct. 14, 2009

(86) PCT No.: PCT/JP2009/067797
§ 371 (c)(1), (2), (4) Date: Apr. 13, 2012

(87) PCT Pub. No.: WO2011/045854
PCT Pub. Date: Apr. 21, 2011

(65) Prior Publication Data

US 2012/0200058 A1 Aug. 9, 2012

(51) Int. Cl.
*B60T 8/17* (2006.01)
*B60T 8/1766* (2006.01)

(52) U.S. Cl.
USPC ...................... 303/9.61; 188/106 P; 188/354

(58) Field of Classification Search
CPC ........ B60T 17/04; B62D 61/02; B62D 61/12; B62D 61/00; B62D 63/068
USPC ........... 188/106 P, 106 R, 345, 354, 361, 369, 188/370; 303/9.61; 180/21, 253; 244/111
See application file for complete search history.

(56) References Cited

U.S. PATENT DOCUMENTS 1,898,836 A * 2/1933 Hughes ........................ 303/9.61
2,076,722 A * 4/1937 Heinze ........................... 180/21

(Continued)

FOREIGN PATENT DOCUMENTS

JP 49 85715 8/1974
JP 63 41286 2/1988

(Continued)

OTHER PUBLICATIONS

International Preliminary Report on Patentability Issued Jan. 30, 2012 in PCT/JP09/67797 Filed Oct. 14, 2009 (with English translation).

(Continued)

*Primary Examiner* — Thomas J Williams
(74) *Attorney, Agent, or Firm* — Oblon, Spivak, McClelland, Maier & Neustadt, L.L.P.

(57) ABSTRACT

A vehicle brake system includes: brakes provided for respective right-side wheel, left-side wheel, front wheel and rear wheel of a vehicle, and configured to restrain rotations of the respective wheels by activations of brake actuators of the brakes; and at least two energy sources independent from each other and configured to supply energy to the brake actuators. A first brake line includes (a) a first energy source as one of the at least two energy sources and (b) one of the brake actuators provided for the front wheel and activatable by the energy supplied from the first energy source. A second brake line includes (c) a second energy source as one of the at least two energy sources and (d) three of the brake actuators provided for the respective right-side, left-side and rear wheels and activatable by the energy supplied from the second energy source.

9 Claims, 19 Drawing Sheets

(56) References Cited

U.S. PATENT DOCUMENTS

| | | | | |
|---|---|---|---|---|
| 2,111,983 | A * | 3/1938 | Massey | 180/21 |
| 2,152,074 | A * | 3/1939 | McInnerney | 188/345 |
| 3,828,876 | A * | 8/1974 | Morelli | 180/21 |
| 3,876,225 | A * | 4/1975 | Alt et al. | 188/345 |
| 4,505,519 | A * | 3/1985 | Muterel | 303/9.61 |
| 4,775,021 | A | 10/1988 | Marino | |
| 6,607,253 | B1 | 8/2003 | Yamamoto et al. | |
| 7,823,673 | B2 * | 11/2010 | Asogawa | 180/21 |
| 2007/0151777 | A1 | 7/2007 | Peng | |
| 2007/0228824 | A1 | 10/2007 | Yasukawa et al. | |
| 2012/0109484 | A1 * | 5/2012 | Onoda et al. | 701/72 |

FOREIGN PATENT DOCUMENTS

| | | |
|---|---|---|
| JP | 3 125687 | 12/1991 |
| JP | 07 009968 | 1/1995 |
| JP | 11 034629 | 2/1999 |
| JP | 2001 63553 | 3/2001 |
| JP | 2001 191903 | 7/2001 |
| JP | 2002 120715 | 4/2002 |
| JP | 2003 112617 | 4/2003 |
| JP | 2006 130985 | 5/2006 |
| JP | 2007 182203 | 7/2007 |
| JP | 2007 278311 | 10/2007 |
| WO | 2011 052077 | 5/2011 |

OTHER PUBLICATIONS

International Search Report issued on Jan. 19, 2010 in PCT/JP09/067797 filed on Oct. 14, 2009.

* cited by examiner

FIRST BRAKE LINE $F_{B1} = (f_1+f_3) \cdot \mu$

SECOND BRAKE LINE $F_{B2} = f_2 \cdot \mu$ $F_{B1} = F_{B2}$

BRAKE SYSTEM

TECHNICAL FIELD

The present invention relates to a brake system including a plurality of brakes each provided for restraining rotation of a wheel.

BACKGROUND ART

Each of Patent Documents 1-3 discloses a brake system installed in a vehicle having four wheels, i.e., a front right wheel, a front rear wheel, a rear right wheel and a rear left wheel.

In the brake system disclosed in each of Patent Documents 1 and 2, each of the front right wheel, front left wheel, rear right wheel and rear left wheel is provided with a hydraulic brake as a friction brake.

The brake system disclosed in Patent Document 1 employs a so-called "X pipe arrangement" and has a first hydraulic line including brake cylinders of the hydraulic brakes provided for the front right wheel and the rear left wheel and a second hydraulic line including brake cylinders of the hydraulic brakes provided for the front right wheel and the rear left wheel. In this brake system, in the event of failure of one of the first and second hydraulic lines, a rate of increase of hydraulic pressure in the brake cylinders included in the other of the first and second hydraulic lines is restrained thereby making it possible to restrain a yaw moment acting on the vehicle as a result of the failure of the one of the first and second hydraulic lines.

In the brake system disclosed in the Patent Document 2, when the vehicle is braked during turning of the vehicle, the hydraulic pressure in the brake cylinder of the hydraulic brake provided for each of outside ones of the wheels, which are given a higher road holding load, is increased. Where a P valve (proportioning valve) is provided for each of the hydraulic brakes for the rear right and left wheels, an outside one of the rear right and left wheels is given an increased road holding load when the vehicle is braked during turning of the vehicle, so that the hydraulic pressure in the brake cylinder provided for the outside wheel is made higher than the hydraulic pressure in the brake cylinder provided for the inside wheel. An actuator is activated in response to the pressure difference, for increasing the hydraulic pressure in the brake cylinder of the hydraulic brake provided for an outside one of the front right and left wheels (i.e., one of the front right and left wheels which is located on the same side as the above-described outside one of the rear right and left wheels). Thus, the hydraulic pressure in the brake cylinder provided for each of the front and rear outside wheels, which is given a higher road holding load, is increased whereby a braking force acting on an entirety of the vehicle can be increased.

In the vehicle provided with the brake system disclosed in the Patent Document 3, suspension cylinders are provided for the respective four wheels, i.e., front right, front left, rear right and rear left wheels, such that each of the suspension cylinders is disposed between a body of the vehicle and a corresponding one of wheel-side members holding the respective wheels. In this brake system, upon an emergency brake activation for avoiding a collision, a vertical acceleration of the vehicle is controlled by controlling the hydraulic pressure in each of the suspension cylinders, whereby the road holding load is increased. Thus, a maximum braking force can be increased.

Patent Document 4 discloses an arrangement of a vehicle having one front wheel and two rear wheels (i.e., rear right and left wheels) in which hydraulic brakes are provided for the respective wheels, and discloses also an arrangement of a vehicle having one front wheel, one rear wheel, and right and left wheels located between the front and rear wheels. When a brake pedal is depressed by a vehicle operator, the hydraulic brakes provided for the respective wheels are activated whereby rotations of the wheels are retrained.

PRIOR ART DOCUMENTS

Patent Documents

[Patent Document 1] JP-2002-120715A
[Patent Document 2] JP-H07-9968A
[Patent Document 3] JP-H11-34629A
[Patent Document 4] JP-2006-130985A

DISCLOSURE OF THE INVENTION

Object to be Achieved by the Invention

An object of the present invention is to obtain a brake device suitable for a vehicle having a right-side wheel, a left-side wheel and a central wheel located on a front or rear side of the right-side and left-side wheels.

Measures for Achieving the Object and Effect

A brake system of the present application is to be provided in a vehicle including at least (i) a right-side wheel and a left-side wheel disposed to be spaced apart from each other in a width direction of the vehicle and (ii) at least one central wheel disposed to be spaced apart from the right-side and left-side wheels in a longitudinal direction of the vehicle and located between the right-side and left-side wheels in the width direction, and includes at least two brake lines independent from each other. The brake system includes (x) brakes provided for the right-side wheel, the left-side wheel and at least one of the at least one central wheel, and configured to restrain rotations of the respective wheels by activations of brake actuators of the brakes, and (y) at least two energy sources independent from each other and configured to supply energy to the brake actuators.

A first brake line as one of the at least two brake lines includes (a) a first energy source as one of the at least two energy sources and (b) at least one of the brake actuators provided for at least one of the at least one central wheel and activatable by the energy supplied from the first energy source. A second brake line as one of the at least two brake lines, which is other than the first brake line, includes (c) a second energy source as another one of the at least two energy sources and (d) two of the brake actuators provided for the respective right-side and left-side wheels and activatable by the energy supplied from the second energy source.

The brake system of the present application is provided with a plurality of brake lines that are independent from each other. Therefore, even in event of failure of either one of the plurality of brake lines, a braking force can be applied to the vehicle by activation of another one of the plurality of brake lines as long as this another one of the brake lines functions normally.

In this case, since the first brake line includes at least one of the brake actuators provided for the at least one central wheel while the second brake line includes two of the brake actuators provided for the respective right-side wheel and left-side wheel, a yaw moment does not act on the vehicle either when only the second brake line is activated in even of failure of the first brake line or when only the first brake line is activated in event of failure of the second brake line.

Claimable Invention

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A brake system that is to be provided in a vehicle including at least (i) a right-side wheel and a left-side wheel disposed to be spaced apart from each other in a width direction of the vehicle and (ii) at least one central wheel disposed to be spaced apart from the right-side and left-side wheels in a longitudinal direction of the vehicle and located between the right-side and left-side wheels in the width direction, the brake system including at least two brake lines independent from each other, the brake system being characterized by including:

brakes provided for the right-side wheel, the left-side wheel and at least one of the at least one central wheel, and configured to restrain rotations of the respective wheels by activations of brake actuators of the brakes; and at least two energy sources independent from each other and configured to supply energy to the brake actuators;

wherein one of the at least two brake lines serves as a first brake line, and includes (a) a first energy source as one of the at least two energy sources and (b) at least one of the brake actuators provided for at least one of the at least one central wheel and activatable by the energy supplied from the first energy source, and wherein one of the at least two brake lines serves as a second brake line that is other than the first brake line, and includes (c) a second energy source as one of the at least two energy sources and (d) two of the brake actuators provided for the respective right-side and left-side wheels and activatable by the energy supplied from the second energy source.

In the brake system described in this mode, each of the brakes provided for the respective wheels is a friction brake. The friction brake may be either a hydraulic brake or an electric brake, as described below. There is also a case in which both of the hydraulic brake and the electric brake are included in the brake system. For example, the brake system may be arranged such that one of the plurality of brake lines includes a brake actuator of the hydraulic brake while another one of the plurality of brake lines includes a brake actuator of the electric brake. Further, the brake may be either a drum brake or a disk brake.

Further, the brake system according to this mode, which is provided with at least two brake lines independent from each other, may be provided with at least three brake lines independent from one another. The term "independent from each other or one another" is interpreted to mean a state in which, even when one of the plurality of brake lines fails (i.e., placed in a state in which the brake line cannot output a braking force or a state in which a braking force outputtable from the brake line is extremely small), a braking force can be outputted by activation of another one of the brake lines.

Further, the vehicle in which the brake system according to this mode is provided may be (x) a vehicle having the right-side and left-side wheels and a central wheel that is located on a front side of the right-side and left-side wheels, (y) a vehicle having the right-side and left-side wheels and a central wheel that is located on a rear side of the right-side and left-side wheels, or (z) a vehicle having the right-side and left-side wheels, a central wheel that is located on a front side of the right-side and left-side wheels, and another central wheel that is located on a rear side of the right-side and left-side wheels. Further, in case of the vehicle of (z), the brake may be provided in both of the front central wheel and the rear central wheel or either one of the front central wheel and the rear central wheel.

It is noted that the first and second energy sources may be provided by either respective sources individual from each other or a common source.

(2) The brake system according to mode (1), wherein the brake actuators include respective brake cylinders, wherein the brakes include respective hydraulic brakes each of which is configured to restrain rotation of a corresponding one of the wheels by a corresponding one of the brake cylinders that is to be activated, by a hydraulic pressure, to press a friction member against a rotatable body rotatable together with the corresponding wheel, and wherein the energy sources include respective hydraulic pressure sources each of which is configured to generate the hydraulic pressure as the energy and to supply the generated hydraulic pressure to a corresponding one of the brake cylinder.

The hydraulic pressure source may be provided by (a) a manually-operated hydraulic pressure source configured to generate a hydraulic pressure by operation of a brake operating member by a vehicle operator, (b) a power-operated hydraulic pressure source configured to generate a hydraulic pressure by a power supplied thereto or (c) a hydraulic pressure source including both of the manually-operated hydraulic pressure source and power-operated hydraulic pressure source. Where the brake system includes a master cylinder, it is possible to interpret that the master cylinder corresponds to a manually-operated hydraulic pressure source or that a pressurizing chamber of the master cylinder correspond to a manually-operated hydraulic pressure source. There is a case in which the brake system includes both of a manually-operated hydraulic pressure source and a power-operated hydraulic pressure source.

(3) The brake system according to mode (1) or (2), wherein the brake actuators include respective electric motors, wherein the brakes include respective electric brakes each of which is configured to restrain rotation of a corresponding one of the wheels, by a corresponding one of the electric motors that is to be activated to press a friction member against a rotatable body rotatable together with the corresponding wheel, and wherein the energy sources include respective electric power sources each of which is configured to supply an electric power as the energy to a corresponding one of the electric motors.

Each of the electric power sources may be provided by (a) a storage device configured to store an electric power therein, (b) a generating device configured to generate an electric power or (c) a power source including both of the storage device and the generating device. In case of (c), the generating device may be common to the plurality of electric power sources.

In the brake system described in this mode depending from mode (2), there is a case in which both of the hydraulic brake and the electric brake are included.

(4) The brake system according to mode (3), comprising electric-motor control devices provided for the respective electric motors, each of the electric-motor control devices being configured to control an electric current supplied to a corresponding one of the electric motors, wherein one of the electric power sources serves as a first electric power source, and is configured to supply the electric power to one of the electric-motor control devices that is provided for one of the electric motors that is included in the first brake line, and wherein one of the electric power sources serves as a second electric power source, and is configured to supply the electric power to one of the electric-motor control devices that is provided for one of the electric motors that is included in the second brake line.

In the brake system described in this mode, even in the event of abnormality of one of the plurality of electric power sources, it is possible to cause the brake line including another one of the electric power sources, to be activated by this another one of the electric power sources. That is, in this brake system, there are provided at least two lines each serving as an electric-power supply line.

The electric-motor control device may include a drive circuit and an electric-current controlling portion that is constituted mainly by a computer, so that an electric current supplied to the electric motor is controlled with the drive circuit being controlled by the electric-current controlling portion.

(5) The brake system according to mode (3) or (4), comprising at least two system control devices constituted mainly by respective computers and independent from each other, wherein one of the electric power sources serves as a first electric power source, and is configured to supply the electric power to one of the at least two system control devices that serves as a first system control device, wherein the one of the electric motors that is included in the first brake line is controlled based on command supplied by the first system control device, wherein one of the electric power sources serves as a second electric power source, and is configured to supply the electric power to one of the at least two system control devices that serves as a second system control device, and wherein the one of the electric motors that is included in the second brake line is controlled based on command supplied by the second system control device.

In each of the system control devices, a control command value is prepared, and the electric motor is controlled based on the prepared control command value. The control command value may be a target pressing force that is to be generated in the electric brake.

In the brake system described in this mode in which the plurality of system control devices independent from each other is provided, even in the event of abnormality of one of the system control devices, it is possible to cause the electric brake of the brake line including another one of the system control devices, to be controlled by this another one of the system control devices that normally functions. That is, in this brake system, there are provided at least two lines each serving a control line.

(6) The brake system according to mode (5), comprising:

(a) a brake operating member operable by an operator of the vehicle; and (b) at least two operating-state detecting devices configured to detect an identical operating state of the brake operating member, wherein one of the at least two operating-state detecting devices serves as a first operating-state detecting device, and is connected to the first system control device, and wherein one of the at least two operating-state detecting devices serves as a second operating-state detecting device, and is connected to the second system control device.

In the brake system described in this mode, the at least two operating-state detecting devices may be configured to detect an identical operating state of the brake operating member (such as a stroke distance of the brake operating member or an operating force applied to the brake operating member), through respective different abnormality-detecting bodies (e.g., piezoelectric element, strain gauge), such that values representing the identical operating state and detected by the respective detecting bodies are supplied to the respective system control devices. The term "at least two operating-state detecting devices" may be interpreted to mean that the quantity of the abnormality-detecting body is at least two, and that the quantity of a main body does not necessarily have to be at least two but may be only one.

It is noted that each of at least one of a signal wire connecting the operating-state detecting devices and the system control devices, a power supply cable connecting the energy sources and the electric motors and a signal wire connecting the system control devices and the motor control devices may be constituted by double lines. For example, the electric power may be supplied to both of the electric motors included in the first and second brake lines, from the first electric power source and also the second electric power source. In this arrangement, even in the event of abnormality of the first electric power source, both of the first and second brakes line can be activated by the second electric power source. This arrangement also corresponds to an arrangement in which two brake lines independent from each other are provided.

(7) The brake system according to any one of modes (1)-(6), wherein one of the first brake line and the second brake line includes (a) a hydraulic pressure source serving as the energy source and configured to generate a hydraulic pressure as the energy and to supply the hydraulic pressure and (b) a brake cylinder serving as the brake actuator and being to be activated by the hydraulic pressure supplied from the hydraulic pressure source, and wherein the other of the first brake line and the second brake line includes (c) an electric power source serving as the energy source and configured to supply an electric power as the energy and (d) an electric motor serving as the brake actuator and being to be activated by the electric power supplied from the electric power source.

(8) The brake system according to any one of modes (1)-(7), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, wherein the brakes are provided for the right-side wheel, the left-side wheel, the front wheel and the rear wheel, wherein the first brake line includes one of the brake actuators that is provided for the front wheel, while the second brake line includes the two of the brake actuators that are provided for the respective right-side and left-side wheels, and wherein one of the at least two brake lines serves as a third brake line that is other than the first brake line and the second brake line, and includes one of the brake actuators that is provided for the rear wheel.

The brake system described in this mode is provided with the three brake lines.

(9) The brake system according to any one of modes (1)-(8), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, each of the wheels being located in a position defined by a position defining point that corresponds to an intersection point between a rotary axis of the wheel and a plane passing through a center of the wheel in a width direction of the wheel, the position defining point of the front wheel and the position defining point of the rear wheel lying on a perpendicular line which intersects a center of a lateral line segment interconnecting the position defining point of the right-side wheel and the position defining point of the left-side wheel and which is perpendicular to the lateral line segment extending in a lateral direction of the vehicle, as seen in a plan view of the vehicle.

As shown in FIG. 1 (*a*)-(*e*), theoretically, the vehicle runs straight in parallel with a straight line passing through the position defining point $Q_F$ of the front wheel and the position defining point $Q_R$ of the rear wheel. A longitudinal line La as a line segment interconnecting the position defining point $Q_F$ of the front wheel and the position defining point $Q_R$ of the rear wheel, is orthogonal to a lateral line Lb as a line segment interconnecting a position defining point $Q_{MR}$ of the right-side wheel and a position defining point $Q_{ML}$ of the left-side wheel, and intersects with a center Qbo of the lateral line Lb as seen in a plan view of the vehicle.

In each of the vehicles shown in FIG. 1 (*a*)-(*c*), the four wheels are arranged such that the position defining points $Q_F$, $Q_R$, $Q_{ML}$, $Q_{MR}$ of the respective four wheels correspond to respective corners of a diamond shape as seen in the plan view of the vehicle, so as to cooperate with one another to define the diamond shape. Therefore, a front-wheel side distance $L_F$ between the lateral line Lb and the rotary axis of the front wheel is equal to a rear-wheel side distance $L_R$ between the lateral line Lb and the rotary axis of the rear wheel ($L_F=L_R$). In this arrangement, the longitudinal line La and the lateral line Lb may be equal to each other in length, (so that the position defining points $Q_F$, $Q_R$, $Q_{ML}$, $Q_{MR}$ cooperate with one another to define a rectangular shape as seen in the plan view) as shown in FIG. 1 (*a*), or the longitudinal line La may be larger or smaller in length than the lateral line Lb, as shown in FIG. 1 (*b*) or FIG. 1 (*c*). Further, the four wheels may be arranged such that the position defining points $Q_F$, $Q_R$, $Q_{ML}$, $Q_{MR}$ of the respective four wheels correspond to respective corners of a quadrate shape consisting of combination of two isosceles triangles, as seen in the plan view. For example, the front-wheel side distance $L_F$ may be larger than the rear-wheel side distance $L_R$, as shown in FIG. 1 (*d*), or the rear-wheel side distance $L_R$ may be larger than the front-wheel side distance $L_F$, as shown in FIG. 1 (*e*).

(10) The brake system according to mode (9), to be provided in the vehicle in which a distance between the lateral line segment and the position defining point of the front wheel and a distance between the lateral line segment and the position defining point of the rear wheel are substantially equal to each other, as seen in the plan view of the vehicle.

The brake system described in this mode is to be provided in the vehicle that corresponds to, for example, each of the vehicles shown in FIG. 1 (*a*), (*b*), (*c*) in which the longitudinal line La and the lateral line Tb intersect at their respective centers with each other at a right angle, as seen in the plan view.

In the vehicle in which the front-wheel side distance $L_F$ and the rear-wheel side distance $L_R$ are equal to each other, a sum of road holding forces given to the respective right-side and left-side wheels and a sum of road holding forces given to the respective front and rear wheels can be equal to each other. However, even where the front-wheel side distance $L_F$ and the rear-wheel side distance $L_R$ are not precisely equal to each other (namely, are slightly different from each other), it is possible to regard that the sum of the road holding forces given to the respective right-side and left-side wheels and the sum of the road holding forces given to the respective front and rear wheels are substantially equal to each other, as long as the difference therebetween is within a certain range. In other words, it is possible to regard that the front-wheel side distance $L_F$ and the rear-wheel side distance $L_R$ are substantially equal to each other as long as the difference between the sum of the road holding forces of the respective right-side and left-side wheels and the sum of the road holding forces of the respective front and rear wheels is within a range that makes it possible to regard that the sum of the road holding forces of the respective right-side and left-side wheels and the sum of the road holding forces of the respective front and rear wheels are substantially equal to each other.

Where a value of $|L_F-L_R|/(L_F+L_R)$ is, for example, not larger than 0.05, 0.07, 0.1, 0.15, 0.2 or 0.25, it is possible to regard that the sum of the road holding forces of the respective right-side and left-side wheels and the sum of the road holding forces of the respective front and rear wheels are substantially equal to each other.

(11) The brake system according to mode (9) or (10), to be provided in the vehicle in which the position defining points of the respective front, rear, right-side and left-side wheels correspond to respective corners of a diamond shape as seen in the plan view of the vehicle, so as to cooperate with one another to define the diamond shape.

(12) The brake system according to mode (9), to be provided in the vehicle in which a distance between the lateral line segment and the position defining point of the front wheel and a distance between the lateral line segment and the position defining point of the rear wheel are different from each other, as seen in the plan view of the vehicle.

The brake system described in this mode is to be provided in the vehicle that corresponds to, for example, each of the vehicles shown in FIG. 1 (*d*), (*e*).

(13) The brake system according to any one of modes (1)-(8), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, each of the wheels being located in a position defined by a position defining point that corresponds to a center point of a contact surface of the wheel that is in contact with a road surface, the position defining point of the front wheel and the position defining point of the rear wheel lying on a perpendicular line which intersects a center of a lateral line segment interconnecting the position defining point of the right-side wheel and the position defining point of the left-side wheel and which is perpendicular to the lateral line segment extending in a lateral direction of the vehicle, as seen in a plan view of the vehicle.

Where it is regarded that a load is concentrated to a certain point, the above-described center point of the contact surface of the wheel corresponds to such a certain point. It is noted that the features described in modes (10)-(12) can be employed in the brake system described in this mode.

(14) The brake system according to any one of modes (1)-(13), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, wherein the brakes are provided for the right-side wheel, the left-side wheel, the front wheel and the rear wheel, wherein the first brake line includes one of the brake actuators which is provided for the front wheel and which is activatable by the energy supplied from the first energy source, and wherein the first brake line further includes one of the brake actuators which is provided for the rear wheel and which is activatable by the energy supplied from the first energy source.

It is preferable that the brake system described in this mode is applied to the vehicle in which a sum ($f_1+f_3$) of the road holding force (that may be referred also to as "load applied to the wheel" or "road holding load") $f_1$ of the front wheel and the road holding force $f_3$ of the rear wheel and a sum $f_2(f_{2L}+f_{2R})$ of the road holding force $f_{2L}$ of the left-side wheel and the road holding force $f_{2R}$ of the right-side wheel are substantially equal to each other $\{(f_1+f_3)=f_2\}$. In each of the vehicles shown in FIG. 1 (*a*), (*b*), (*c*), the sum ($f_1+f_3$) of the road holding force $f_1$ of the front wheel and the road holding force $f_3$ of the rear wheel and the sum $f_2$ of the road holding force $f_{2L}$ of the left-side wheel and the road holding force $f_{2R}$ of the right-side wheel can be made substantially equal to each other, for example, by making spring constants of respective suspension springs provided for the respective wheels equal to one another, as long as any one of the wheels is not separated from a road surface and any one of the suspension springs is not bottomed.

Further, in each of the vehicles shown in FIG. 1 (*d*), (*e*), the above-described sum ($f_1+f_3$) and the above-described sum $f_2$ can be made equal to each other by suitably making the spring constants of the respective suspension springs provided for the respective wheels different from one another.

A maximum braking force $F_B$ which is outputtable by activation of the brake, i.e., a magnitude of the braking force at a point of time at which the wheel is placed in its locking state (or immediately before the wheel is placed in its locking state), corresponds to a product ($f \cdot \mu$) obtained by multiplying the road holding force f of the wheel by a friction coefficient $\mu$ between a road surface and a tire of the wheel ($F_B=f \cdot \mu$). Therefore, when the sum ($f_1+f_3$) of the road holding forces of the front and rear wheels and the sum $f_2$ of the road holding forces of the right-side and left-side wheels are equal to each other ($f_1+f_3=f_2$), the maximum braking force which is outputtable in the first brake line and the maximum braking force which is outputtable in the second brake line can be equal to each other.

Meanwhile, conventional brake systems, each of which is to be provided in a vehicle having front right, front left, rear right and rear left wheels, are shown in FIG. 24. The brake system shown in FIG. 24 (*a*) has a first brake line including brake cylinders provided for the front right and left wheels and a second brake line including brake cylinders provided for the rear right and left wheels. The brake system shown in FIG. 24 (*b*) has first and second brake lines each including brake cylinders provided for respective wheels located in respective positions diagonal to each other. The brake system shown in FIG. 24 (*c*) has a first brake line including brake cylinders provided for the front right and left wheels and a second brake line including brake cylinders provided for the front right, front left, rear right and rear left wheels. The brake system shown in FIG. 24 (*d*) has a first brake line including brake cylinders provided for the front right, front left and rear left wheels and a second brake line including brake cylinders provided for the front right, front left and rear right wheels. The brake system shown in FIG. 24 (*e*) has first and second brake lines each of which includes brake cylinders provided for the front right, front left, rear right and rear left wheels.

In a conventional brake system, it is common that the brakes provided for the front and rear wheels are designed such that a ratio between the braking force applied to the front wheel and the braking force applied to rear wheel is 7:3, by taking account of the road holding forces given to the front and rear wheels. Therefore, in the brake system shown in FIG. 24 (*a*), in the event of failure of the first brake line, it is not possible to output a total braking force whose magnitude corresponds to more than 30% of a magnitude of that in case of normality of both of the first and second brake lines. Further, in each of the brake systems shown in FIG. 24 (*b*), (*d*), in the event of failure of one of the first and second brake lines, a yaw moment acts on the vehicle body. Further, in each of the brake systems shown in FIG. 24 (*c*), (*d*), (*e*), a required pipe or wire arrangement and a required caliper structure are complicated causing a problem such as increase in cost.

On the other hand, in the brake system described in this mode, even if either one of the first and second brake lines fails, an activation of the other of the first and second brake lines, i.e., an activation of the normally functioning brake line makes it possible to output a total braking force whose magnitude corresponds to 50% of a magnitude of that in case of normality of both of the first and second brake lines. Further, in this case, it is possible to satisfactorily avoid generation of a yaw moment. Moreover, since a required pipe or wire arrangement and constructions of the brakes can be simplified, it is possible to restrain increase in cost.

(15) The brake system according to any one of modes (1)-(13), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, wherein the brakes are provided for the right-side wheel, the left-side wheel and front wheel, and wherein the first brake line includes one of the brake actuators which is provided for the front wheel and which is activatable by the energy supplied from the first energy source.

It is preferable that the brake system described in this mode is applied to the vehicle in which, when the vehicle is being braked, the road holding force $f_1$ of the front wheel and the sum $f_2$ of the road holding force $f_{2L}$ of the left-side wheel and the road holding force $f_{2R}$ of the right-side wheel are substantially equal to each other ($f_1 \cong f_2$). In each of the vehicles shown in FIG. 1 (*a*), (*b*), (*c*), theoretically, the sum of the road holding forces of the front and rear wheels and the sum of the road holding forces of the right-side and left-side wheels are equal to each other ($f_1+f_3=f_2$). However, in each of the vehicles shown in FIG. 1 (*a*), (*b*), (*c*), for example, where a center of gravity lies on the lateral line Lb or on a front side of the lateral line Lb, or where a height of the center of gravity is high, the road holding force of the front wheel becomes extremely large while the road holding force of the rear wheel becomes extremely small ($f_1 >> f_3$), upon braking of the vehicle, so that there is a case in which the road holding force of the front wheel becomes substantially equal to the sum of the road holding forces of the right-side and left-side wheels ($f_1 \cong f_2$).

Further, in the brake system described in this mode, the brake is not required to be provided for the rear wheel. This is because there is little need for the provision of the brake for rear wheel, where the road holding force of the front wheel is so large upon braking of the vehicle that the sum of the braking forces applied to the front, right-side and left-side wheels is sufficiently large for decelerating the vehicle. Where the brake is not provided for the rear wheel, the cost can be reduced and the brake system can be made light in weight.

It is noted that the brake system according to this mode can be installed on a three-wheeled vehicle in which a rear wheel is not provided.

(16) The brake system according to any one of modes (1)-(13), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, wherein the brakes are provided for the right-side wheel, the left-side wheel, the front wheel and the rear wheel, wherein the first brake line includes one of the brake actuators which is provided for the front wheel and which is activatable by the energy supplied from the first energy source, and wherein the second brake line includes one of the brake actuators which is provided for the rear wheel and which is activatable by the energy supplied from the second energy source.

It is preferable that the brake system described in this mode is applied to the vehicle in which the road holding force $f_1$ of the front wheel and the sum ($f_2+f_3$) of the road holding forces of the right-side wheel, left-side wheel and rear wheel are substantially equal to each other ($f_1 \cong f_2+f_3$).

In the vehicle shown in FIG. 1 (*d*), where a center of gravity lies on the lateral line Lb or on a front side of the lateral line Lb, with the front-wheel side distance $L_F$ being larger than the rear-wheel side distance $L_R$ ($L_F > L_R$), the sum ($f_1+f_3$) of the road holding forces of the front and rear wheels becomes larger than the sum $f_2$ of the road holding forces of the right-side and left-side wheels ($f_2 < f_1+f_3$), upon braking of the vehicle. Further, upon braking of the vehicle, the road holding force of the front wheel is increased while the road holding force of the rear wheel is reduced ($f_1 >> f_3$), so that there is a case in which the road holding force $f_1$ of the front wheel is substantially equal to the sum ($f_2+f_3$) of the road holding forces of the right-side, left-side and rear wheels ($f_1 \cong f_2+f_3$). In this case, too, even if either one of the first and second brake lines fails, it is possible to output a total braking force whose magnitude corresponds to almost 50% of a magnitude of that in case of normality of both of the first and second brake lines, without causing a yaw moment to be generated.

It is noted that, in each of the vehicles shown in FIG. 1 (*e*), (*a*)-(*c*), too, the above-described sum ($f_1+f_3$) and the above-described sum $f_2$ can be made equal to each other by suitably making the spring constants of the respective suspension springs provided for the respective wheels different from one another.

(17) The brake system according to any one of modes (1)-(16), to be provided in the vehicle including front and rear wheels as the at least one central wheel in addition to the right-side wheel and the left-side wheel, the front wheel being located on a front side of the right-side and left-side wheels, the rear wheel being located on a rear side of the right-side and left-side wheels, the vehicle further including suspension springs provided for the right-side wheel, the left-side wheel, the front wheel and the rear wheel such that each of the suspension springs is disposed between a body of the vehicle and a corresponding one of wheel-side members holding the respective wheels, the suspension springs having respective spring constants that are equal to one another.

Since the vehicle body is a rigid body, a linear relationship is established among displacement amounts of the suspension springs provided for the respective wheels upon braking of the vehicle. Therefore, by making the spring constants of the suspension springs provided for the respective wheels equal to one another, for example, the sum of the road holding forces of the front and rear wheels and the sum of the road holding forces of the right-side and left-side wheels (that are located between the front and rear wheels) can be equal to each other.

However, the spring constants of the suspension springs provided for the respective wheels do not necessarily have to be equal to one another, but may be different from one another.

(18) The brake system according to any one of modes (1)-(17), to be provided in the vehicle including (a) front and rear wheels as the at least one central wheel in addition to the right-side wheel and the left-side wheel, the front wheel being located on a front side of the right-side and left-side wheels, the rear wheel being located on a rear side of the right-side and left-side wheels, the vehicle further including (b) a single-acting cylinder and a suspension spring provided for each of at least one of the right-side wheel, the left-side wheel, the front wheel and the rear wheel such that the single-acting cylinder and the suspension spring are disposed in series between a body of the vehicle and a corresponding one of wheel-side members holding the respective wheels.

Since the single-acting cylinder and the suspension spring are disposed in series, the road holding force f given to the wheel, an elastic force (k·x, where "k" represents a spring constant of the suspension spring, and "x" represents an amount of compression of the suspension spring from its free state) exerted by the suspension spring, and a force (P·A, where "P" represents a hydraulic pressure in a hydraulic chamber of the single-acting cylinder, and "A" represents a piston area of the single-acting cylinder that is to receive the hydraulic pressure) are equal to one another.

$$f = k \cdot x = P \cdot A$$

It is noted that the single-acting cylinder does not necessarily have to be provided for every one of the wheels, but may be provided for at least one of the wheels.

(19) The brake system according to any one of modes (1)-(18), comprising a road-holding-force share changing device configured, in event of failure of either one of the first and second brake lines, to reduce a sum of a road holding force or forces given to at least one of the wheels which corresponds to one of the first and second brake lines that fails, and to increase a sum of a road holding force or forces given to another at least one of the wheels which corresponds to the other of the first and second brake lines that does not fail.

Where the brake system is provided with two brake lines that are capable of outputting the braking forces whose maximum magnitudes are equal to each other, in event of failure of one of the two brake lines, an activation of the other of the first and second brake lines makes it possible to output a total braking force whose magnitude is larger than ½ of a magnitude of that in case of normality of both of the first and second brake lines, by increasing a sum of the road holding force or forces of at least one of the wheels which corresponds to the other of the two brake lines that does not fail (hereinafter referred to as "normally functioning brake line" where appropriate).

It is noted that the term "wheel corresponding to the brake line" may be interpreted to mean the wheel for which the brake included in the brake line is provided. It is also noted that the term "sum of the road holding force or forces" may be interpreted, where the quantity of the wheel included in the brake line is one, to mean a magnitude of the road holding force of the wheel.

The road-holding-force share changing device is configured to increase the sum of the road holding force or forces of at least one of the wheels corresponding to the normally functioning brake line and to reduce the sum of the road holding force or forces of at least one of the wheels corresponding to the brake line that fails, and may be provided by (a) a device including a road-holding-force increasing portion configured to increase the sum of the road holding force or forces of at least one of the wheels corresponding to the normally functioning brake line, (b) a device including a road-holding-force reducing portion configured to reduce the sum of the road holding force or forces of at least one of the wheels corresponding to the brake line that fails, or (c) a device including both of the road-holding-force increasing portion and the road-holding-force reducing portion.

Where a weight of the vehicle body is constant, the sum of the road holding forces given to the front, rear, right-side and left-side wheels is also constant, so that an increase of the road holding force or forces of a part of the four wheels leads to a reduction of the road holding force or forces of the other of the four wheels. Therefore, as long as the road-holding-force share changing device includes at least one of the road-holding-force increasing portion and the road-holding-force reducing portion, the road-holding-force share changing device is capable of consequently increasing the road holding force or forces of at least one of the wheels corresponding to the normally functioning brake line and reducing the road holding force or forces of at least one of the wheels corresponding to the brake line that fails.

It is noted that a subject to be controlled by each of at least one of the road-holding-force increasing portion and the road-holding-force reducing portion may be the hydraulic pressure in the single-acting cylinder, as described below, although it is not essential.

Further, each of the road-holding-force increasing portion and the road-holding-force reducing portion may be activated in a response to either an electric signal or a mechanical operation.

(20) The brake system according to mode (19), wherein the road-holding-force share changing device includes a failure detecting portion configured to detect the failure of any one of the at least two brake lines.

(i) When a difference between the outputs of the two brake lines upon activations of the brakes is not smaller than a predetermined first failure-judgment threshold value, it is possible to detect that one of the brake lines of the smaller output fails. The output of the brake corresponds to, for example, the braking force applied to the wheel and a pressing force of the friction member of the brake. For example, it is possible to obtain, as the braking force applied to the wheel, a force acting on the wheel in the longitudinal direction of the vehicle. Further, the braking force applied to the wheel can be obtained based on the hydraulic pressure in the brake cylinder and the hydraulic pressure in the fluid passage where the brake is the hydraulic brake, and can be obtained based on a pressing force generated by the electric motor and an electric current passing through the electric motor where the brake is the electric brake.

(ii) When the output of each of the brake lines upon activations of the brakes is smaller than a second failure-judgment threshold value that is determined, for example, based on a state of operation of a brake operating member, it is possible to detect that the brake line in question fails.

(iii) When the energy source of each of the brake lines suffers from an abnormality disabling supply of the energy, it is possible to detect that the brake line in question fails. Where the brake is the hydraulic brake, the failure of the brake line can be detected when the hydraulic pressure of the hydraulic pressure source becomes lower than a third failure-judgment threshold value, for example. Where the brake is the electric brake, the failure of the brake line can be detected when an electric voltage of the electric power source becomes a fourth failure-judgment threshold value.

(iv) Further, for example, when the electric motor becomes incapable of being activated, or when the system control device or the motor control device becomes uncontrollable, it is possible to regard that the brake line fails.

(21) The brake system according to mode (19) or (20), to be provided in the vehicle including at least one single-acting cylinder and at least one suspension spring provided for each of at least one of the right-side wheel, left-side wheel and at least one central wheel such that the single-acting cylinder and the suspension spring are disposed in series between a body of the vehicle and a corresponding one of wheel-side members holding the respective wheels, wherein the road-holding-force share changing device includes a hydraulic-pressure controlling portion configured, in event of failure of either one of the first and second brake lines, to control a hydraulic pressure in at least one of the at least one single-acting cylinder, so as to reduce a sum of the road holding force or forces given to at least one of the wheels whose rotation is to be restrained by one of the first and second brake lines that fails, and so as to increase a sum of the road holding force or forces given to another at least one of the wheels whose rotation is to be retrained by the other of the first and second brake lines that does not fail.

The subject to be controlled by the hydraulic-pressure controlling portion is the hydraulic pressure in the hydraulic chamber of the single-acting cylinder. As described above, since the single-acting cylinder and the suspension spring are disposed in series with each other, the elastic force of the suspension spring can be controlled by controlling the hydraulic pressure in the hydraulic chamber of the single-acting cylinder, whereby the road holding force of the wheel can be controlled. Further, by controlling a flow rate of a working fluid flowing into the hydraulic chamber of the single-acting cylinder, it is possible to control the displacement amount of the suspension spring and accordingly to control the road holding force of the wheel. In this sense, it is possible to interpret that the subject to be controlled by the hydraulic-pressure controlling portion is the flow rate of a working fluid flowing into the hydraulic chamber of the single-acting cylinder.

(22) The brake system according to any one of modes (19)-(21), wherein the brake actuators include respective brake cylinders, wherein the brakes include respective hydraulic brakes each of which is configured to restrain rotation of a corresponding one of the wheels, by a corresponding one of the brake cylinders that is to be activated, by a hydraulic pressure, to press a friction member against a rotatable body rotatable together with the corresponding wheel, and wherein the road-holding-force share changing device includes a cylinder device that is to be activated by a difference between the hydraulic pressure in the first brake line and the hydraulic pressure in the second brake line.

When one of the two brake lines functions normally while the other brake line fails, a hydraulic pressure difference is established between the two brake lines. Therefore, it is appropriate to utilize the hydraulic pressure difference.

(23) The brake system according to mode (21) or (22), wherein the brake actuators include respective brake cylinders, wherein the brakes include respective hydraulic brakes each of which is configured to restrain rotation of a corresponding one of the wheels, by a corresponding one of the brake cylinders that is to be activated, by a hydraulic pressure, to press a friction member against a rotatable body rotatable together with the corresponding wheel, wherein the at least one single-acting cylinder consists of a plurality of single-acting cylinders provided for at least one of the at least one central wheel whose rotation is to restrained by the first brake line and at least one of the right-side and left-side wheels whose rotations are to be restrained by the second brake line, and wherein the road-holding-force share changing device includes:

a differential mechanism including (a) two hydraulic chambers that are connected to the respective first and second brake lines and (b) a movable member that is movable by a difference between the hydraulic pressure in one of the two hydraulic chambers and the hydraulic pressure in the other of the two hydraulic chambers; and at least one of (c) a pressure-reducing mechanism configured to reduce, by activation of the differential mechanism, the hydraulic pressure in at least one of the at least one single-acting cylinder provided for at least one of the wheels whose rotation is to be restrained by one of the first and second brake lines that fails, and (d) a pressure-increasing mechanism configured to increase, by activation of the differential mechanism, the hydraulic pressure in another at least one of the at least one single-acting cylinder provided for another at least one of the wheels whose rotation is to be restrained by the other of the first and second brake lines that does not fail.

(24) The brake system according to mode (21) or (22), wherein the brake actuators include respective brake cylinders, wherein the brakes include respective hydraulic brakes each of which is configured to restrain rotation of a corresponding one of the wheels, by a corresponding one of the brake cylinders that is to be activated, by a hydraulic pressure, to press a friction member against a rotatable body rotatable together with the corresponding wheel, and wherein the road-holding-force share changing device includes a disconnecting/connecting mechanism configured to disconnect the at least one single-acting cylinder from the first and second brake lines when both of the first and second brake lines function normally, and configured to connect the at least one single-acting cylinder with the first and second brake lines when either one of the first and second brake lines fails.

When the brake line functions normally, it is preferable that the brake line and the single-acting cylinder are independent from each other. Further, when the brake line fails, it is preferable that the hydraulic pressure in the single-acting cylinder is controlled by utilizing the hydraulic pressure difference. To these ends, it is appropriate that the disconnecting/connecting mechanism is provided.

The disconnecting/connecting mechanism may include at least one valve, and each of the at least one valve may be either an electromagnetic valve that is to be selectively opened and closed depending on an electric signal or a mechanical valve that is to be selectively opened and closed by a hydraulic pressure or the like.

(25) A brake system that is to be provided in a vehicle including a front right wheel, a front left wheel, a rear right wheel and a rear left wheel, the brake system including at least two brake lines independent from each other, the brake system being characterized by including a road-holding-force share changing device configured, in event of failure of either one of the first and second brake lines, to increase a road holding force or forces given to at least one of the wheels whose rotation is to be restrained by one of the first and second brake lines that does not fail, and to reduce the road holding force or forces given to another at least one of the wheels whose rotation is to be restrained by one of the first and second brake lines that fails.

The features recited in the above-described modes (1)-(24) may be applied to the brake system described in this mode.

MODES FOR CARRYING OUT THE INVENTION

There will be described brake systems as modes for carrying out the present invention, with reference to drawings.

Hereinafter, the brake systems constructed according to a plurality of embodiments will be described.

Embodiment 1

<Vehicle>

Figure 2:
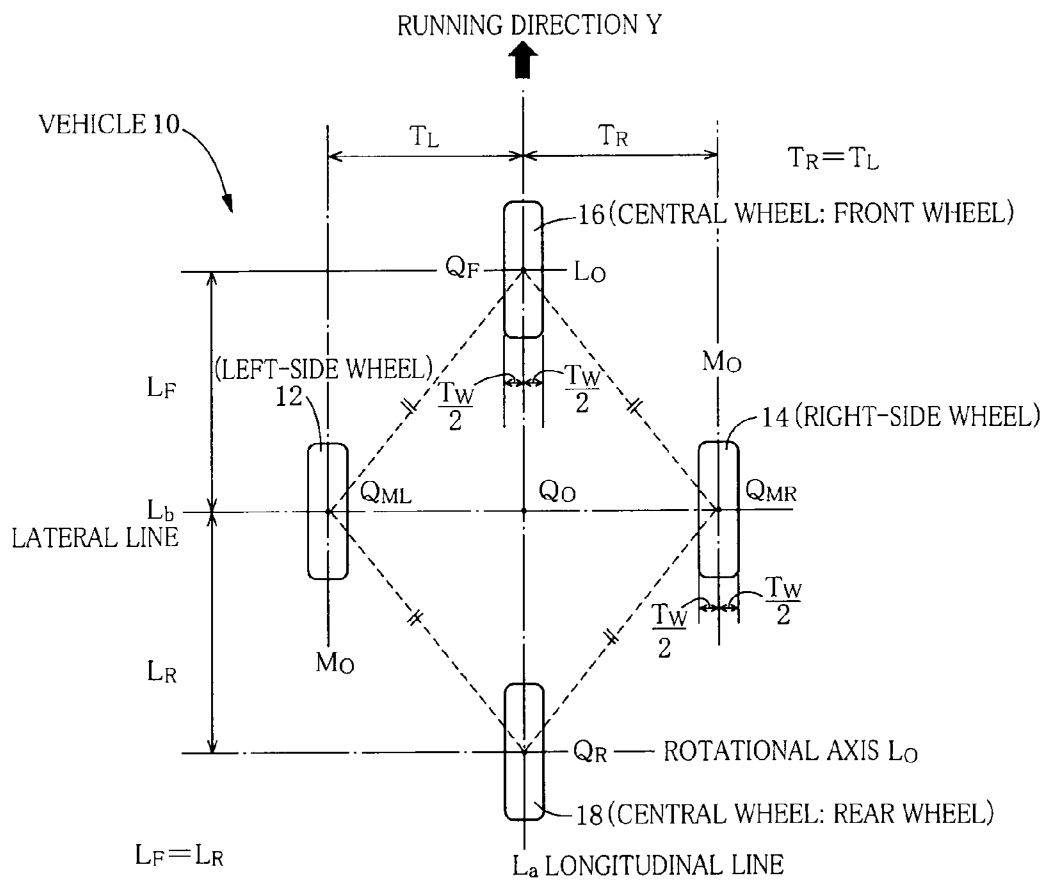
FIG. 2 is a plan view showing a vehicle on which a brake system according to Embodiment 1 of the invention is installed.

The brake system according to the embodiment of the invention is installed on a vehicle shown in FIG. 2.

The vehicle 10 includes four wheels 12, 14, 16, 18. The wheels 12, 14 are a left-side wheel and a right-side wheel, respectively, which are provided to be spaced apart from each other in a width direction of the vehicle. The wheels 16, 18 are central wheels in the form of a front wheel and a rear wheel which are provided to be located between the left-side and right-side wheels 12, 14 in the width direction. The front wheel 16 is located on a front side of the left-side and right-side wheels 12, 14, while the rear wheel 18 is located on a rear side of the left-side and right-side wheels 12, 14. That is, the vehicle 10 includes the two central wheels 16, 18 in addition to the left-side and right-side wheels 12, 14.

In the present embodiment, positions of the respective four wheels 12, 14, 16, 18 are defined by respective points (hereinafter referred to as "position defining points $Q_F$, $Q_R$, $Q_{ML}$, $Q_{MR}$") each of which corresponds to an intersection point Q between a rotary axis Lo of the corresponding wheel and a plane Mo passing through ½ of a width Tw of the corresponding wheel and perpendicular to the rotary axis Lo of the corresponding wheel. The four wheels 12, 14, 16, 18 are disposed in respective positions such that the position defining points $Q_F$, $Q_R$, $Q_{ML}$, $Q_{MR}$ of the respective wheels are located at respective corners of a diamond shape as seen in a plan view of the vehicle, so as to cooperate with one another to define the diamond shape.

Since the four wheels are disposed to be located at the respective corners of the diamond shape, a lateral line Lb as a line segment interconnecting the position defining point $Q_{ML}$ of the left-side wheel 12 and the position defining point $Q_{MR}$ of the right-side wheel 14 and a longitudinal line La as a line segment interconnecting the position defining point $Q_F$ of the front wheel 16 and the position defining point $Q_R$ of the rear wheel 18 intersect with each other at their respective centers Qo at a right angle. That is, a front-wheel side distance $L_F$ between the lateral line Lb and the rotary axis Lo of the front wheel 16 and a rear-wheel side distance $L_R$ between the lateral line Lb and the rotary axis Lo of the rear wheel 18 are substantially equal to each other ($L_F=L_R$). A left-side-wheel side distance $T_L$ between the center Qo of the longitudinal line La and the position defining point $Q_{ML}$ of the left-side wheel 12 and a right-side-wheel side distance $T_R$ between the center Qo of the longitudinal line La and the position defining point $Q_{MR}$ of the right-side wheel 14 are substantially equal to each other ($T_L=T_R$). It is noted that the vehicle 10 runs forward in a direction indicated by arrow Y. Theoretically, when the vehicle is running straight, the running direction of the vehicle is parallel with the longitudinal direction La.

[Brake System]

Figure 3:
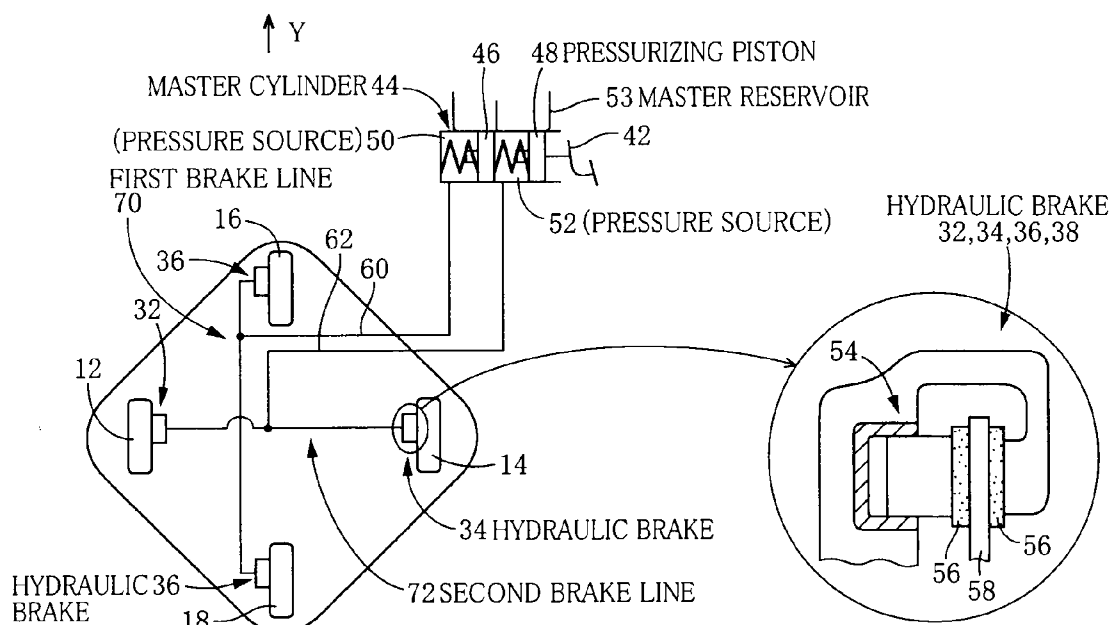
FIG. 3 is a view conceptually showing an entirety of the above-described brake system.

FIG. 3 shows the brake system that is installed on the vehicle 10. This brake system includes hydraulic brakes 32, 34, 36, 38 provided for the respective wheels 12, 14, 16, 18 and a master cylinder 44 configured to generate a hydraulic pressure by an operation applied to a brake pedal 42 as a brake operating member. Each of the hydraulic brakes 32, 34, 36, 38 serves as a service brake.

As shown in FIG. 3, the master cylinder 44 is of a tandem type, and includes two pressurizing pistons 46, 48 and pressurizing chambers 50, 52 such that the pressurizing chamber 50 is located on a front side of the pressurizing piston 46 while the pressurizing chamber 52 is located on a front side of the pressurizing piston 48. A seal member (not shown) is provided on a front surface of each of the pressurizing pistons 46, 48. When each of the pressurizing pistons 46, 48 is being positioned in its rearward end position, a corresponding one of the pressurizing chambers 50, 52 is in communication with a master reservoir 53. When each of the pressurizing pistons 46, 48 is moved forward from its rearward end position, a corresponding one of the pressurizing chambers 50, 52 becomes isolated from the master reservoir 53, thereby generating the hydraulic pressure.

In the present embodiment, each of the hydraulic brakes 32, 34, 36, 38 is a disk brake, and includes a brake cylinder 54 as a brake actuator. With the hydraulic pressure as an energy being supplied from the master cylinder 44 to each of the brake cylinders 54, a friction member 56 is pressed against a rotatable body 58 that is rotatable integrally with the corresponding wheel whereby rotation of the wheel is retrained.

The brake cylinders 54 of the hydraulic brakes 36, 38 provided for the front wheel 16 and the rear wheel 18 are connected to the pressurizing chamber 50 via a fluid passage 60. The brake cylinders 54 of the hydraulic brakes 32, 34 provided for the left-side wheel 12 and the right-side wheel 14 are connected to the pressurizing chamber 52 via a fluid passage 62.

When the brake pedal 42 is operatively depressed, the hydraulic pressures are generated in the respective pressure chambers 50, 52, independently of each other. The hydraulic pressure generated in the pressurizing chamber 50 is supplied through the fluid passage 60 to the brake cylinders 54 of the front and rear wheels 16, 18, whereby the hydraulic brakes 36, 38 are activated. The hydraulic pressure generated in the pressurizing chamber 52 is supplied through the fluid passage 62 to the brake cylinders 54 of the left-side and right-side wheels 12, 14, whereby the hydraulic brakes 32, 34 are activated.

In Embodiment 1, each of the pressurizing chambers 50, 52 corresponds to a manually-operated hydraulic pressure source; the pressurizing chamber 50, the fluid passage 60 and the brake cylinders 54 provided for the front and rear wheels 16, 18 cooperate to constitute a first brake line 70; and the pressurizing chamber 52, the fluid passage 62 and the brake cylinders 54 provided for the left-side and right-side wheels 12, 14 cooperate to constitute a second brake line 72. The first brake line 70 and the second brake line 72 are to be activated independently of each other, so that, even in the event of failure of either one of the brake lines 70, 72, the hydraulic brakes can be activated in the other of the brake lines 70, 72.

It is noted that, in the present embodiment, the failure of the brake line is interpreted to mean a case in which the braking force cannot be outputted by the brake line or a case in which a magnitude of the braking force outputted by the brake line is extremely small.

[Suspension]

Figure 4:
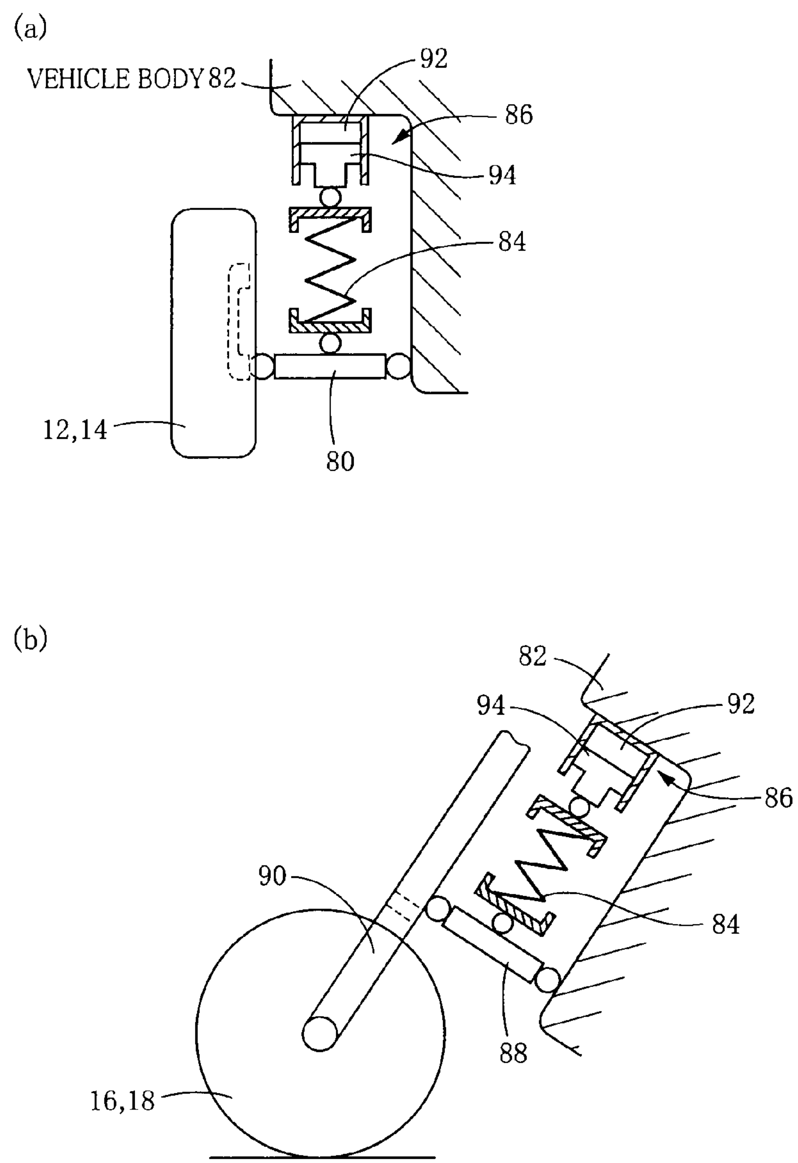
FIG. 4 is a set of views conceptually showing a suspension of the vehicle on which the above-described brake system is installed.

FIG. 4 (*a*), (*b*) is a set of views showing a suspension provided in the vehicle 10.

As shown in FIG. 4 (*a*), a suspension spring 84 and a single-acting cylinder 86 are provided for each of the left-side wheel 12 and right-side wheel 14, and are disposed in series between a wheel holding member 80 and a vehicle body 82. The wheel holding member 80 is a suspension arm through which each of the wheels 12, 14 is pivotably held by the vehicle body 82.

As shown in FIG. 4 (*b*), the suspension spring 84 and the single-acting cylinder 86 are provided for each of the front wheel 16 and rear wheel 18, and are disposed in series between a wheel holding member 88 and the vehicle body 82. The wheel holding member 88 is a suspension arm that is provided between the vehicle body 82 and a wheel fork 90 that holds the wheel. The wheel is rotatably gripped, from opposite sides of the wheel, by the wheel fork 90.

In the following description, each of the suspension springs 84 and the single-acting cylinders 86 will be referred together with, as a suffix, one of reference signs (front wheel F, rear wheel R, intermediate wheel M, or intermediate left-side wheel ML, intermediate right-side wheel MR), where it should be clarified which one of the four wheels the referred suspension spring 84 or single-acting cylinder 86 corresponds to.

The road holding force f of each of the wheels 12-18 is equal to an elastic force fs of the suspension spring 84, and is equal to a force fp received by the single-acting cylinder 86.

$$F=fs=fp$$

A magnitude of the elastic force fs of the suspension spring 84 corresponds to a product obtained by multiplying a spring constant k by a displacement x of the suspension spring 84 (i.e., displacement from its free state), which may be referred also to as a compression amount. A magnitude of the force fp received by the single-acting cylinder 86 corresponds to a product obtained by multiplying the hydraulic pressure P in a hydraulic chamber 92 by an area (pressure receiving area) A of an opposed surface of a piston 94 which is opposed to the hydraulic chamber 92. The free state is a state in which no load is applied to the suspension spring 84 without any force other than a gravity acting on the spring 84.

$$fs=k\cdot x$$

$$fp=P\cdot A$$

In Embodiment 1, the spring constants k of the suspension springs 84 provided for the respective wheels $12^{-18}$ are equal to one another.

Further, in Embodiment 1, as long as the brake lines 70, 72 function normally, an amount of the working fluid in the hydraulic chamber 92 of the single-acting cylinder 86 is held constant, so that only the suspension spring 84 is expanded or contracted by change of the force applied from a road surface to the wheel or change of the load applied to the wheel.

Figure 5:
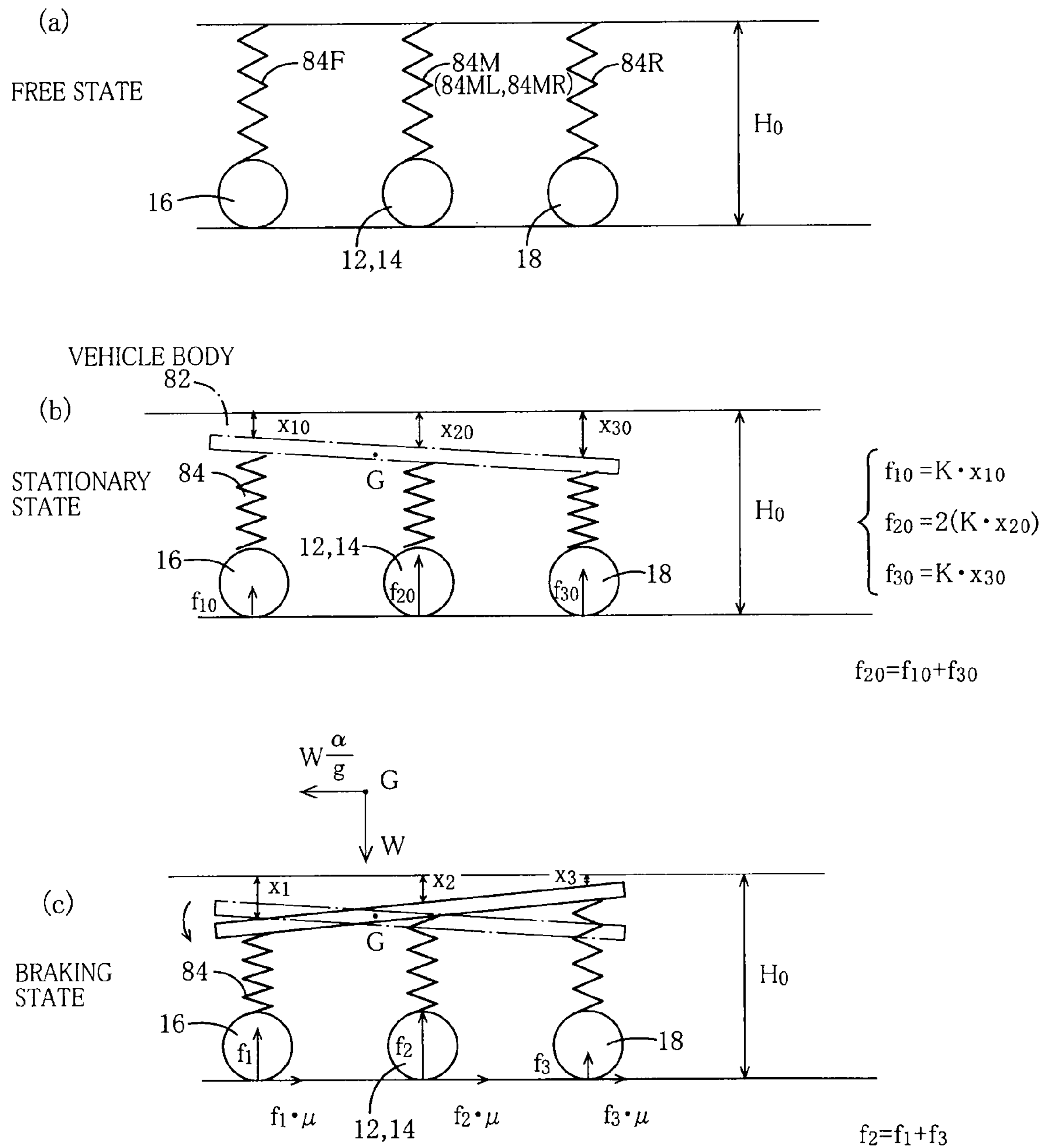
FIG. 5 is a set of views each showing a relationship between an amount of displacement of a spring of the above-described suspension and a road holding force given to each wheel.

FIG. 5 (*a*) shows a free state in which it is regarded that each of the suspension springs 84 provided for a corresponding one of the wheels 12-18 has an upright posture and that the suspension springs 84 are equal to one another with respect to the natural length, i.e., length without any load acting thereon in the free state. The single-acting cylinders 86 are not illustrated in FIG. 5. With the vehicle body 82 being mounted on the suspension springs 84, the suspension springs 84 provided for the wheels 12-18 are compressed as shown in FIG. 5 (*b*).

FIG. 5 (*b*) shows a posture of the vehicle body 82 in a static state (i.e., state in which the vehicle is being stopped or the vehicle is running at a constant running velocity). It is noted that, although the vehicle body 82 is illustrated to have a plate-like shape for simplicity of the illustration, an actual posture of the vehicle body 82 is different from the illustrated posture. As shown in FIG. 5 (*b*), it is common that a center of gravity G of the vehicle body 82 lies on the longitudinal line La shown in FIG. 1. The weight of the vehicle body 82 is received by cooperation of the four wheels 12, 14, 16, 18, there is established an expression as follows:

$$f_{1O}+f_{2O}+f_{3O}=W \qquad (1),$$

where "$f_{1O}$" represents the road holding force acting on the front wheel 16, "$f_{3O}$" represents the road holding force acting on the rear wheel 18, "$f_{2O}$" represents a sum of the road holding forces acting on the respective left-side and right-side wheels 12, 14, and "W" represents the weight of the vehicle body 82.

Further, since the vehicle body 82 is a rigid body, there is established an expression as follows:

$$x_{1O}+x_{3O}2x_{2O} \qquad (2),$$

where "$x_{1O}$" represents an amount of compression of the suspension spring 84 provided for the front wheel 16, from its free state, "$x_{3O}$" represents an amount of compression of the suspension spring 84 provided for the rear wheel 18, from its free state, and "$x_{2O}$" represents an amount of compression of the suspension spring 84 provided for each of the left-side and right-side wheels 12, 14, from its free state. Meanwhile, since the spring constants of the respective suspension springs 84 are of the same value k, there are established expressions as follows:

$$f_{1O}=x_{1O}\cdot k$$

$$f_{2O}=(x_{2O}\cdot k)\cdot 2$$

$$f_{3O}=x_{3O}\cdot k$$

By substituting these expressions into the above expression (2), there is established an expression as follows:

$$f_{2O}=f_{1O}+f_{3O} \qquad (3)$$

Upon braking of the vehicle, an inertial force causes the vehicle body 82 to be pivoted about the center of gravity G in a direction indicated by arrow, as shown in FIG. 5 (*c*), whereby the vehicle body 82 takes a posture inclined forwardly from the posture in the static state. In this braking state, among the road holding forces given to the wheels 12-18, there is established an expression as follows:

$$f_1+f_2+f_3=W \tag{4}$$

Further, there is established an expression as follows:

$$x_1+x_3=2x_2 \tag{5}$$

where "$x_1$" represents an amount of compression of the suspension spring 84 provided for the front wheel 16, upon braking of the vehicle, from its free state, "$x_3$" represents an amount of compression of the suspension spring 84 provided for the rear wheel 18, upon braking of the vehicle, from its free state, and "$x_2$" represents an amount of compression of the suspension spring 84 provided for each of the left-side and right-side wheels 12, 14, upon braking of the vehicle, from its free state.

There is established an expression as follows:

$$f_2=f_1+f_3 \tag{6}$$

From the expressions (3), (6), it is known that the sum of the road holding forces given to the left-side wheel 12 and right-side wheel 14 and the sum of the road holding forces given to the front wheel 16 and rear wheel 18 are always equal to each other in the vehicle of Embodiment 1.

It is noted that the expressions (1)-(6) are established even where the lengths of the respective suspension springs 84 in their free states are different from one another, and even where each of the suspension springs 84 is not provided to have an upright posture.

A maximum braking force outputtable by activation of each of the hydraulic brakes 32, 34, 36, 38 corresponds to a product obtained by multiplying the road holding force f given to the corresponding wheel (upon braking of the vehicle) by the friction coefficient μ. Therefore, the braking force (friction force) $F_{B1}$ outputtable in the first brake line 70 has a magnitude represented by expression: $F_{B1}=(f_1+f_3)\cdot\mu$, while the braking force $F_{B2}$ outputtable in the second brake line 72 has a magnitude represented by expression: $F_{B2}=f_2\cdot\mu$. The braking forces $F_{B1}$, $F_{B2}$ are equal in magnitude to each other ($F_{B1}=F_{B2}$).

That is, the hydraulic brakes 32-38 to be provided for the respective wheels can be designed such that a maximum value of sum of the braking forces applied to the front and rear wheels 16, 18 and a maximum value of sum of the braking forces applied to the left-side and right-side wheels 12, 14 are equal to each other. The maximum values can be equalized to each other, for example, by an arrangement in which a piston fitted in the brake cylinder 54 provided for the front wheel 16 has a large pressure-receiving area, a piston fitted in the brake cylinder 54 provided for the rear wheel 18 has a small pressure-receiving area, and a piston fitted in the brake cylinder 54 provided for each of the left-side and right-side wheels 12, 14 has a pressure-receiving area which is smaller than the pressure-receiving area of the piston of the brake cylinder 54 for the front wheel 16 and which is larger than the pressure-receiving area of the piston of the brake cylinder 54 for the rear wheel 18. Consequently, even in event of failure of either one of the first and second brake lines 70, 72, it is theoretically possible to output a total braking force whose magnitude is substantially equal to ½ of a magnitude of that in case of normality of both of the two brake lines 70, 72.

Further, in event of failure of either one of the two brake lines, a yaw moment is not generated by activation of the other of the two brake lines, so that it is possible to restrain reduction of a running stability of the vehicle. That is, since a yaw moment is not generated, it is not necessary to restrain a rate of increase of the hydraulic pressure in each brake cylinder of the other brake line as in Patent Document 1. Rather, the hydraulic pressure in each brake cylinder of the other brake line can be increased to a maximum amount. Consequently, when only the other brake line is activated, it is possible to maximally utilize the friction coefficient of a road surface.

Moreover, since a required pipe arrangement and constructions of the brakes can be simplified, it is possible to restrain increase in cost.

[Arrangement for Changing Road-Holding-Force Share]

For each of the wheels 12-18, the single-acting cylinder 86 is disposed in series with the suspension spring 84, so that shares of the road holding force, which are allotted to the respective wheels, can be changed by controlling the hydraulic pressure (amount of the working fluid) in the hydraulic chamber 92 of each single-acting cylinder 86.

As indicated by expression (4), the weight of the vehicle body 82 is supported by cooperation of the four wheels 12-18. Therefore, when one of the brake lines fails (for example, when the first brake line 70 fails), the sum of the road holding forces of the wheels 16, 18 for which the brake cylinders 54 included in the failing brake line are provided (hereinafter simply referred to as "wheels corresponding to the brake line") may be made smaller than that in case of normality of both of the first and second brake lines 70, 72, so that the sum of the road holding forces of the wheels 12, 14 corresponding to the normally functioning second brake line 72 can be made larger than that in case of normality of both of the two brake lines 70, 72. Thus, owing to an activation of the second brake line 72, it is possible to output a total braking force whose magnitude is larger than ½ of a magnitude of that in case of normality of both of the two brake lines 70, 72.

Further, when the sum of road holding forces of the wheels 16, 18 corresponding to the first brake line 70 is made zero ($f_1+f_3=0$), the sum of the road holding forces of the wheels 12, 14 is made, theoretically, equal to the weight W of the vehicle body 82 ($f_2=W$), so that the activation of the second brake line 72 makes it possible to output a total braking force whose magnitude ($F_{B2}=W\cdot\mu$) is equal to 100% of a maximum magnitude of that in case of normality of both of the two brake lines 70, 72.

Figure 6:
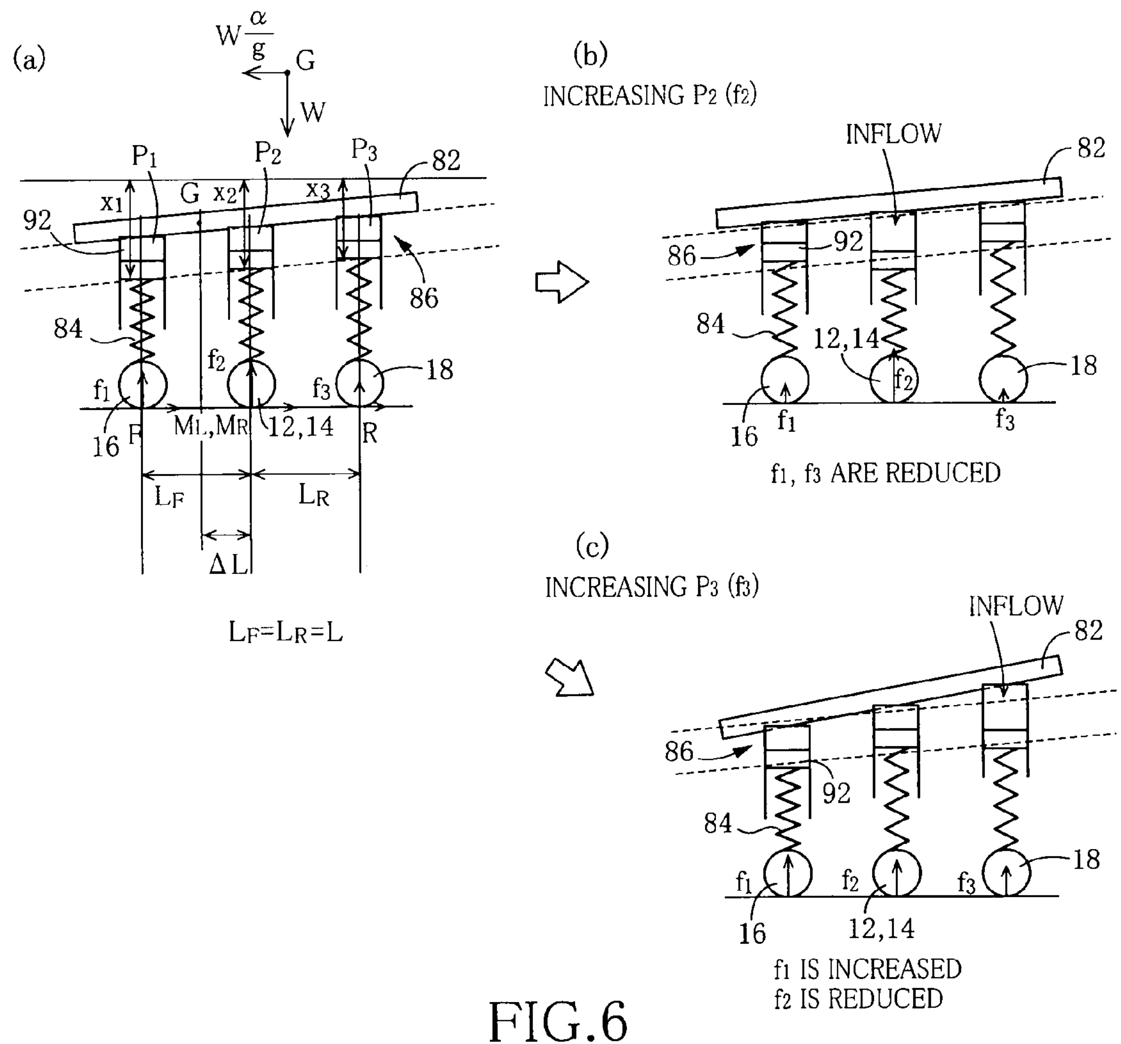
FIG. 6 is a set of views each showing a state of control of the road holding force given to each wheel of the above-described vehicle.
Figure 7:
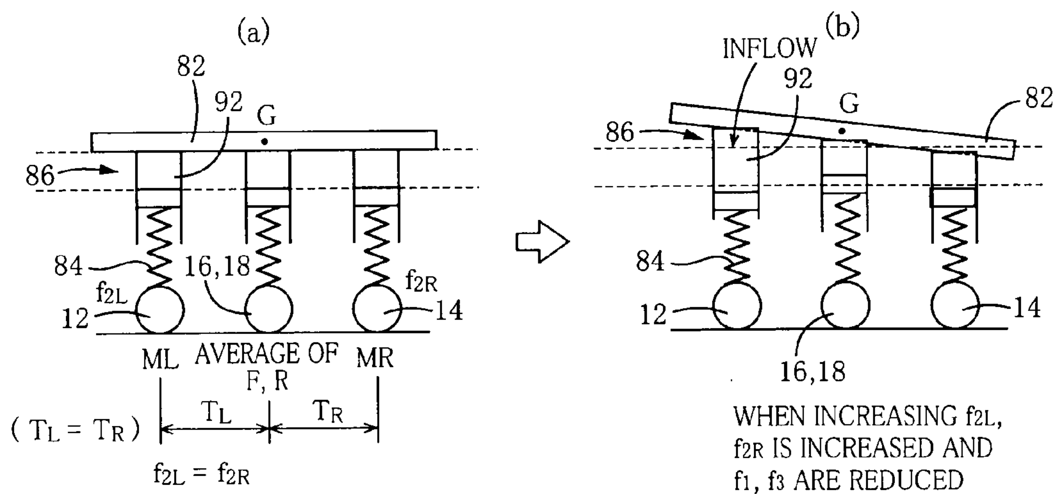
FIG. 7 is a set of views each showing a state of another control of the road holding force given to each wheel of the above-described vehicle.

Referring to FIGS. 6 and 7, there will be described an arrangement for controlling the road holding force shares, by controlling the hydraulic pressures in the respective single-acting cylinders 86.

FIG. 6 (*a*) shows a state in which the vehicle is being braked where the amounts of the working fluids in the hydraulic chambers 92 of the single-acting cylinder 86 provided for the respective wheels 12-18 are all equal to one another. In this state shown in FIG. 6 (*a*), the above-described expressions (4), (5), (6) are established.

Meanwhile, from a moment balance about the wheels 12, 14, there is established an expression as follows:

$$f_1\cdot L=f_3\cdot L+W\cdot\Delta L+(W\alpha/g)\cdot H,$$

where "α" represents a deceleration, "H" represents a height of the center of gravity G, "ΔL" represents a deviation of the center of gravity G from the center Qo, and "L" represents the front-wheel side distance $L_F$ (or rear-wheel side distance $L_B$) ($L=L_F=L_B$).

From the above expression, it is possible to obtain an expression representing a relationship between the road holding forces $f_1$, $f_3$, as follows:

$$f_1=f_3+W\cdot\{\Delta L/L+(\alpha/g)\cdot(H/L)\} \quad (7)$$

Similarly, from a moment balance about the rear wheel 18, there is established an expression as follows:

$$f_1\cdot 2L+f_2\cdot L=W\cdot(L+\Delta L)+(W\alpha/g)\cdot H.$$

From this expression, it is possible to obtain an expression representing a relationship between the road holding forces $f_1$, $f_2$, as follows:

$$f_1+f_2/2=W\cdot\{(L+\Delta L)/2L+(\alpha/g)\cdot(H/2L)\} \quad (8)$$

When the hydraulic pressure in the hydraulic chamber 92 of the single-acting cylinder 86 of at least one of the wheels 12-18 is controlled, from the state of FIG. 6 (*a*), (the hydraulic pressure, working fluid amount or the like in the hydraulic chamber 92 of the single-acting cylinder 86 will be simply referred to as "hydraulic pressure, working fluid amount or the like in the single-acting cylinder 86", where appropriate), a linear relationship is not established among displacement amounts of the suspension springs 84, so that the above expressions (5), (6) are not established while the above expressions (4), (7), (8) are established. That is, when the hydraulic pressure in the single-acting cylinder 86 of at least one of the wheels 12-18, the road holding forces $f_1$, $f_2$, $f_3$ are changed (the road holding force shares are changed) while the above expressions (4), (7), (8) are established.

When the working fluid is supplied to the single-acting cylinder 86 provided for each of the left-side and right-side wheels 12, 14 so as to increase the hydraulic pressure $P_2$, with the working fluid amount in the single-acting cylinder 86 provided for each of the front and rear wheels 16, 18 being kept unchanged, the road holding force $f_2$ is increased whereby the vehicle body 82 is lifted up, as shown in FIG. 6 (*b*). In this instance, since the vehicle body 82 is lifted up, the suspension springs 84 provided for the front and rear wheels 16, 18 are extended whereby the hydraulic pressure in the single-acting cylinder 86 provided for each of the front and rear wheels 16, 18 is reduced and the sum of the road holding forces $f_1$, $f_3$ is reduced. Further, when the working fluid is supplied to the single-acting cylinder 86 provided for each of the front and rear wheels 16, 18 so as to increase the hydraulic pressure in the single-acting cylinder 86 provided for each of the front and rear wheels 16, 18, with the working fluid amount in the single-acting cylinder 86 provided for each of the left-side and right-side wheels 12, 14 being kept unchanged, the sum of the road holding forces $f_1$, $f_3$ is increased while the sum $f_2$ of the road holding forces of the left-side and right-side wheels 12, 14 is reduced. To the contrary, when the working fluid is caused to flow out from the single-acting cylinder 86 provided for the each of the left-side and right-side wheels 12, 14, with the working fluid amount in the single-acting cylinder 86 provided for each of the front and rear wheels 16, 18 being kept unchanged, the sum $f_2$ of the road holding forces of the left-side and right-side wheels 12, 14 is reduced while the sum of the road holding forces $f_1$, $f_3$ of the front and rear wheels 16, 18 is increased. When the working fluid is caused to flow out from the single-acting cylinder 86 provided for the each of the front and rear wheels 16, 18, the sum $f_2$ of the road holding forces of the left-side and right-side wheels 12, 14 is increased while the sum of the road holding forces $f_1$, $f_3$ of the front and rear wheels 16, 18 is reduced.

When the working fluid is supplied to the single-acting cylinder 86 provided for the rear wheel 18, in the state shown in FIG. 6 (*a*), with the working fluid amount in the single-acting cylinder 86 provided for each of the front, left-side and right-side wheels 16, 12, 14 being kept unchanged, an inclination of the vehicle body 82 is increased, as shown in FIG. 6 (*c*), so that the sum of the road holding forces $f_1$, $f_3$ of the front and rear wheels 16, 18 is increased while the sum $f_2$ of the road holding forces of the left-side and right-side wheels 12, 14 is reduced. Further, when the working fluid is supplied to the single-acting cylinder 86 provided for the front wheel 16 so as to increase the road holding force $f_1$, the sum of the road holding forces $f_3$ of the front and rear wheels 16, 18 is increased while the sum $f_2$ of the road holding forces of the left-side and right-side wheels 12, 14 is reduced. To the contrary, when the working fluid is caused to flow out from the single-acting cylinder 86 provided for the rear wheel 18, the inclination of the vehicle body 82 is reduced, so that the road holding force $f_1$ of the front wheel 16 is reduced while the sum $f_2$ of the road holding forces of the left-side and right-side wheels 12, 14 is increased. When the working fluid is caused to flow out from the single-acting cylinder 86 provided for the front wheel 16, the road holding force of the rear wheel 18 is reduced while the sum $f_2$ of the road holding forces of the left-side and right-side wheels 12, 14 is increased.

Upon braking of the vehicle during straight running of the vehicle, an inertia force does not act on the vehicle body 82 in the width direction. Thus, as shown in FIG. 7 (*a*), the road holding force $f_{2L}$, $f_{2R}$ of the left-side and right-side wheels 12, 14 are equal to each other. When the working fluid is caused to flow into the single-acting cylinder 86 provided for the left-side wheel 12 so as to increase the road holding force $f_{2L}$ in this state shown FIG. 7 (*a*), the vehicle body 82 is inclined in the width direction as shown in FIG. 7 (*b*), so that the road holding force $f_{2R}$ of the right-side wheel 14 is increased while the road holding forces $f_1$, $f_3$ of the front and rear wheels 16, 18 are reduced. Similarly, when the road holding force $f_{2R}$ of the right-side wheel 14 is increased, the vehicle body 82 is inclined in the width direction as shown in FIG. 7 (*b*), so that the road holding force $f_{2L}$ of the left-side wheel 14 is increased while the road holding forces $f_1$, $f_3$ of the front and rear wheels 16, 18 are reduced. To the contrary, when the road holding force of one of the left-side and right-side wheels 12, 14 is reduced, the road holding force of the other of the left-side and right-side wheels 12, 14 while the road holding forces $f_1$, $f_3$ of the front and rear wheels 16, 18 are increased.

As described above, when the road holding force of at least one of the front and rear wheels 16, 18 is controlled (for example, increased), the road holding forces of the front and rear wheels 16, 18 are increased in the same direction (increased). Further, in this instance, the road holding forces of the left-side and right-side wheels 12, 14 are changed in the opposite direction (reduced) that is opposite to the above-described same direction. When at least one of the road holding forces of the left-side and right-side wheels 12, 14 is controlled, the road holding forces of the left-side and right-side wheels 12, 14 are changed in the same direction while the road holding forces of the front and rear wheels 16, 18 are changed in the opposite direction that is opposite to the above-described same direction.

Further, by causing the working fluid to flow into (or flow out from) at least one of the single-acting cylinders 86 provided for the front and rear wheels 16, 18, or by causing the working fluid to flow out from (or flow into) at least one of the single-acting cylinders 86 provided for the left-side and right-side wheels 12, 14, it is possible to increase (or reduce) the road holding forces of the front and rear wheels 16, 18 and to reduce (or increase) the road holding forces of the left-side and right-side wheels 12, 14.

As described above, by changing the road holding force of at least one of the four wheels 12-18, (namely, by causing the road holding force of at least one of the four wheels 12-18 to be subjected to control) it is possible to change the road holding force shares to be allotted to the wheels 12-18 and accordingly to change the road holding forces of all of the four wheels 12-18.

It is noted that, when the sum of the road holding forces of the front and rear wheels 16, 18 is to be reduced, the sum of the road holding forces can be more effectively reduced by reducing both of the road holding forces of the front and rear wheels 16, 18, rather than by reducing one of the road holding forces of the front and rear wheels 16, 18.

[Regarding Road-Holding-Force Share Changing Device]

Figure 8:
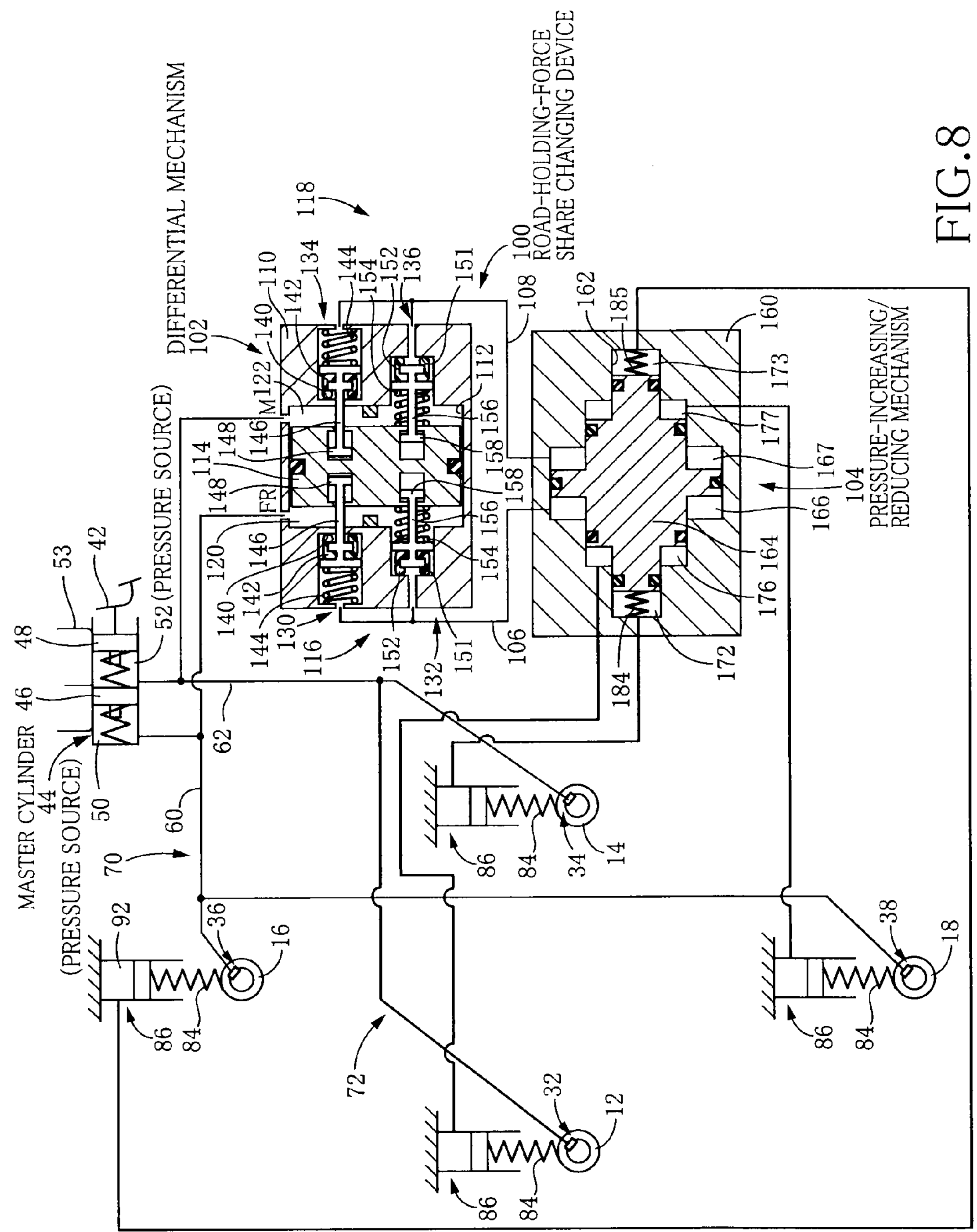
FIG. 8 is a view showing a road-holding-force share changing is device included in the above-described brake system.

In Embodiment 1, a road-holding-force share changing device 100 is disposed between the master cylinder 44 and the single-acting cylinders 84 provided for the respective wheels, as shown in FIG. 8.

The road-holding-force share changing device 100 includes a differential mechanism 102 connected to the fluid passages 60, 62 and a pressure-increasing/reducing mechanism 104 to which the single-acting cylinders 86 provided for the wheels 12-18 are connected. The differential mechanism 102 and the pressure-increasing/reducing mechanism 104 are connected via fluid passages 106, 108.

The differential mechanism 102 includes (a) a housing 110, (b) a piston 114 fluid-tightly and slidably fitted in a cylinder bore 112 defined in the housing 110, and (c) two pairs of valves 116, 118 disposed on respective opposite sides of the cylinder bore 112.

The fluid passages 60, 62 are connected to respective hydraulic chambers 120, 122 defined on respective opposite sides of the piston 114. The piston 114 is moved when a difference between the hydraulic pressures in the respective hydraulic chambers 120, 122 becomes not lower than a given pressure. The given pressure is set to a pressure difference that is considered to be generated in the event of failure of one of the first and second brake lines 70, 72 when the brake pedal 42 is being operated, and may be referred to as “failure pressure difference”.

The pair of valves 116 consist of two valves 130, 132 disposed between the hydraulic chamber 120 and the fluid passage 106, while the pair of valves 118 consist of two valves 134, 136 (ON/OFF valves) disposed between the hydraulic chamber 122 and the fluid passage 108. Each of the valves 130, 132, 134, 136 is a normally-closed seat valve, and is switchable between its open and closed state. When each of the valves 130-136 is placed in the open state, a corresponding one of the brake lines 70, 72 is in communication with the pressure-increasing/reducing mechanism 104. When each of the valves 130-136 is placed in the closed state, the communication between the corresponding one of the brake lines 70, 72 and the pressure-increasing/reducing mechanism 104 is cut off. The valve 130 of the pair of valves 116 includes (a) a valve seat 140 disposed to be opposed to the hydraulic chamber 120 of the housing 110, (b) a valve body 142 disposed to be movable toward and away from the valve seat 140, (c) a spring 144 disposed to bias the valve body 142 toward the valve seat 140, and (d) a valve opening member 146 configured to move the valve body 142 away from the valve seat 140. The valve opening member 146 has an engaged portion 148 engaged with the piston 114, and is activated by movement of the piston 114 in a direction toward the valve 130 away from its neutral position, so as to separate the valve body 142 from the valve seat 140.

The valve 132 includes (a) a valve seat 151 disposed to be opposed to the fluid passage 106 of the housing 110, (b) a valve body 152, (c) a spring 154, and (d) a valve opening member 156 having an engaged portion 158. The valve opening member 156 is moved by movement of the piston 114 in a direction away from the valve 132, so as to separate the valve body 152 from the valve seat 151. The valve 134 of the pair of valves 118 is disposed to be opposed to the valve 130, while the valve 136 of the pair of valves 118 is disposed to be opposed to the valve 132. Although the valves 134, 136 are different from the valves 130, 132 in that the valves 134, 136 are disposed between the fluid passage 108 and the hydraulic chamber 122, the valves 134, 136 are identical in construction with the valves 130, 132. Therefore, the same reference signs as used in the valves 130, 132 will be used to identify the corresponding elements, and description of the valves 134, 136 is not provided.

In the differential mechanism 102, when the hydraulic pressure in the hydraulic chamber 122 becomes lower than the hydraulic pressure in the hydraulic chamber 120, for example, a force based on the hydraulic pressure difference acts on the piston 114 in a direction that causes the piston 114 to be moved in rightward direction as seen in FIG. 8. When the force based on the hydraulic pressure difference becomes larger than preloads of the springs 144, 154 of the valves 134, 136, the piston 114 is moved in the rightward direction whereby the valve opening members 146, 156 of the valves 134, 132 are moved so as to place the valves 134, 132 into open states. In this instance, the valves 130, 136 are held in closed states.

The preload and the like of each of the springs 144, 154 are values determined depending on the pressure difference (hereinafter referred to as “failure pressure difference”) that is considered to be generated in the event of failure when the brake pedal 42 is being operated. Thus, the piston 114 is moved when the pressure difference becomes not smaller than the failure pressure difference. That is, since the piston 114 is not moved as long as the pressure difference is smaller than the failure pressure difference, the brake lines 70, 72 can be reliably isolated from the single-acting cylinders 86 in case of normality of both of the two brake lines 70, 72.

Further, since the valve bodies 142, 152 of the valves 130-136 are provided by elastic members each made of rubber or the like, the brake lines 70, 72 can be more reliably isolated from the single-acting cylinders 86.

Further, the preload of each of the springs 154 is set a value that does not allow each spring 154 to be compressed by the hydraulic pressure applied to a corresponding one of the fluid passages 106, 108, so that each of the valves 130-136 is not switched from the closed state to the open state depending on the hydraulic pressures in the single-acting cylinders 86.

The pressure-increasing/reducing mechanism 104 includes (a) a housing 160 and (b) a stepped piston 164 that is fluid-tightly and slidably fitted in a stepped cylinder bore 162 defined in the housing 160. The stepped cylinder bore 162 and the stepped piston 164 cooperate to define six hydraulic chambers. The hydraulic chambers 120, 122 of the differential mechanism 102 are connected via the fluid passages 106, 108 to driving hydraulic chambers 166, 167 as two of the six hydraulic chambers, so that the pressure-increasing/reducing mechanism 104 is connected to the fluid passages 60, 62 via the differential mechanism 102. The stepped piston 164 is moved when there is established a pressure difference between the driving hydraulic chambers 166, 167 as a result of activation of the differential mechanism 102.

The single-acting cylinder 86 provided for the right-side wheel 14 and the single-acting cylinder 86 provided for the front wheel 16 are connected via fluid passages to small-diameter chambers 172, 173 as two of the six hydraulic chambers. The single-acting cylinder 86 provided for the left-side wheel 12 and the single-acting cylinder 86 provided for the rear wheel 16 are connected via fluid passages to large-diameter chambers 176, 177 as two of the six hydraulic chambers. That is, the single-acting cylinders 86, which are provided for the left-side and right-side wheels 12, 14 corresponding to the second brake line 72, are connected to the large-diameter chamber 176 and the small-diameter chamber 172, respectively, which are located on one of opposite sides of the stepped piston 164. The single-acting cylinders 86, which are provided for the front and rear wheels 16, 18 corresponding to the first brake line 70, are connected to the small-diameter chamber 173 and the large-diameter chamber 177, respectively, which are located on the other of the opposite sides of the stepped piston 164. It is noted that return springs 184, 185 are provided in the respective small-diameter chambers 172, 173 such that each of the return springs 184, 185 is located between the stepped piston 164 and the housing 160.

There will be described activation of the road-holding-force share changing device 100.

When the first brake line 70 fails upon operation of the hydraulic brakes 32-38, the hydraulic pressure in the fluid passage 60 is made lower than the hydraulic pressure in the fluid passage 62 by at least the failure pressure difference.

In this instance, the piston 114 of the differential mechanism 102 is moved in leftward direction as seen in FIG. 8, whereby the valves 130, 136 are placed into the open states while the valves 132, 134 are held in the closed states. The hydraulic chambers 120, 122 of the differential mechanism 102 are brought into communication with the driving hydraulic chambers 166, 167 of the pressure-increasing/reducing mechanism 104, respectively, whereby the working fluid is supplied from the hydraulic chamber 122 to the driving hydraulic chamber 167 while the working fluid is caused to flow out from the driving hydraulic chamber 166 to the hydraulic chamber 120, so that the working fluid is caused to flow out from the failing part via the hydraulic chamber 120, for example.

In the pressure-increasing/reducing mechanism 104, since the hydraulic pressure in the driving hydraulic chamber 167 becomes higher than the hydraulic pressure in the driving hydraulic chamber 166, the stepped piston 164 is moved in leftward direction as seen in FIG. 8. The working fluid is supplied to the single-acting cylinders 86 provided for the left-side and right-side wheels 12, 14, while the working fluid is caused to flow out from the single-acting cylinders 86 provided for the front and rear wheels 16, 18. That is, the working fluid is caused to flow out from the single-acting cylinders 86 provided for the front and rear wheels 16, 18 corresponding to the first brake line 70 that fails, so that the road holding forces $f_1$, $f_3$ become smaller than before activation of the road-holding-force share changing device 100. The working fluid is supplied to the single-acting cylinders 86 provided for the left-side and right-side wheels 12, 14 corresponding to the normally functioning second brake line 72, so that the sum $f_2$ of the road holding forces of the left-side and right-side wheels 12, 14 becomes larger than before activation of the road-holding-force share changing device 100. Consequently, owing to activation of the normally functioning second brake line 72, it is possible to output a total braking force whose magnitude is larger than 50% of a magnitude of that in case of normality of both of the first and second brake lines 70, 72.

When the brake pedal 42 is released, each of the pressurizing pistons 46, 48 of the master cylinder 44 is returned to the rearward end position whereby the pressurizing chambers 50, 52 are brought into communication with the master reservoir 53. In the differential mechanism 102, the pressure difference between the hydraulic chambers 120, 122 becomes substantially zero whereby the piston 114 is returned to the neutral position. The working fluid is supplied from the driving hydraulic chamber 167 to the hydraulic chamber 122, and is returned to the master reservoir 53 via the master cylinder 44. Further, the working fluid is supplied from the master cylinder 53 to the hydraulic chamber 120 and the driving hydraulic chamber 166, whereby the piston 114 of the differential mechanism 102 and the piston 164 of the pressure-increasing/reducing mechanism 104 are returned to the neutral positions.

On the other hand, in the event of failure of the second brake line 72, the hydraulic pressure in the fluid passage 62 becomes lower than the hydraulic pressure in the fluid passage 60 by at least the failure pressure difference.

In this instance, the piston 114 of the differential mechanism 102 is moved in rightward direction as seen in FIG. 8, whereby the valves 132, 134 are placed into the open states. The working fluid is supplied from the hydraulic chamber 120 to the driving hydraulic chamber 166 of the pressure-increasing/reducing mechanism 104, while the working fluid is caused to flow out from the driving hydraulic chamber 167.

In the pressure-increasing/reducing mechanism 104, since the hydraulic pressure in the driving hydraulic chamber 166 becomes higher than the hydraulic pressure in the driving hydraulic chamber 167, the stepped piston 164 is moved in rightward direction as seen in FIG. 8. The working fluid is caused to flow out from the single-acting cylinders 86 provided for the left-side and right-side wheels 12, 14 while the working fluid is supplied to the single-acting cylinders 86 provided for the front and rear wheels 16, 18, so that the sum $f_2$ of the road holding forces of the left-side and right-side wheels 12, 14 corresponding to the failing second brake line 72 is reduced while the road holding forces $f_1$, $f_3$ of the front and rear wheels 16, 18 corresponding to the normally functioning first brake line 70 are increased. Consequently, owing to activation of the normally functioning first brake line 70, it is possible to output a total braking force whose magnitude is larger than 50% of a magnitude of that in case of normality of both of the first and second brake lines 70, 72.

As described above, in Embodiment 1, the first and second brake lines 70, 72 are capable of outputting the braking forces whose maximum magnitudes are equal to each other, so that, even if either one of the two brake lines 70, 72 fails, it is possible to output a total braking force whose magnitude corresponds to 50% of a magnitude of that in case of normality of both of the first and second brake lines 70, 72.

Further, the road holding forces of the wheels corresponding to the failing brake line are reduced while the road holing forces of the wheels corresponding to the normally functioning brake line are increased, so that an activation of the normally functioning brake line makes it possible to output a total braking force whose magnitude is larger than 50% of a magnitude of that in case of normality of both of the two brake lines.

Moreover, in case of normality of both of the brake lines 70, 72, the valves 130, 132, 134, 136 are kept in the closed states even when the hydraulic brakes 32, 34, 36, 38 are operated. Thus, the two brake lines 70, 72 are isolated from the single-acting cylinders 86 provided for the respective wheels 12, 14, 16, 18, so that any one of the two brake lines 70, 72 and any one of the single-acting cylinders 86 are not affected from each other. Specifically, the pressure-increasing/reducing mechanism 104 is kept inactivated so that movement of the piston 164 is inhibited and the single-acting cylinders 86 provided for the respective wheels 12-18 are made independent from one another. Even if the hydraulic pressures in the single-acting cylinders 86 are changed during braking of the vehicle, the hydraulic pressure difference between the hydraulic chambers 120, 122 is not caused as a result of the change of the hydraulic pressures in the single-acting cylinders 86, so that the hydraulic pressures in the two brake lines (fluid passages 60, 62) can be equal to each other.

As described above, in Embodiment 1, the pressure-increasing/reducing mechanism 104 is provided by a mechanism including both of a pressure-increasing mechanism and a pressure-reducing mechanism, and serves as a hydraulic-pressure controlling portion.

In the above-described embodiment, the front-wheel side distance $L_F$ and the rear-wheel side distance $L_R$ of the vehicle 10 are substantially equal to each other. However, they may be different from each other. The front-wheel side distance $L_F$ and the rear-wheel side distance $L_R$ of the vehicle 10 may be different from each other by such a degree that the sum of the road holding forces $f_1$, $f_3$ of the front and rear wheels 16, 18 and the sum $f_2$ of the road holding forces of the left-side and right-side wheels 12, 14 can be regarded to be substantially equal to each other. For example, where a value of $|L_F-L_R|/(L_F+L_R)$ is not larger than 0.2, they can be regarded to be substantially equal to each other.

Embodiment 2

In a brake system according to Embodiment 2, a road-holding-force share changing device 200 includes the differential mechanism 102 and a pressure-increasing/reducing mechanism 202 that is connected to the single-acting cylinders 86 provided for the left-side wheel 12 and rear wheel 18. Since the other parts of the brake system according to Embodiment 2 are the same as those of the brake system according to Embodiment 1, the description thereof will not be provided.

The pressure-increasing/reducing mechanism 202 includes a housing 210, a stepped piston 214 that is fluid-tightly and slidably fitted in a stepped cylinder bore 212 defined in the housing 210. The stepped cylinder bore 212 and the stepped piston 214 cooperate to define four hydraulic chambers. The hydraulic chambers 120, 122 of the differential mechanism 102 are connected via the fluid passages 106, 108 to driving hydraulic chambers (large-diameter chambers) 220, 221 as two of the four hydraulic chambers, while the single-acting cylinders 86 provided for the left-side wheel 12 and rear wheel 18 are connected via fluid passages to small-diameter chambers 224, 225 as two of the four hydraulic chambers. Thus, the single-acting cylinders 86 provided for the wheels 18, 12 corresponding to the respective first and second brake lines 70, 72 are connected to the pressure-increasing/reducing mechanism 202.

The road-holding-force share changing device 200 is activated in substantially the same manner as the road-holding-force share changing device 100 in the above-described Embodiment 1.

Figure 9:
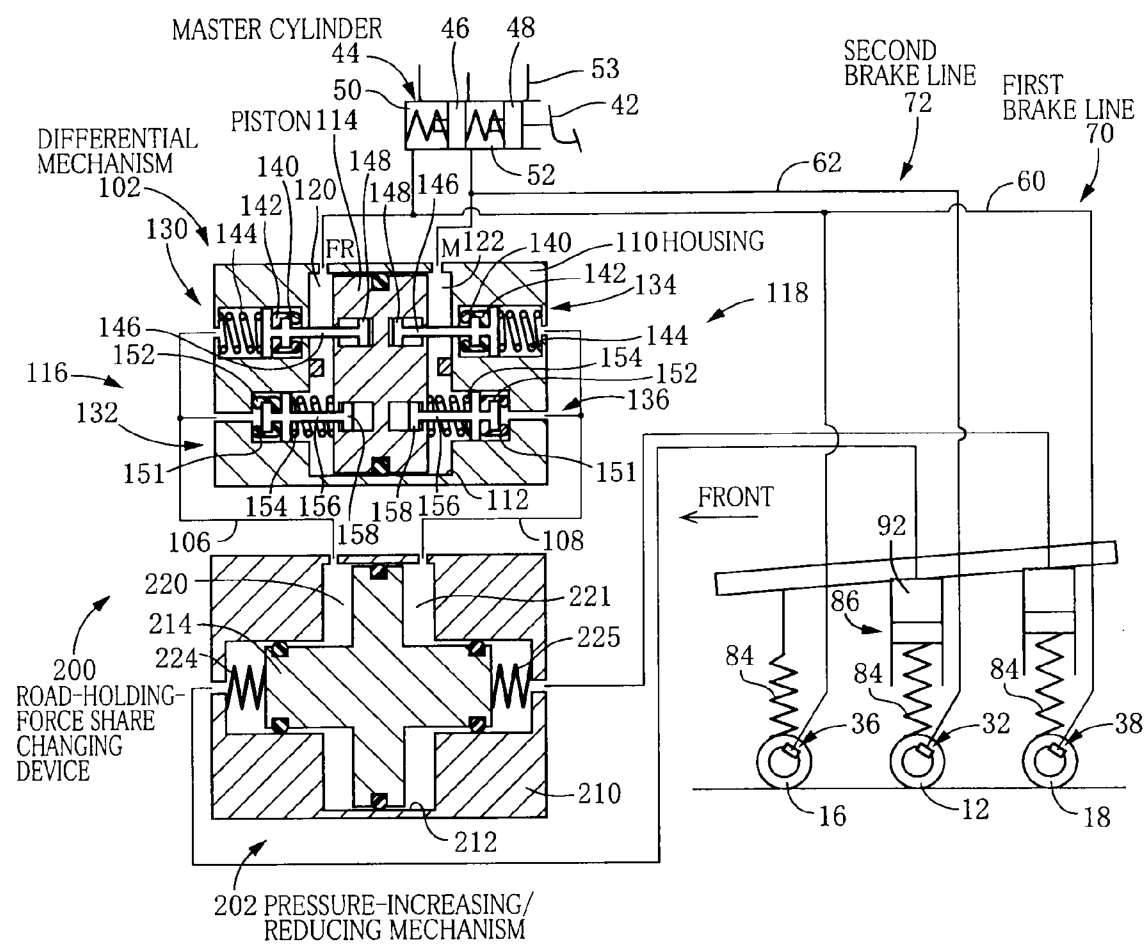
FIG. 9 is a view showing a road-holding-force share changing device included in a brake system according to Embodiment 2 of the present invention.

For example, in the event of failure of the first brake line 70, the piston 114 of the differential mechanism 102 is moved in leftward direction as seen in FIG. 9, whereby the valves 130, 136 are placed into the open states, and the stepped piston 214 of the pressure-increasing/reducing mechanism 202 is moved in leftward direction as seen in FIG. 9. The working fluid is caused to flow out from the hydraulic chamber 92 of the single-acting cylinder 86 provided for the rear wheel 18 corresponding to the failing brake line 70, while the working fluid is supplied to the single-acting cylinder 86 provided for the left-side wheel 12 corresponding to the normally functioning brake line 72. Thus, the road holding force $f_3$ of the rear wheel 18 is reduced while the road holding force of the left-side wheel 12 is increased, whereby the road holding force $f_1$ of the front wheel 16 is reduced while the road holding force of the right-side wheel 12 is increased. Consequently, owing to activation of the normally functioning brake line 72, it is possible to output a total braking force whose magnitude is larger than 50% of a magnitude of that in case of normality of both of the two brake lines 70, 72.

In the event of failure of the second brake line 72, the road holding forces of the front and rear wheels 16, 18 corresponding to the first brake line 70 are increased while the road holding forces of the left-side and right-side wheels 12, 14 corresponding to the second brake line 72 are reduced.

In the brake system according to Embodiment 2, there is a risk that the vehicle is inclined in a width direction of the vehicle, by activation of the pressure-increasing/reducing mechanism 202. However, by the inclination of the vehicle, a vehicle operator can be informed of failure of the brake line. Further, the pressure-increasing/reducing mechanism 202 can be constructed more simple than the road-holding-force share changing device 100 of Embodiment 1. Further, the single-acting cylinder 86 is not provided for the front wheel 16, and the pressure-increasing/reducing mechanism 202 is not connected to the single-acting cylinder 86 for the right-side wheel 14, so that it is possible to reduce a required quantity of the components and simplify a required pipe arrangement. Thus, the required cost can be made lower than in Embodiment 1.

Embodiment 3

Figure 10:
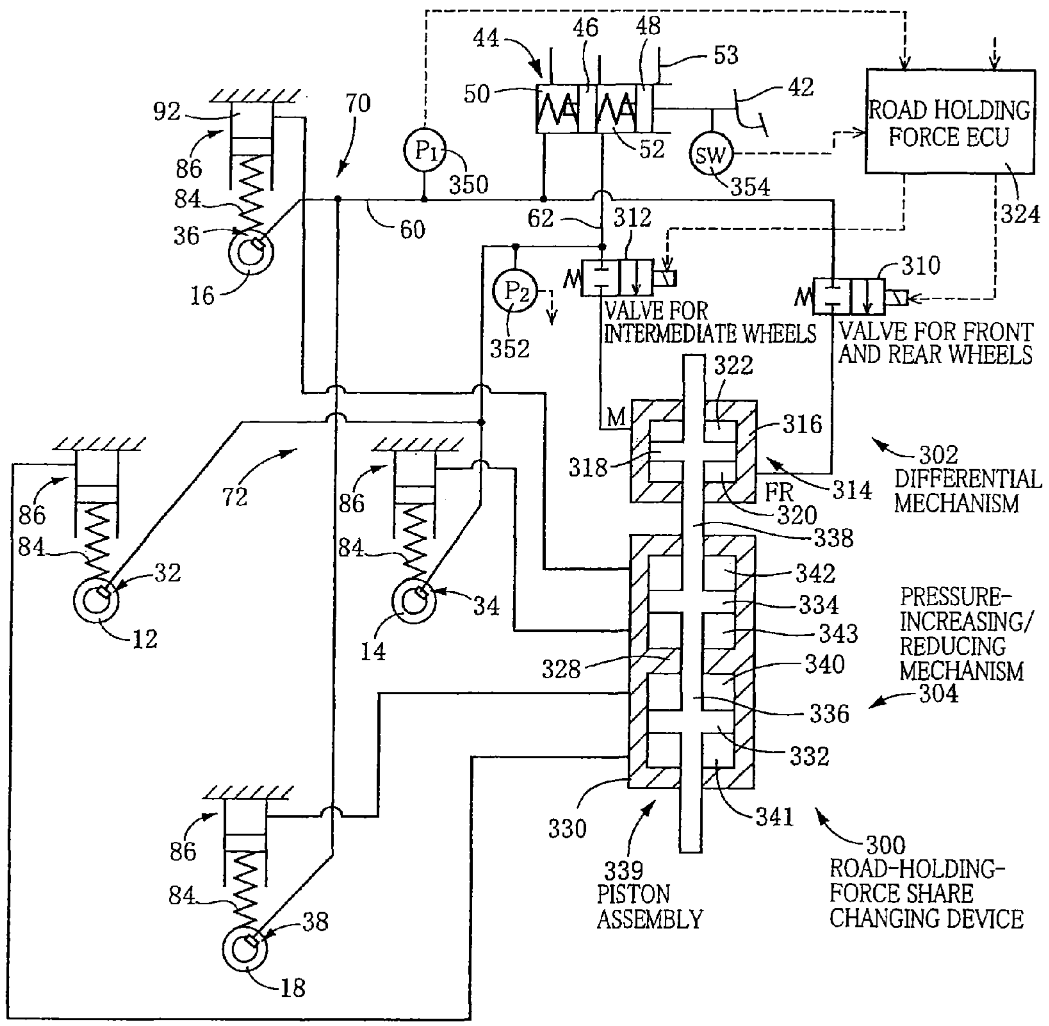
FIG. 10 is a view showing a road-holding-force share changing device included in a brake system according to Embodiment 3 of the present invention.

In a brake system according to Embodiment 3, a road-holding-force share changing device 300 includes a differential mechanism 302 and a pressure-increasing/reducing mechanism 304, as shown in FIG. 10. Since the other parts of the brake system according to Embodiment 3 are the same as those of the brake system according to Embodiment 1, the description thereof will not be provided.

The differential mechanism 302 includes electromagnetic valves 310, 312 and a differential cylinder 314. The differential cylinder 314 includes a housing 316 and a piston 318 that is fluid-tightly and slidably fitted in the housing 316. The housing 316 has an inner space that is divided, by the piston 318, into two hydraulic chambers 320, 322. To the hydraulic chamber 320, the fluid passage 60 is connected via the electromagnetic valve 310. To the hydraulic chamber 322, the fluid passage 62 is connected via the electromagnetic valve 312. Each of the electromagnetic valves 310, 312 is a normally-closed valve, and is opened and closed in accordance with commands supplied from a road holding force ECU 324 that is constituted mainly by a computer.

The pressure-increasing/reducing mechanism 304 includes (a) a housing 330 having a partition wall 328 in its intermediate portion and (b) two pistons 332, 334 which are slidably fitted in the housing 330 and which are located in respective opposite sides of the partition wall 328. The two pistons 332, 334 are connected to each other through a rod 336 that fluid-tightly penetrates the partition wall 328 such that the two pistons 332, 334 are movable integrally with each other. The two pistons 332, 334 are connected also to the piston 318 of the differential mechanism 302 through a rod 338 that fluid-tightly penetrates the housings 330, 316 such that the two pistons 332, 334 are movable integrally with the piston 318. Thus, a piston assembly 339 is constituted by elements such as the pistons 318, 332, 334 and the connecting rods 336, 338.

To hydraulic chambers 340, 341 located on respective opposite sides of the piston 332, the single-acting cylinder 86 provided for the rear wheel 18 and the single-acting cylinder 86 provided for the left-side wheel 12 are connected, respectively. To hydraulic chambers 342, 343 located on respective opposite sides of the piston 334, the single-acting cylinder 86 provided for the front wheel 16 and the single-acting cylinder 86 provided for the right-side wheel 14 are connected, respectively.

To the road holding force ECU 324, there are connected a hydraulic pressure sensor 350 that is provided in the fluid passage 60, a hydraulic pressure sensor 352 that is provided in the fluid passage 62 and a brake switch 354 that is to be placed in its ON state when the brake pedal 42 is being operated. Further, to the road holding force ECU 324, there are also connected solenoids of the respective electromagnetic valves 310, 312 via a drive circuit (not shown).

Figure 11:
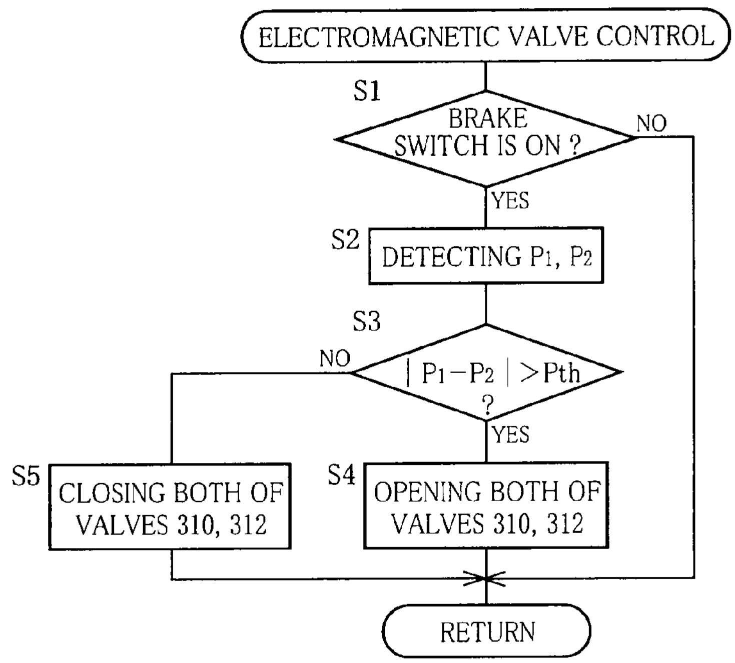
FIG. 11 is a flow chart representing an electromagnetic-valve control program stored in a storage portion of a brake ECU of the above-described brake system.

In the road holding force ECU 324, an electromagnetic-valve control program, which is represented by a flow chart of FIG. 11, is executed at a predetermined time interval.

In step 1 (hereinafter abbreviated as "S1" as well as the other steps), it is judged whether the brake switch 354 is being placed in its ON state. When the brake switch 354 is being placed in its ON state, S2 is implemented to detect hydraulic pressures in the respective fluid passages 60, 62. Then, in S3, it is judged whether or not an absolute value of difference between the hydraulic pressures is larger than a predetermined failure judgment threshold value, which is determined based on a pressure difference that is to be established in the event of failure of either one of the brake lines (namely, determined based on the failure pressure difference of Embodiment 1). When the absolute value of the difference is smaller than the failure judgment threshold value, S5 is implemented to keep both of the electromagnetic valves 310, 312 in the closed states. When the absolute value of the difference is larger than the failure judgment threshold value, S4 is implemented to switch both of the electromagnetic valves 310, 312 from the closed states to the open states.

In the event of failure of the brake line 70, for example, the electromagnetic valves 310, 312 are placed into the open states, since the hydraulic pressure in the fluid passage 60 is lower than the hydraulic pressure in the fluid passage 62 by the failure-judgment threshold value or more.

In the differential mechanism 302, the hydraulic pressure in the hydraulic chamber 320 becomes lower than the hydraulic pressure in the hydraulic chamber 322 whereby the piston assembly 339 is moved downwardly as seen in FIG. 10. Thus, by the activation of the pressure-increasing/reducing mechanism 304, the working fluid is supplied to the single-acting cylinders 86 provided for the respective left-side and right-side wheels 12, 14 while the working fluid is discharged from the single-acting cylinders 86 provided for the respective front and rear wheels 16, 18, so that the road holding forces of the respective wheels 12, 14 that correspond to the normally functioning brake line 72 are increased while the road holding forces of the respective wheels 16, 18 that correspond to the failing brake line 70 are reduced.

In the event of failure of the brake line 72, the piston assembly 339 is moved upwardly as seen in FIG. 10 since the fluid pressure in the hydraulic chamber 322 becomes lower than the hydraulic pressure in the hydraulic chamber 320. Thus, by the activation of the pressure-increasing/reducing mechanism 304, the road holding forces of the respective front and rear wheels 16, 18 are increased while the road holding forces of the respective left-side and right-side wheels 12, 14 are reduced.

As described above, in the present embodiment, the electromagnetic valves 310, 312 are kept in the closed states as long as both of the brake lines 70, 72 function normally. Thus, the brake lines 70, 72 can be isolated from the single-acting cylinders 86 provided for the wheels 12-18, so that it is possible to avoid the single-acting cylinders 86 from being influenced by the hydraulic pressure in the master cylinder 44 and to avoid the hydraulic pressures in the fluid passages 60, 62 from being influenced by the hydraulic pressures in the single-acting cylinders 86.

Further, during the closed states of the electromagnetic valves 310, 312, the activation of the pressure-increasing/reducing mechanism 304 is inhibited whereby independencies of the respective single-acting cylinders 86 provided for the respective wheels 12-18 can be maintained.

Embodiment 4

Figure 12:
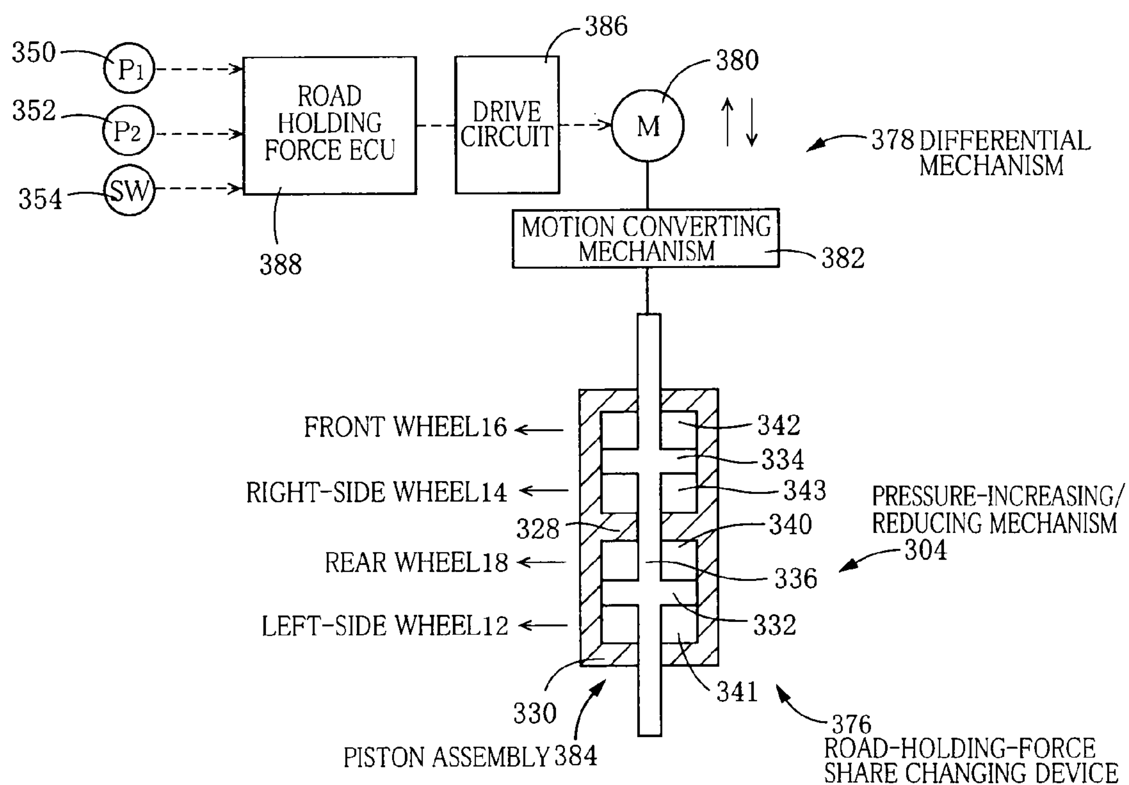
FIG. 12 is a view showing a road-holding-force share changing device included in a brake system according to Embodiment 4 of the present invention.

In a brake system according to Embodiment 4, a road-holding-force share changing device 376 includes a differential mechanism 378 and the above-described pressure-increasing/reducing mechanism 304, as shown in FIG. 12. The brake system according to Embodiment 4 is different from the brake system according to Embodiment 3 in that an electric motor 380 is included in the differential mechanism 378. However, the other parts of the brake system according to Embodiment 4 are the same as those of the brake system according to Embodiment 3, the description thereof will not be provided.

In the differential mechanism 378, a piston assembly 384 is connected to an output shaft of the electric motor 380 via a motion converting mechanism 382. The piston assembly 384 is constituted by the pistons 332, 334 and the rod 336.

Further, a clutch mechanism (not shown) is provided in one of the electric motor 380 and the motion converting mechanism 382, for inhibiting the electric motor 380 from being rotated by a force applied to the pressure-increasing/reducing mechanism 304.

Figure 13:
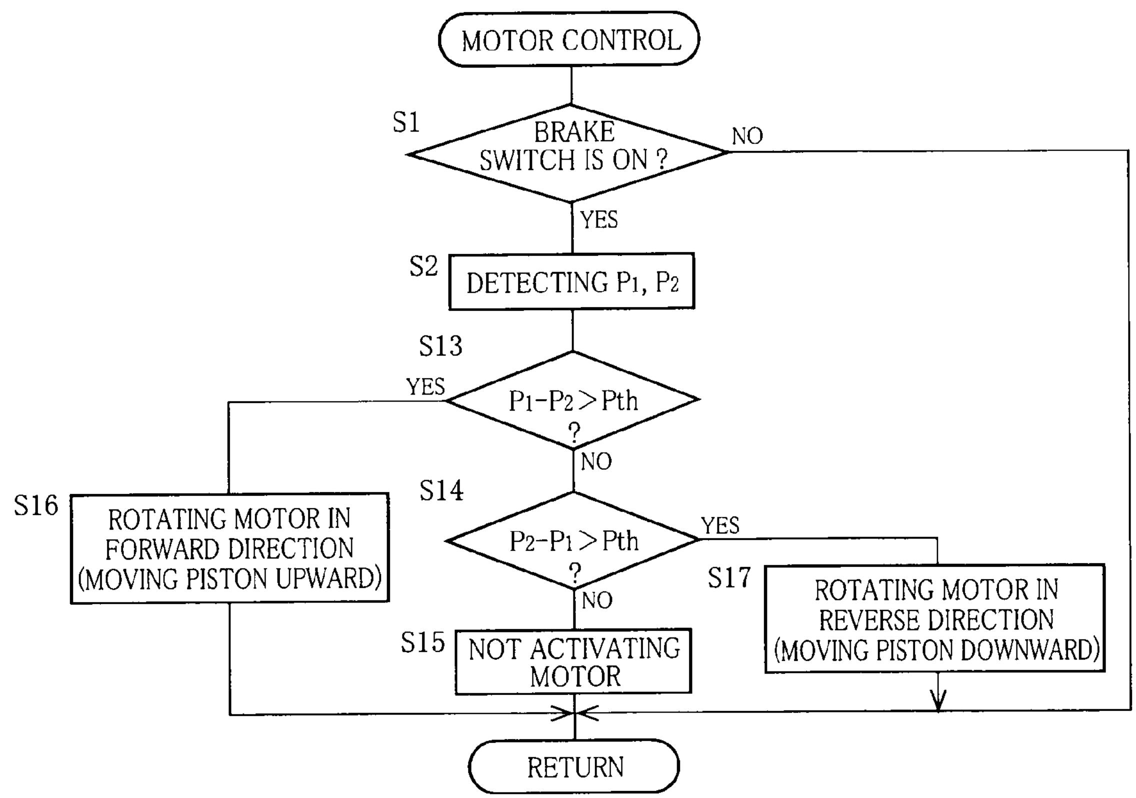
FIG. 13 is a flow chart representing a motor control program stored in a storage portion of a brake ECU of the above-described brake system.

Further, a road holding force ECU 388 is connected to the electric motor 380 via a drive circuit 386. In the road holding force ECU 388, an electric-motor control program, which is represented by a flow chart of FIG. 13, is executed at a predetermined time interval.

When the brake switch 354 is being placed in its ON state, the hydraulic pressures in the respective fluid passages 60, 62 are read. In S13, it is judged whether the hydraulic pressure in the brake line 70 is higher than the hydraulic pressure in the brake line 72 by at least the failure-judgment threshold value. In S14, it is judged whether the hydraulic pressure in the brake line 72 is higher than the hydraulic pressure in the brake line 70 by at least the failure-judgment threshold value. When negative judgments (NO) are obtained in both of S13 and S14, namely, when both of the two brake lines function normally, the control flow goes to S15 in which the electric motor 380 is not activated.

On the other hand, when the hydraulic pressure in the fluid passage 62 is lower than the hydraulic pressure in the fluid passage 60 by the failure-judgment threshold value or more, it is judged that the brake line 72 fails. In such an event, in S16, the piston assembly 384 is moved upwardly as seen in FIG. 12 whereby the road holding forces of the respective front and rear wheels 16, 18 are increased while the road holding forces of the respective left-side and right-side wheels 12, 14 are reduced.

When it is judged that the brake line 70 fails, S17 is implemented to cause the electric motor 380 to be rotated in the reverse direction, whereby the piston assembly 384 is moved downwardly as seen in FIG. 12. By the downward movement of the piston assembly 384, the road holding forces of the respective left-side and right-side wheels 12, 14 are increased while the road holding forces of the respective front and rear wheels 16, 18 are reduced.

Thus, in Embodiment 4, the piston assembly 384 is moved by activation of the electric motor 380, such that the road holding forces of the respective wheels that correspond to the failing brake line are reduced while the road holding forces of the respective wheels that correspond to the normally functioning brake line are increased.

Moreover, owing to provision of the clutch mechanism, it is possible to avoid the electric motor 380 from being rotated by a force applied to the piston assembly 384 while an electric current is not being supplied to the electric motor 380. Thus, during a stopped state of the electric motor 380, the pressure-increasing/reducing mechanism 304 can be reliably isolated from the brake lines 70, 72.

Embodiment 5

Figure 14:
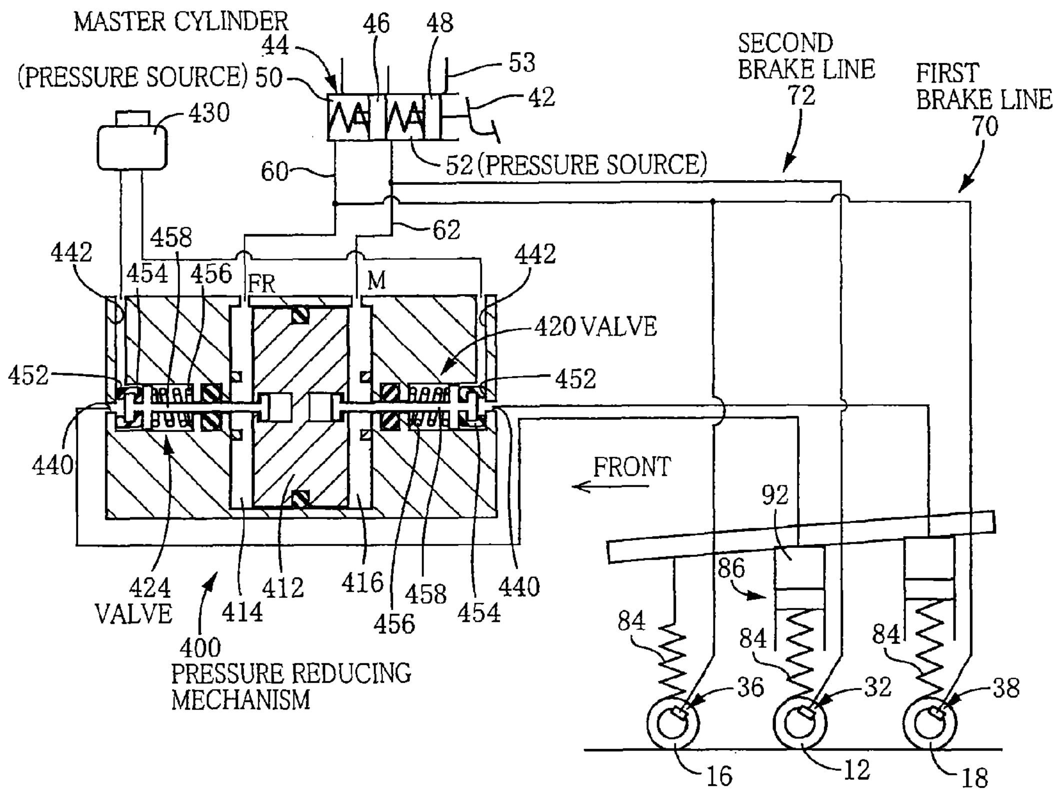
FIG. 14 is a view showing a road-holding-force share changing device included in a brake system according to Embodiment 5 of the present invention.

In a brake system according to Embodiment 5, a road-holding-force share changing device is constituted by a pressure reducing mechanism 400 as shown in FIG. 14. Since the other parts of the brake system according to Embodiment 5 are the same as those of the brake system according to Embodiment 2, the description thereof will not be provided.

The pressure reducing mechanism 400 includes a housing 410 and a piston 412 that is fluid-tightly and slidably fitted in the housing 410. The housing 410 has an inner space that is divided, by the piston 412, into two hydraulic chambers 414, 416 located on respective opposite sides of the piston 412. The above-described fluid passages 60, 62 are connected to the respective hydraulic chambers 414, 416. Further, valves 420, 424, which are identical in construction with each other, are provided on respective opposite sides of the piston 412 of the housing 410.

Each of the valves 420, 424 is a normally-closed valve which is disposed between a reservoir 430 and a corresponding one of the single-acting cylinders 86 provided for the respective wheels, namely, disposed between a passage 440 connected to the single-acting cylinder 86 and a passage 442 connected to the reservoir 430. Each of the valves 420, 424 includes a valve seat 452, a valve body 454, a spring 456 and a valve opening member 458 that is configured to move the valve body 454 away from the valve seat 452. When the valve body 454 is seated on the valve seat 452, the single-acting cylinder 86 and the reservoir 430 are cut off from each other. When the valve body 454 is separated from the valve seat 452 by the valve opening member 458 activated by activation of the piston 412, the single-acting cylinder 86 and the reservoir 430 are brought into communication with each other. Further, the single-acting cylinder 86 provided for the rear wheel 18 is connected to the passage 440 that is provided with the valve 420, while the single-acting cylinder 86 provided for the left-side wheel 12 provided for the rear wheel 18 is connected to the passage 440 that is provided with the valve 424.

In the event of failure of the brake line 70, the hydraulic pressure in the hydraulic chamber 414 becomes lower than the hydraulic pressure in the hydraulic chamber 416 by at least the above-described failure pressure difference, whereby the piston 412 is moved leftward as seen in FIG. 14. By the leftward movement of the piston 412, the valve 420 is switched from the closed state to the open state whereby the single-acting cylinder 86 provided for the rear wheel 18 is brought into communication with the reservoir 430. By communication of the single-acting cylinder 86 of the rear wheel 18 with the reservoir 430, the road holding forces given to the front and rear wheels 16, 18 are reduced whereby the road holding forces given to the left-side and right-side wheels 12, 14 are increased. In the present embodiment, theoretically, the road holding force given to the wheels corresponding to the failing brake line can be made zero, and activation of the normally functioning brake line makes it possible to output a total braking force whose magnitude is equal to 100% of a magnitude of that in case of normality of both of the two brake lines 70, 72.

In the event of failure of the brake line 72, the piston 412 is moved rightward whereby the valve 424 is switched from the closed state to the open state, so that the road holding forces given to the left-side and right-side wheels 12, 14 are reduced while the road holding forces given to the front and rear wheels 16, 18 are increased.

Thus, by reduction of the road holding forces of the wheels corresponding to the failing brake line, the road holding forces of the wheels corresponding to the normally functioning brake line can be increased by change of the shares of the road holding force which are allotted to the respective wheels. Thus, the total road holding force can be increased without keeping supplying the working fluid to the single-acting cylinders 86 provided for the wheels corresponding to the normally functioning brake line. Consequently, the road-holding-force share changing device can be made simple in construction, and the required cost can be reduced owing to the simplicity of the construction.

It is noted that, in the present embodiment, it can be regarded that the pressure reducing mechanism 400 as the road-holding-force share changing device serve also the differential mechanism.

Embodiment 6

Figure 15:
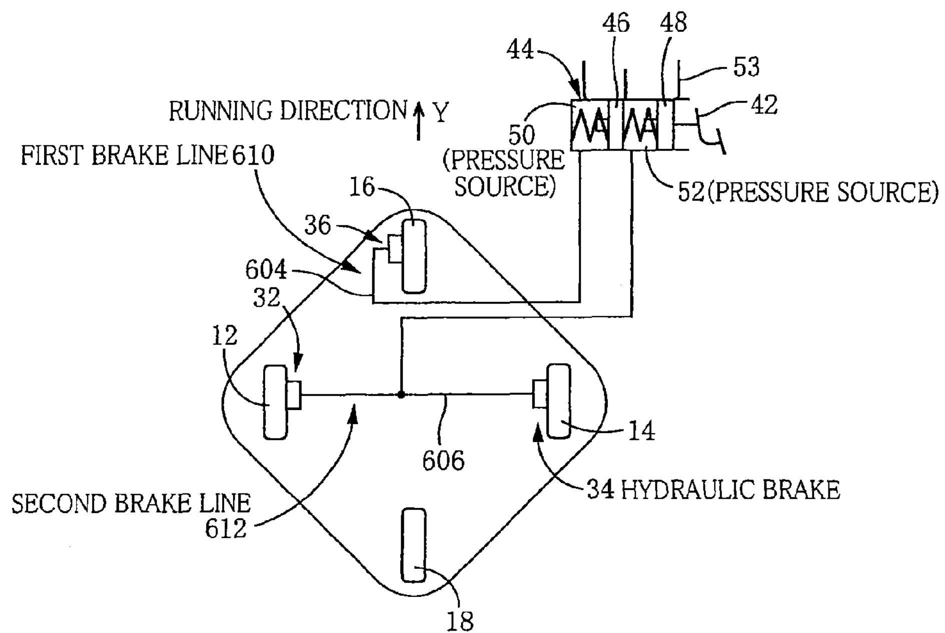
FIG. 15 is a view conceptually showing an entirety of a brake system according to Embodiment 6 of the present invention.

The brake system can be constructed as shown in FIG. 15.

In this brake system, the rear wheel 18 is not provided with the hydraulic brakes 38. To the pressurizing chamber 50 as one of two pressuring chambers of the master cylinder 44, the brake cylinder 54 provided for the front wheel 16 is connected via a fluid passage 604. Meanwhile, to the pressurizing chamber 52 as the other of the two pressuring chambers of the master cylinder 44, the brake cylinders 54 provided for the left-side and right-side wheels 12, 14 are connected via a fluid passage 606.

Figure 1:
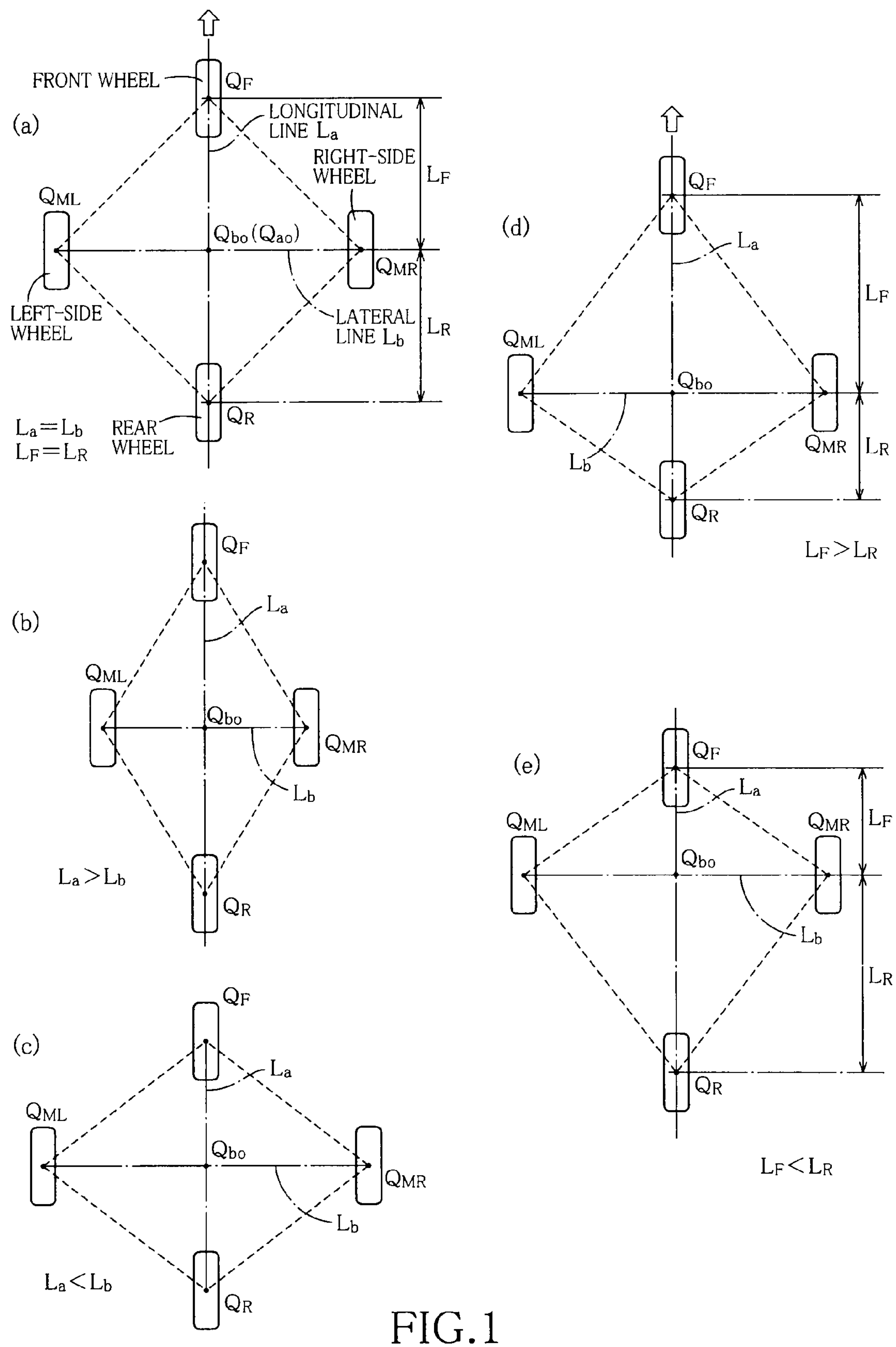
FIG. 1 is a set of plan views each showing an arrangement of wheels in a vehicle on which a brake system according to the present invention is installed.

For example, there is an arrangement of the vehicle 10 where the center of gravity G lies on the lateral line Lb (that is shown in FIG. 1) or on a front side of the lateral line Lb, so that a majority of the weight of the vehicle body 82 is supported by the front, left-side and right-side wheels 16, 12, 14. In such an arrangement, there is a case where the total braking force sufficient for decelerating the vehicle 10 can be outputted by activations of the hydraulic brakes 36, 32, 34 provided for the respective front wheel 16, left-side wheel 12 and right-side wheel 14. That is, in such a case, the rear wheel 18 is not required to be provided with the hydraulic brake.

Further, where a rate of the height H of the center of gravity G to the front-wheel side distance $L_F$ is high, the road holding force $f_1$ given to the front wheel 16 is considerably larger than the road holding force $f_3$ given to the rear wheel 18 ($f_1 >> f_3$), upon braking of the vehicle. When it can be regarded that the road holding force $f_3$ given to the rear wheel 18 is substantially zero, it can be regarded that the road holding force given to the front wheel 16 is substantially equal to the sum of the road holding forces given to the left-side and right-side wheels 12, 14 ($f_1 \cong f_2$). Therefore, by employing an arrangement in which a first brake line 610 is constituted by elements such as the pressurizing chamber 50, the fluid passage 604 and the brake cylinder 54 of the front wheel 16 while a second brake line 612 is constituted by elements such as the pressurizing chamber 52, the fluid passage 606 and the brake cylinders 54 of the respective left-side and right-side wheels 12, 14, it is possible to output the total braking force whose magnitude corresponds to almost 50% of a magnitude of that in case of normality of both of the two brake lines 610, 612, without causing a yaw moment to be generated, even if either one of the first and second brake lines 610, 612 fails.

In the brake system according to Embodiment 6, too, any one of the road-holding-force share changing devices of Embodiments 1-5 can be employed.

In the event of failure of the brake line 610, the road holding force $f_1$ given to the front wheel 16 is reduced while the sum $f_2$ of the road holding forces given to the respective left-side and right-side wheels 12, 14 is increased. In the event of failure of the brake line 612, the sum $f_2$ of the road holding forces given to the respective left-side and right-side wheels 12, 14 is reduced while the road holding force $f_1$ given to the front wheel 16 is increased. Consequently, even if either one of the brake lines 610, 612 fails, an activation of the other of the brake lines 610, 612, i.e., an activation of the normally functioning brake line makes it possible to output a total braking force whose magnitude corresponds to 50% or more of a magnitude of that in case of normality of both of the brake lines 610, 612.

Further, in the brake system according to Embodiment 6, since the hydraulic brake 38 is not provided for the rear wheel 18, the required cost can be reduced.

Embodiment 7

The brake system can be installed on a vehicle having wheels that are not arranged in a diamond-shaped arrangement. An example of such a case will be described with reference to FIGS. 16-18. It is noted that the same reference signs as used in the above-described embodiments will be used to identify the corresponding elements, and that description thereof will not be provided.

Figure 16:
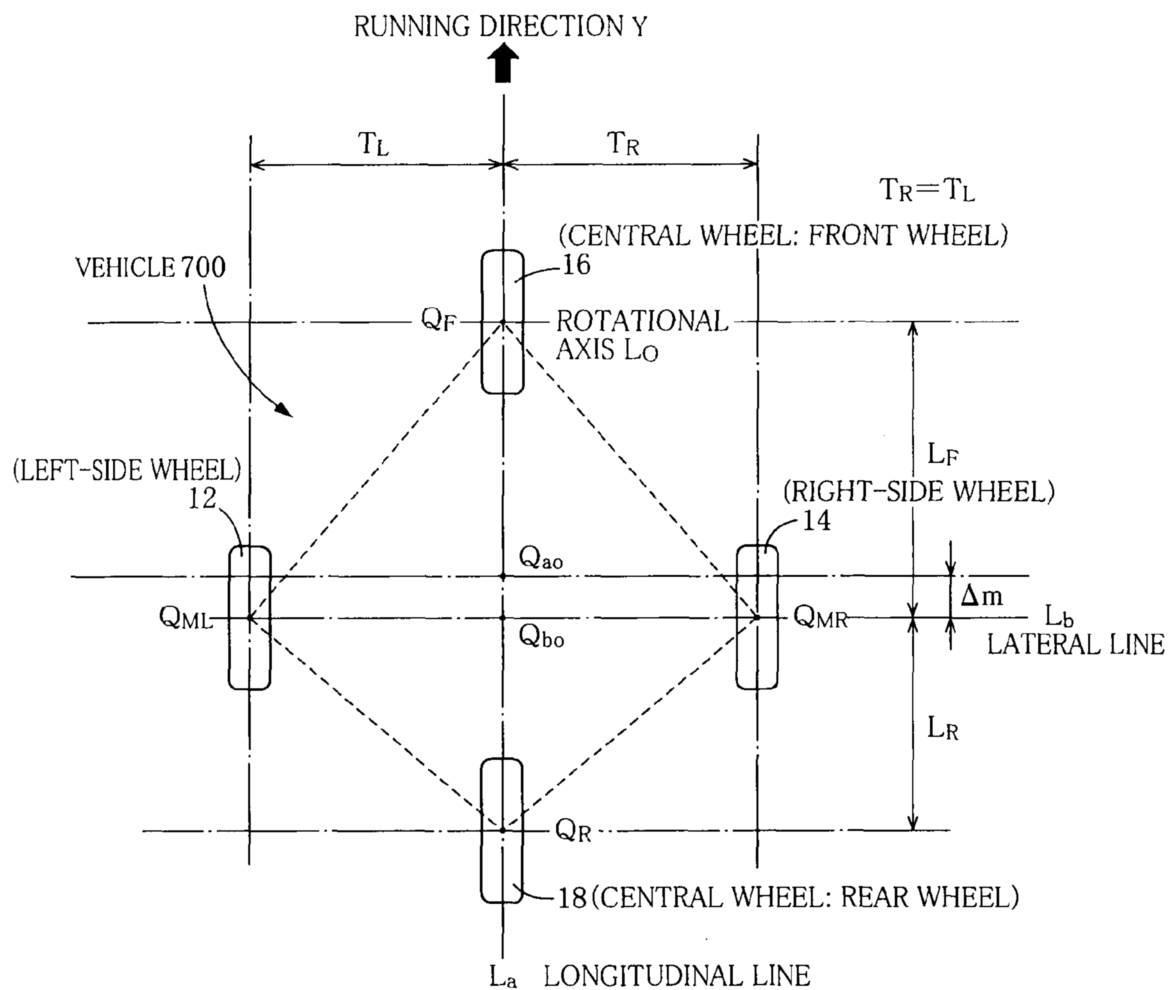
FIG. 16 is a plan view showing an arrangement of wheels in a vehicle on which a brake system according to Embodiment 7 of the present invention is installed.

As shown in FIG. 16, in a vehicle 700, the position defining points $Q_F$, $Q_R$ of the respective front and rear wheels 16, 18 lie on the longitudinal line La which intersects the center Qbo of the lateral line Lb interconnecting the position defining points $Q_{ML}$, $Q_{MR}$ of the respective left-side and right-side wheels 12, 14 and which is perpendicular to the lateral line Lb. However, the front-wheel side distance $L_F$ is larger than the rear-wheel side distance $L_R$. That is, the left-side and right-side wheels 12, 14 are located on a rear side of the center Qao of the longitudinal line La, and are distant from the center Qao by a distance Δm in the longitudinal direction.

Figure 17:
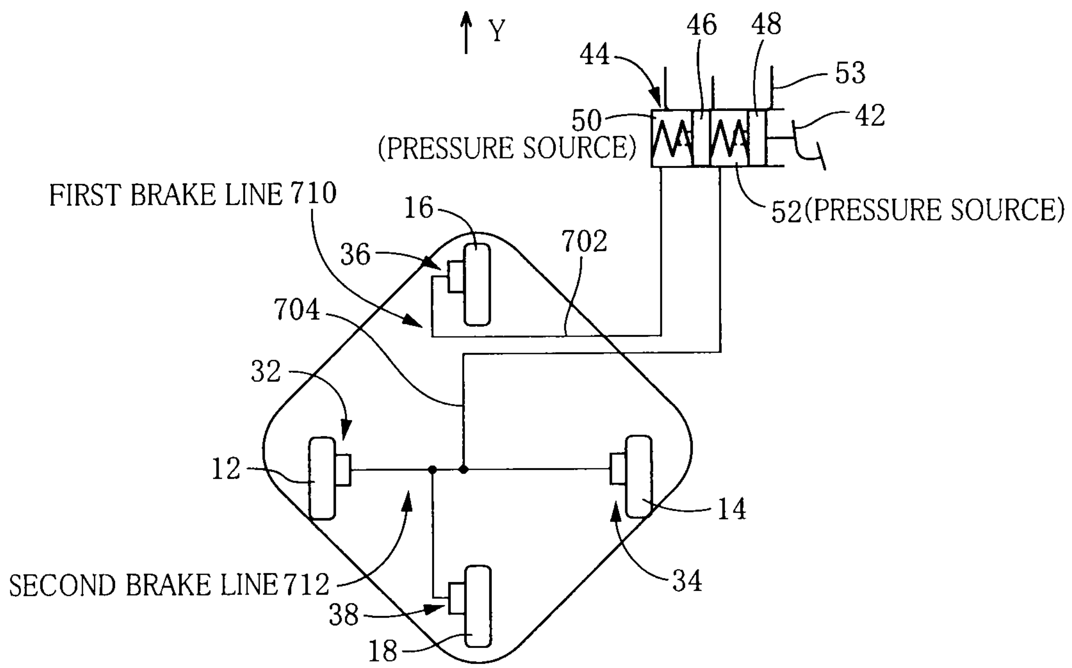
FIG. 17 is a view conceptually showing an entirety of the above-described brake system.

On the vehicle 700, a brake system shown in FIG. 17 is installed.

In the brake system according to Embodiment 7, the hydraulic brakes 32-38 are provided for the respective left-side wheel 12, right-side wheel 14, front wheel 16 and rear wheel 18. To the pressurizing chamber 50 as one of the two pressuring chambers of the master cylinder 44, the brake cylinder 54 provided for the front wheel 16 is connected via a fluid passage 702. Meanwhile, to the pressurizing chamber 52 as the other of the two pressuring chambers of the master cylinder 44, the brake cylinders 54 provided for the respective left-side, right-side and rear wheels 12, 14, 18 are connected via a fluid passage 704.

Figure 18:
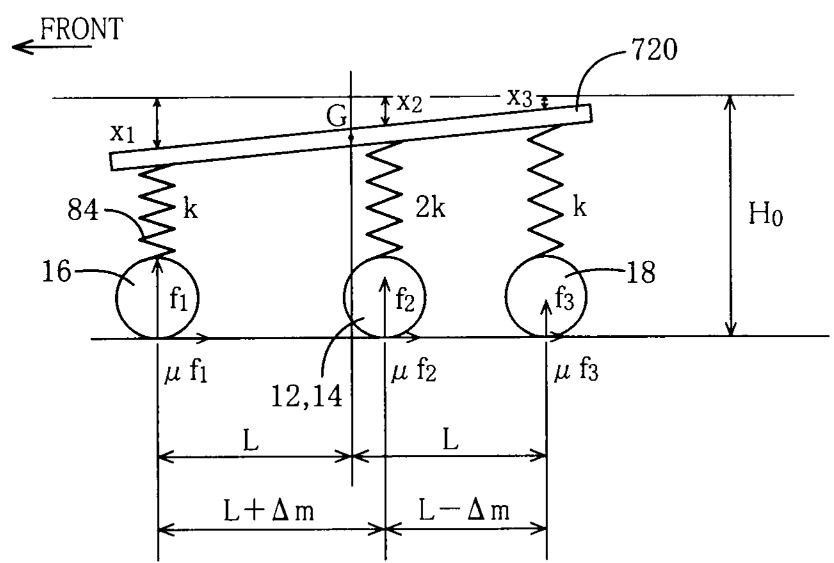
FIG. 18 is a view schematically showing a state of suspensions of the above-described vehicle upon braking of the vehicle.

A first brake line 710 is constituted by elements such as the pressurizing chamber 50 and the brake cylinder 54 provided for the front wheel 16, while a second brake line 712 is constituted by elements such as the pressurizing chamber 52 and the brake cylinders 54 provided for the respective left-side wheel 12, right-side wheel 14 and rear wheel 18.

Where it is assumed that the center of gravity G of the vehicle body 720 is located on a front side of the lateral line Lb of the vehicle 700 (namely, located at the center Qao), as shown in FIG. 18, the below expression is established among compressive amounts of the respective suspension springs 84 provided for the respective wheels, since the vehicle body 720 is a rigid body.

$$(x_2-x_1)/(L+\Delta m)=(x_3-x_2)/(L-\Delta m)$$

From the above expression, it is possible to obtain an expression as follows:

$$2\cdot x_2=(x_1+x_3)+(x_3\cdot x_1)\cdot\Delta m/L$$

Further, where the spring constants of the respective suspension springs 84 are equal to one another as in the above-described Embodiment 1, there is established an expression as follows:

$$f_2=(f_1+f_3)+(f_3-f_1)\cdot\Delta m/L \tag{10}$$

Further, in view of a moment balance about the center of gravity G, there is established an expression as follows:

$$f_1=f_3+f_2\cdot\Delta m/L \tag{11}$$

In the above expression (11), since all of the road holding forces $f_1$, $f_2$, $f_3$ and the distances Δm, L are positive value, it can be understood that $f_1$ is larger than $f_3$ ($f_1>f_3$). Then, by substituting this into the above expression (10), it can be understood that $f_2$ is smaller than ($f_1+f_3$) because $(f_3-f_1)\cdot\Delta m/L$ as a second term of a right side of the expression (10) is a negative value.

$$f_1+f_3>f_2 \tag{12}$$

Thus, in the vehicle 700 in which the left-side and right-side wheels 12, 14 are located on the rear side of the center Qao of the longitudinal line La, there is a case where the road holding force $f_1$ given to the wheel 16 is substantially equal to the sum ($f_2+f_3$) of the road holding forces given to the respective wheels 12, 14, 18 ($f_1\cong f_2+f_3$). Further, where the expression ($f_2=f_1+f_3$) is not established, there is a case in which it is preferable to employ the expression ($f_1\cong f_2+f_3$). In view of these facts, the first brake line 710 is constructed to include the brake cylinder 54 provided for the front wheel 16 while the second brake line 712 is constructed to include the brake cylinders 54 provided for the left-side wheel 12, right-side wheel 14 and rear wheel 18. Consequently, the maximum braking force outputtable in the brake line 710 and the maximum braking force outputtable in the brake line 712 can be substantially equal to each other, so that, even if either one of the two brake lines 710, 712 fails, it is possible to output a total braking force whose magnitude corresponds to almost 50% of a magnitude of that in case of normality of both of the two brake lines 710, 712, without causing a yaw moment to be generated.

In the brake system according to Embodiment 7, any one of the road-holding-force share changing devices of Embodiments 1-5 can be employed. For example, in the event of failure of the second brake line 712, the road holding forces given to the respective left-side and right-side wheels 12, 14 are controlled to be reduced. In this instance, although the road holding forces given to the respective front and rear wheels 16, 18 are increased, the sum of the road holding forces given to the respective left-side wheel 12, right-side wheel 14 and rear wheel 18 is made smaller than before the control, while the road holding force given to the front wheel 16 is made larger than before the control, so that an activation of the first brake line 710 makes it possible to output a total braking force whose magnitude corresponds to 50% or more of a magnitude of that in case of normality of both of the first and second brake lines 710, 712.

In the event of failure of the first brake line 710, the road holding force given to the front wheel 16 is controlled to be reduced. In this instance, although the road holding force given to the rear wheel 18 is reduced, the road holding forces given to the respective left-side and right-side wheels 12, 14 are increased whereby the sum ($f_2$+$f_3$) of the road holding forces given to the respective wheels 12, 14, 18 corresponding to the second brake line 712 is made larger than before the control, so that an activation of the second brake line 712 makes it possible to output a total braking force whose magnitude corresponds to 50% or more of a magnitude of that in case of normality of both of the first and second brake lines 710, 712. On the other hand, the road holding force given to the front wheel 16 is not reduced in the event of failure of the first brake line 710, in case of a vehicle where the reduction of the road holding force given to the front wheel 16, which causes reduction of the road holding force given to the rear wheel 18, makes the sum ($f_2$+$f_3$) of the road holding forces given to the respective wheels 12, 14, 18 smaller than before the control.

Embodiment 8

Figure 19:
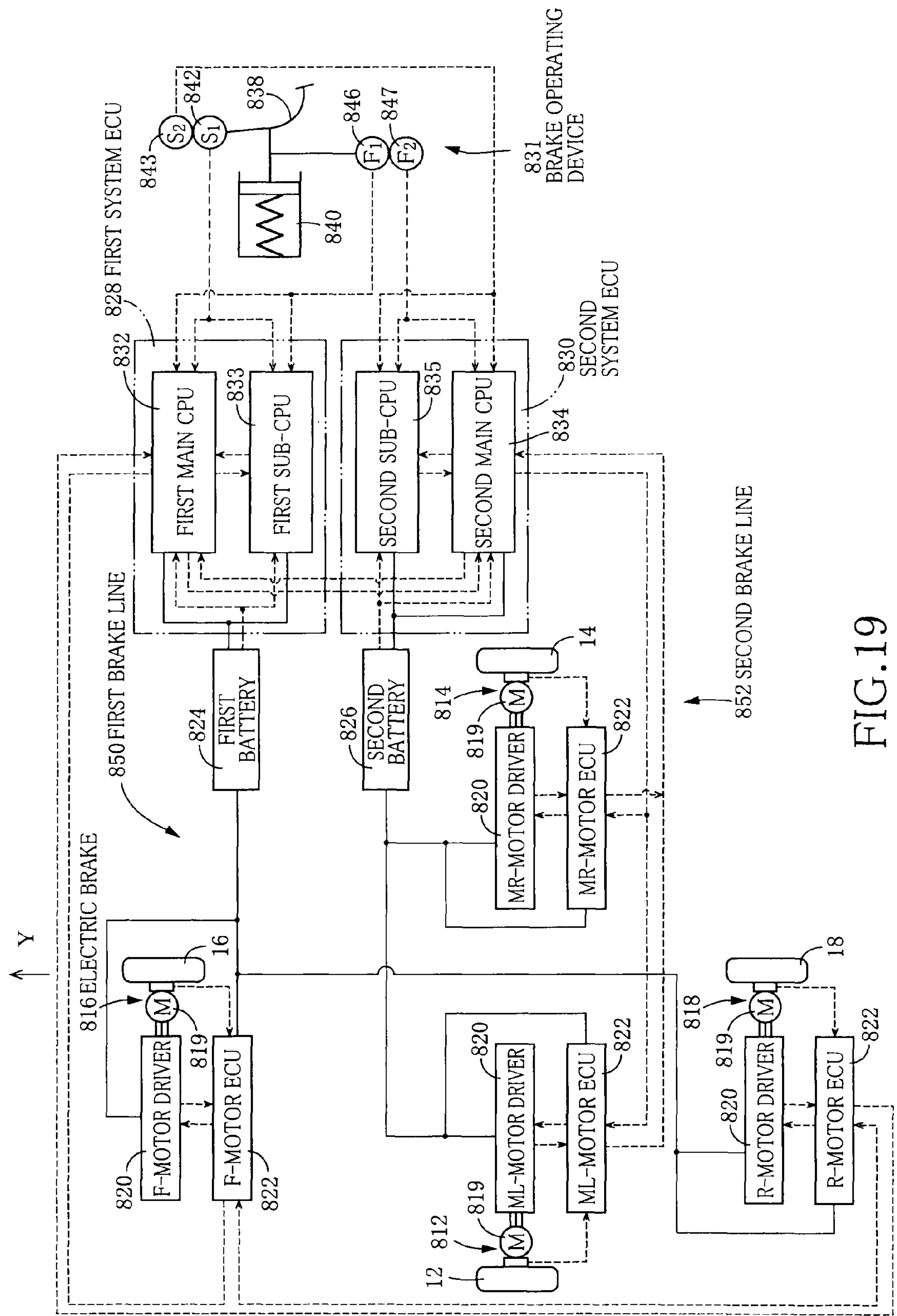
FIG. 19 is a view conceptually showing an entirety of a brake system according to Embodiment 8 of the present invention.

The present invention is applicable to the brake system having electric brakes 812, 814, 816, 818 provided for the respective left-side wheel 12, right-side wheel 14, front wheel 16 and rear wheel 18. An example of such a case is shown in FIG. 19. Each of the electric brakes 812, 814, 816, 818 serves as a service brake.

[Regarding Entirety of Brake System]

Each of the electric brakes 812-818 includes an electric motor 819 as a brake actuator, which is to be activated to cause a friction member (not shown) to be pressed against a rotatable body, for thereby restraining rotation of the wheel.

The electric brakes 812-818 are provided with respective motor drivers 820 and respective motor ECUs 822. In FIG. 19, each of the motor drivers 820 and motor ECUs 822 is described with a corresponding one of characters (F, R, MR, ML) indicative of position of the wheel for which the motor driver 820 or motor ECU 822 is provided. In the following description, each of the motor drivers 820 and motor ECUs 822 will be referred together with the corresponding character, where it should be clarified which one of the four wheels the referred motor driver 820 or motor ECU 822 corresponds to.

The brake system includes first and second batteries (two batteries) 824, 826 as electric power sources, first and second system ECUs (two system ECUs) 828, 830 and a brake operating device 831.

The first system ECU 828 includes two CPUs in the form of a first main CPU 832 and a first sub-CPU 833, while the second system ECU 830 includes two CPUs in the form of a second main CPU 834 and a second sub-CPU 835.

The brake operating device 831 includes a brake pedal 838 as the brake operating member and a stroke simulator 840 that is to be activated together with operation of the brake pedal 838. A stroke distance of the brake pedal 838 is detected by first and second stroke sensors (two stroke sensors) 842, 843, and a depressing force applied to the brake pedal 838 is detected by first and second depressing-force sensors (two depressing-force sensors) 846, 847.

[Regarding Brake Lines]

i) Energy System

The first battery 824 is connected to the first system ECU 828 (that is constituted by the first main CPU 832 and the first sub-CPU 833), the electric motors 819, the F-motor driver 820, the R-motor driver 820, the F-motor ECU 822, the R-motor ECU 822, the first stroke sensor 842 and the first depressing-force sensor 846, which are provided for the front and rear wheels 16, 18, so that the electric brakes 816, 818 provided for the front and rear wheels 16, 18 are activated by an electric power supplied from the first battery 824. Meanwhile, the second battery 826 is connected to the second system ECU 830 (that is constituted by the second main CPU 834 and the second sub-CPU 835), the electric motors 819, the ML-motor driver 820, the MR-motor driver 820, the ML-motor ECU 822, the MR-motor ECU 822, the second stroke sensor 843 and the second depressing-force sensor 847, which are provided for the left-side and right-side wheels 12, 14, so that the electric brakes 812, 814 provided for the left-side and right-side wheels 12, 14 are activated by an electric power supplied from the second battery 826.

Regarding the energy system, therefore, a first brake line 850 is constituted by elements such as the first system ECU 828; the electric motors 819, the F-motor driver 820, the R-motor driver 820, the F-motor ECU 822, the R-motor ECU 822 provided for the front and rear wheels 16, 18; the first stroke sensor 842, the first depressing-force sensor 846 and the first battery 824, while a second brake line 852 is constituted by elements such as the second system ECU 830; the electric motors 819, the ML-motor driver 820, the MR-motor driver 820, the ML-motor ECU 822, the MR-motor ECU 822 provided for the left-side and right-side wheels 12, 14; the second stroke sensor 843, the second depressing-force sensor 847 and the second battery 826.

ii) Control System & Sensor System

To both of the first main CPU 832 and first sub-CPU 833 of the first system ECU 828, there are connected the above-described first stroke sensor 842 and first depressing-force sensor 846, so that a target pressing force (target friction-member pressing force) as a control command value is determined based on the stroke distance of the brake pedal 838 and the depressing force applied to the brake pedal 838, in each one of the first main CPU 832 and first sub-CPU 833. The control command value determined in the first main CPU 832 and the control command value determined in the first sub-CPU 833 are compared with each other, and it can be regarded that the first system ECU 828 functions normally as long as an absolute value of a difference between the control command values is smaller than a given value (failure-judgment threshold value). In this case of normality of the first system ECU 828, the control command value determined in the first main CPU 832 is supplied to the F-motor ECU 822 and the R-motor ECU 822. The F-motor ECU 822 and the R-motor ECU 822 control an electric current supplied to the electric motors 819 such that the actual pressing force generated by each of the electric motors 819 becomes close to the target pressing force. It is noted that the comparison between the control command values can be made, for example, in the first main CPU 832.

Like in the first system ECU 828, in the second system ECU 830, the target pressing force as the control command value is determined based on the stroke distance of the brake pedal 838 and the depressing force applied to the brake pedal 838 in each one of the second main CPU 834 and second sub-CPU 835. As long as an absolute value of a difference between the control command values determined in the respective second main CPU 834 and second sub-CPU 835 is smaller than a failure-judgment threshold value, the control command value is supplied to the ML-motor ECU 822 and the MR-motor ECU 822. The ML-motor ECU 822 and the MR-motor ECU 822 control an electric current supplied to the electric motors 819 such that the actual pressing force generated by each of the electric motors 819 becomes close to the target pressing force.

Thus, in Embodiment 8, not only the energy system but also each of the control system and the sensor system is constituted by two brake lines 850, 852.

[Failure Detection]

a) Abnormality of System ECU

As described above, when the absolute value of the difference between the control command value determined in the first main CPU 832 and the control command value determined in the first sub-CPU 833 is not smaller than the failure-judgment threshold value, it is judged that the first system ECU 828 is abnormal and it is regarded that the first brake line 850 fails. In this case, the control command value is not outputted. It is noted that, in this case, there is also a possibility that the stroke sensor 842 or depressing-force sensor 846 is abnormal.

Similarly, when the absolute value of the difference between the control command value determined in the second main CPU 834 and the control command value determined in the second sub-CPU 835 is not smaller than the failure-judgment threshold value, it is judged that the second system ECU 830 is abnormal and it is regarded that the second brake line 852 fails.

When it is judged that the first brake line 850 fails, a data representative of the failure is supplied from the first system ECU 828 to the second system ECU 830. When it is judged that the second brake line 852 fails, a data representative of the failure is supplied to the first system ECU 829.

b) Abnormality of Electric Brake

To the motor ECU 822 provided for each wheel, a data representative of the electric current actually flowing to the motor driver 820 and the pressing force actually generated by the electric motor 819 (i.e., the friction-member pressing force in the electric brake), is supplied. The data representative of the actual electric current and the actual pressing force is supplied to the system ECU, and it is detected, based on the supplied data, whether or not there is an abnormality in elements such as the electric brakes 812-818 (i.e., abnormality disabling normal activation of the electric brakes 812-818).

The data obtained in each of the F-motor ECU 822 and R-motor ECU 822 is supplied to the first main CPU 832 (of the first system ECU 828), so that the first main CPU 832 judges whether or not the actual pressing force is smaller than the failure-judgment threshold value that is determined depending on the control command value, and judges whether or not the actual electric current is smaller than the failure-judgment threshold value that is neighborhood of zero. When the actual pressing force is smaller than the failure-judgment threshold value, it is regarded that the electric motor 819 is abnormal. When the actual electric current is smaller than the failure-judgment threshold value, it is regarded that the motor driver 820 or the electric motor 819 is abnormal (due to a wire breakage, for example).

Similarly, in the second system ECU 830, it is detected whether or not there is an abnormality in elements such as the electric brakes 812, 814 and the ML-motor and MR-motor drivers 820 provided for the left-side and right-side wheels 12, 14.

In the first system ECU 828, when it is judged that at least one of the elements (such as the electric brake 816) provided for the front wheel 16 is abnormal and that at least one of the elements (such as the electric brake 818) provided for the rear wheel 18 is abnormal, it is regarded that the first brake line 850 fails. However, when it is judged that at least one of the elements provided for the front wheel 16 is abnormal and that none of the elements provided for the rear wheel 18 is abnormal, or when it is judged that none of the elements provided for the front wheel 16 is abnormal and that at least one of the elements provided for the rear wheel 18 is abnormal, it is not regarded that the first brake line 850 fails. This is because a yaw moment is not generated by activation of either one of the electric brakes 816, 818 provided for the respective front and rear wheels 16, 18.

On the other hand, in the second system ECU 830, when it is judged that at least one of the elements (such as the electric brake 812) provided for the left-side wheel 12 is abnormal and/or that at least one of the elements (such as the electric brake 814) provided for the right-side wheel 14 is abnormal, it is regarded that the second brake line 852 fails.

c) Abnormality of Battery

A data representative of a power source voltage of the first battery 824 is supplied to the first system ECU 828, so that it is judged whether the power source voltage is equal to or lower than a failure-judgment threshold value (i.e., a voltage value considered to be insufficient for supply of the electric power) in each one of the first main CPU 832 and first sub-CPU 833. When it is judged that the power source voltage is not higher than the failure-judgment threshold value in at least one of the first main CPU 832 and first sub-CPU 833, it is judged that the first battery 824 has an abnormality disabling supply of the electric power and that the first brake line 850 fails.

Meanwhile, a data representative of a power source voltage of the second battery 826 is supplied to the second system ECU 830, so that it is judged whether or not the second battery 826 has an abnormality. This judgment is made in the same manner as in the first system ECU 828.

As described above, in Embodiment 8, each of the control system (which can be referred also to as information supply system and which is constituted by elements such as CPU, ECU and signal wires), the sensor system (which can be referred also to as operating state detection system and which is constituted by elements such as sensors and signal wires) and the energy system (which can be referred also to as electric power source system and which is constituted by elements such as batteries, drivers and electric power wires) is constituted by two lines that are independent from each other. Therefore, even if at least one of the control system, sensor system and energy supply system of either one of the first and second brake lines 850, 852 fails, the electric brake can be activated by a corresponding one or ones of the control system, sensor system and energy supply system of the other of the first and second brake lines 850, 852.

[Road-Holding-Force Share Changing Device]

Figure 20:
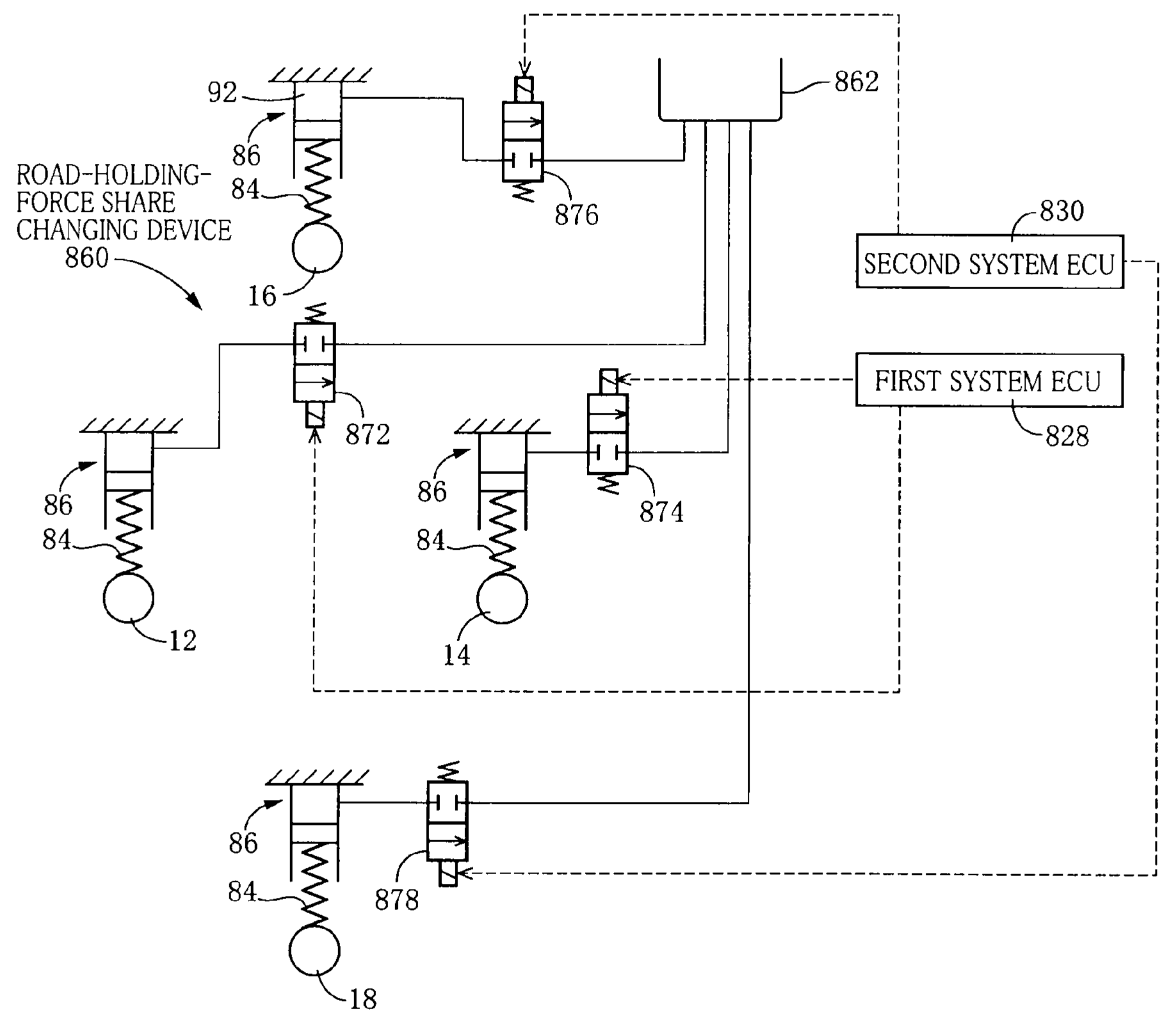
FIG. 20 is a view schematically showing a vehicle on which the brake system according to Embodiment 8 is installed.

In Embodiment 8, there is provided a road-holding-force share changing device 860 as shown in FIG. 20. The road-holding-force share changing device 860 includes electromagnetic valves 872, 874, 876, 878 each of which is disposed between the reservoir 862 and the single-acting cylinder 86 that is provided for a corresponding one of the wheels 12, 14, 16, 18. Among the electromagnetic valves 872-878 each of which is a normally closed valve, the electromagnetic valves 872, 874 have respective solenoids connected to the first system ECU 828 via respective drive circuits (not shown), and the electromagnetic valves 876, 878 have respective solenoids connected to the second system ECU 830 via respective drive circuits (not shown).

The electromagnetic valves 876, 878, which are provided for the respective single-acting cylinders 86 of the wheels 16, 18 corresponding to the first brake line 850, are controlled based on commands supplied from the second system ECU 830 that constitutes a part of the second brake line 852. Meanwhile, the electromagnetic valves 872, 874, which are provided for the respective single-acting cylinders 86 of the wheels 12, 14 corresponding to the second brake line 852, are controlled based on commands supplied from the first system ECU 828 that constitutes a part of the first brake line 850. In the event of abnormality of the first system ECU 828 which is regarded as failure of the first brake line 850, there is a possibility that any command cannot be outputted from the first system ECU 828 to the electromagnetic valves 876, 878. In view of such a possibility, in this Embodiment 8, commands that are to be supplied to the electromagnetic valves 876, 878 are outputted from the second system ECU 830.

When failure of the first brake line 850 is detected, the second system ECU 830 outputs commands for placing the electromagnetic valves 876, 878 into the open states. In response to the commands, the valves 876, 878 are placed into the open states, whereby the single-acting cylinders 86 provided for the respective front and rear wheels 16, 18 are brought into communication with the reservoir 862. As a result of communication of the single-acting cylinders 86 of the respective front and rear wheels 16, 18 with the reservoir 862, the road holding forces given to the respective front and rear wheels 16, 18 are reduced while the road holding forces given to the respective left-side and right-side wheels 12, 14 are increased.

Thus, in the brake system according to Embodiment 8, too, even in the event of failure of either one of the two brake lines, it is possible to output a total braking force whose magnitude corresponds to at least ½ of a magnitude of that in case of normality of both of the two brake lines.

Embodiment 9

Figure 21:
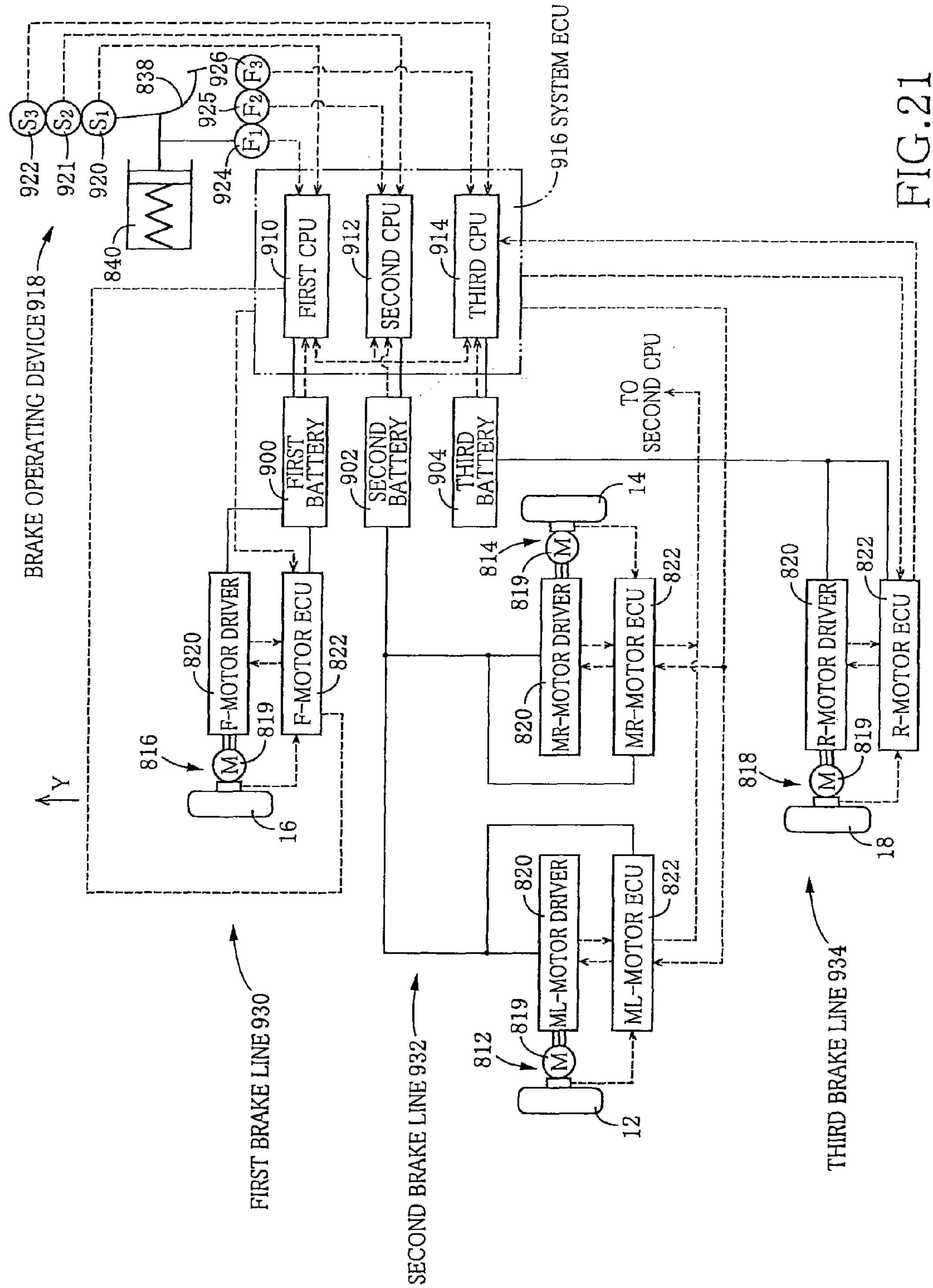
FIG. 21 is a view conceptually showing an entirety of a brake system according to Embodiment 9 of the present invention.

The brake system according to Embodiment 9 includes three brake lines, as shown in FIG. 21, by way of example. Since the electric brake and other elements provided for each wheel are identical with those in the brake system according to Embodiment 8, the same reference signs as used in Embodiment 8 will be used to identify the corresponding elements, and description thereof will not be provided.

The brake system includes first, second third batteries (three batteries) 900, 902, 904 as electric power sources, a system ECU 916 having three CPUs 910, 912, 914, and a brake operating device 918. To the first battery 900, there are connected the first CPU 910 and also the F-motor ECU 822 and the F-motor driver 820 of the front wheel 16. To the second battery 902, there are connected the second CPU 912 and also the ML and MR-motor ECUs 822 and the ML and MR-motor drivers 820 of the respective left-side and right-side wheels 12, 14. To the third battery 904, there are connected the third CPU 914 and also the R-motor ECU 822 and the R-motor driver 820 of the rear wheel 18.

Further, in the brake operating device 918, there are provided first, second and third stroke sensors (three stroke sensors) 920, 921, 922 configured to detect a stroke distance of the brake pedal 838, and also first, second and third depressing-force sensors (three depressing-force sensors) 924, 925, 926 configured to detect a depressing force applied to the brake pedal 838. The first stroke sensor 920 and the first depressing-force sensor 924 are connected to the first CPU 910. The second stroke sensor 921 and the second depressing-force sensor 925 are connected to the second CPU 912. The third stroke sensor 922 and the third depressing-force sensor 926 are connected to the third CPU 914. The target pressing forces as the control command values are determined in the respective three CPUs 910, 912, 914, and these control command values are compared with one another through communication among the three CPUs 910, 912, 914, and one of the control command values is determined as a definitive target pressing force through a decision by a majority. This determination may be made, for example, in the first CPU 910. Then, a data representative of the definitive target pressing force is supplied to all of the F, R, ML and MR-motor ECUs 822 that are provided for the respective wheels 12-18.

Thus, in the present embodiment, the system ECU 916 includes the three CPUs 910, 912, 914, and the single definitive target pressing force (target friction-member pressing force) is determined through a decision by a majority, so that, even if one of the three CPUs 910, 912, 914 has an abnormality, all of the electric brakes can be activated. Thus, the control system is not constituted by three lines independent from one another.

In Embodiment 9, the first brake line 930 is constituted by elements such as the first battery 900, the first CPU 910, and the F-motor ECU 822, the F-motor driver 820 and the electric motor 819 of the front wheel 16; the second brake line 932 is constituted by elements such as the second battery 902, the second CPU 912, and the ML and MR-motor ECUs 822, the ML and MR-motor drivers 820 and the electric motors 819 of the left-side and right-side wheels 12, 14; and the third brake line 934 is constituted by elements such as the third battery 904, the third CPU 914, and the R-motor ECU 822, the R-motor driver 820 and the electric motor 819 of the rear wheel 18.

Like in Embodiment 8, in each of the three CPUs 910, 912, 914, it is judged whether the power source voltage of a corresponding one of the three batteries 900, 902, 904 is equal to or lower than a failure-judgment threshold value, and it is regarded that the corresponding battery is abnormal when the power source voltage is not higher than the failure-judgment threshold value. When it is regarded that the battery is abnormal, it is judged that the brake line, which is partially constituted by the abnormal battery, fails.

Further, in each of the three CPUs 910, 912, 914, it is judged whether or not the corresponding electric brake has an abnormality disabling normal activation thereof, based on the pressing force of the corresponding electric motor 819 and the actual electric current value of the corresponding motor driver 820.

Further, the brake system according to Embodiment 9 may be provided with the road-holding-force share changing device 860 that is shown in FIG. 20. In this case, the electromagnetic valves 872-878 can be controlled based on commands supplied from the system ECU 916.

As described above, in Embodiment 9, the brake system is constructed to include three brake lines. Therefore, even if any one of the three brake lines fails, it is possible to output a total braking force whose magnitude corresponds to 50% or more of a magnitude of that in case of normality of all of the three brake lines, thereby further improving the reliability.

Embodiment 10

The brake system according to Embodiment 10 includes a brake line having a hydraulic brake and a brake line having an electric brake. In the following description regarding the brake system according to Embodiment 10, the same reference signs as used in the brake systems shown in FIGS. 3 and 19 (Embodiments 1 and 8) will be used to identify the corresponding elements, and description thereof will not be provided.

Figure 22:
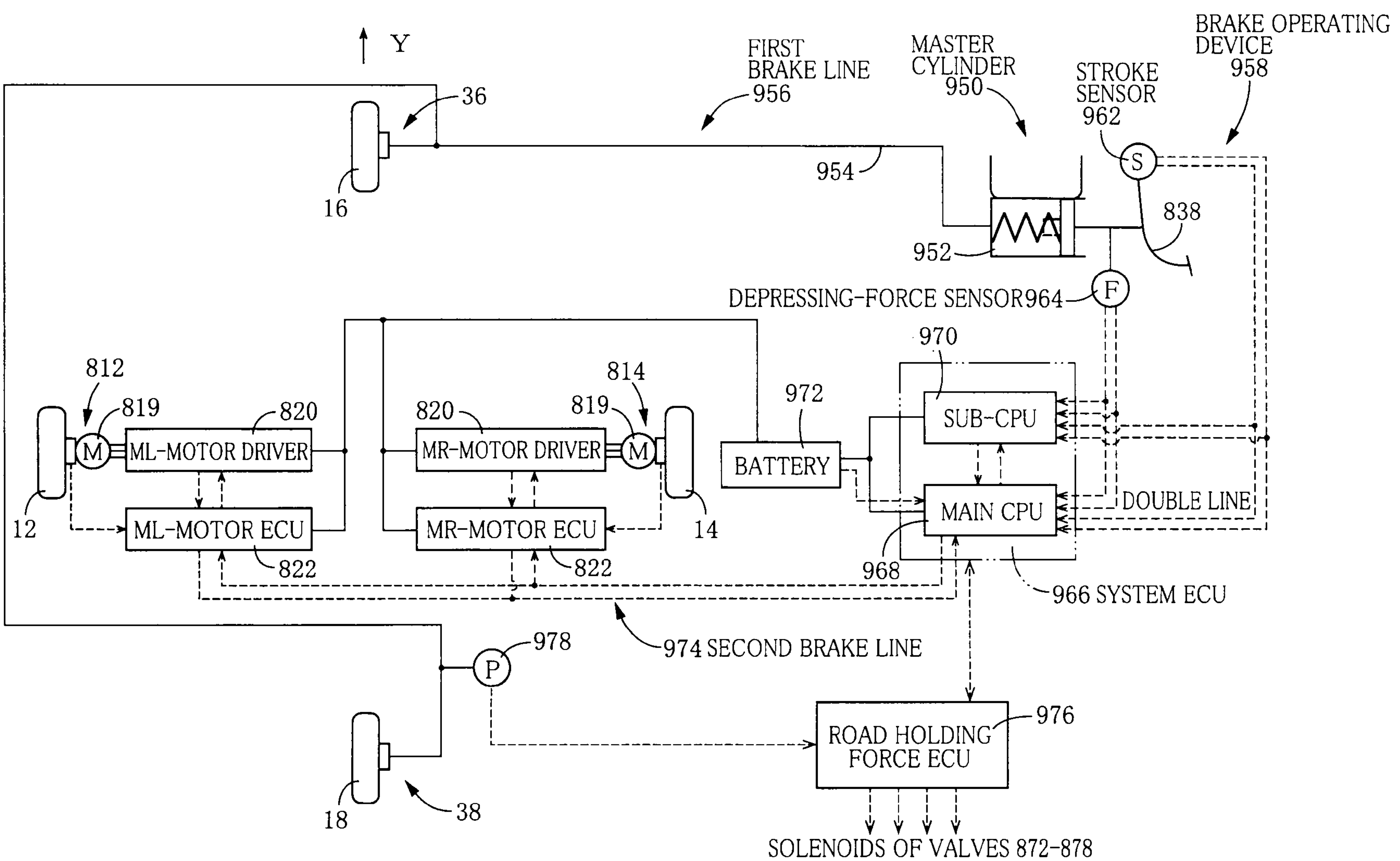
FIG. 22 is a view conceptually showing an entirety of a brake system according to Embodiment 10 of the present invention.

As shown in FIG. 22, the front and rear wheels 16, 18 are provided with the respective hydraulic brakes 36, 38 while the left-side and right-side wheels 12, 14 are provided with the respective electric brakes 812, 814.

A master cylinder 950 has a pressurizing chamber 952, and is configured to generate a hydraulic pressure by an operation applied to the brake pedal 42. To the pressurizing chamber 952, the brake cylinders 54 provided for the front and rear wheels 16, 18 are connected via a fluid passage 954. In the present embodiment, a first brake line 956 is constituted by elements such as the pressurizing chamber 952 (master cylinder 950) and the brake cylinders 54 provided for the front and rear wheels 16, 18.

In a brake operating device 958, an operating stroke distance of the brake pedal 838 is detected by a stroke sensor 962, and a depressing force applied to the brake pedal 838 is detected by a depressing-force sensor 964. Further, a system ECU 966 includes two CPUs in the form of a main CPU 968 and a sub-CPU 970. To the main CPU 968, the stroke sensor 962 is connected via two signal wires. To the sub-CPU 970, the depressing-force sensor 964 is connected via two signal wires.

Further, a battery 972 is connected to the two CPUs 968, 970, and the motor drivers 820 and the motor ECUs 822 of the respective left-side and right-side wheels 12, 14. In the present embodiment, a second brake line 974 is constituted by elements such as the battery 972, system ECU 966, ML and MR-motor drivers 820, ML and MR-motor ECUs 822, ML and MR electric motors 819, stroke sensor 962 and depressing-force sensor 964.

To the main CPU 968, two signals representative of the stroke distance are supplied. To the sub-CPU 970, two signal representative of the depressing force are supplied. In each of the main CPU 968 and the sub-CPU 970, the two values represented by the respective two signals are compared with each other. When an absolute value of a difference between the two values is not smaller than a failure-judgment threshold value, it is judged that the corresponding sensor has an abnormality. In this case, too, it is judged that the second brake line 974 fails.

Further, control command values representative of target pressing forces are determined in the respective main CPU 968 and sub-CPU 970, and the control command values are compared with each other. When an absolute value of a difference between the compared values is not smaller than a failure-judgment threshold value, it is regarded that the system control ECU 966 is abnormal and it is judged that the second brake line 974 fails.

Further, like in Embodiment 8, when the voltage of the battery 972 is not higher than a failure-judgment threshold value, it is judged that each of the electric brakes 812, 814 has an abnormality disabling normal activation thereof and it is regarded that the second brake line 974 fails.

In the brake system according to Embodiment 10, the road-holding-force share changing device 860 as shown in FIG. 20 is installed. In this Embodiment 10, the electromagnetic valves 872-878 provided for the respective single-acting cylinders 86 of the respective wheels are controlled based on commands supplied from a road holding force ECU 976 that is constituted mainly by a computer.

To the road holding force ECU 976, there are connected the above-described system ECU 966 and also a hydraulic pressure sensor 978 that is configured to detect a hydraulic pressure in the fluid passage 904. It is detected that the first brake line 954 fails when a value detected by the hydraulic pressure sensor 978 is not higher than a given value that is neighborhood of zero during operation of the brake pedal 838. In the event of detection of failure of the first brake line 954, the road holding force ECU 976 outputs a command for placing the electromagnetic valves 876, 878 (i.e., electromagnetic valves connected to the single-acting cylinders 86 that are provided for the wheels 16, 18 corresponding to the first brake line 956) shown in FIG. 20, into their respective open states. With the electromagnetic valves 876, 878 being placed in the respective open states, the road holding forces given to the respective front and rear wheels 16, 18 are reduced whereby the road holding forces given to the respective left-side and right-side wheels 12, 14 can be increased.

When receiving a failure information representing a failure of the second brake line 974 and supplied from the system ECU 966, the road holding force ECU 976 outputs a command for placing the electromagnetic valves 872, 874 into their respective open states, so that the road holding forces given to the respective left-side and right-side wheels 12, 14 are reduced while the road holding forces given to the respective front and rear wheels 16, 18 are increased.

In the above-described arrangement in which one of the plurality of brake lines includes an actuator of a hydraulic brake while another one of the plurality of brake lines includes an actuator of an electric brake, it is possible to increase a reliability more than in an arrangement in which all to of the plurality of brake lines include actuators of respective electric brakes.

Further, in this Embodiment 10, since each of the signal wires of the sensor system is constituted by a double line, it is possible to further increase a reliability.

Further, the brake system may include three brake lines.

Figure 23:
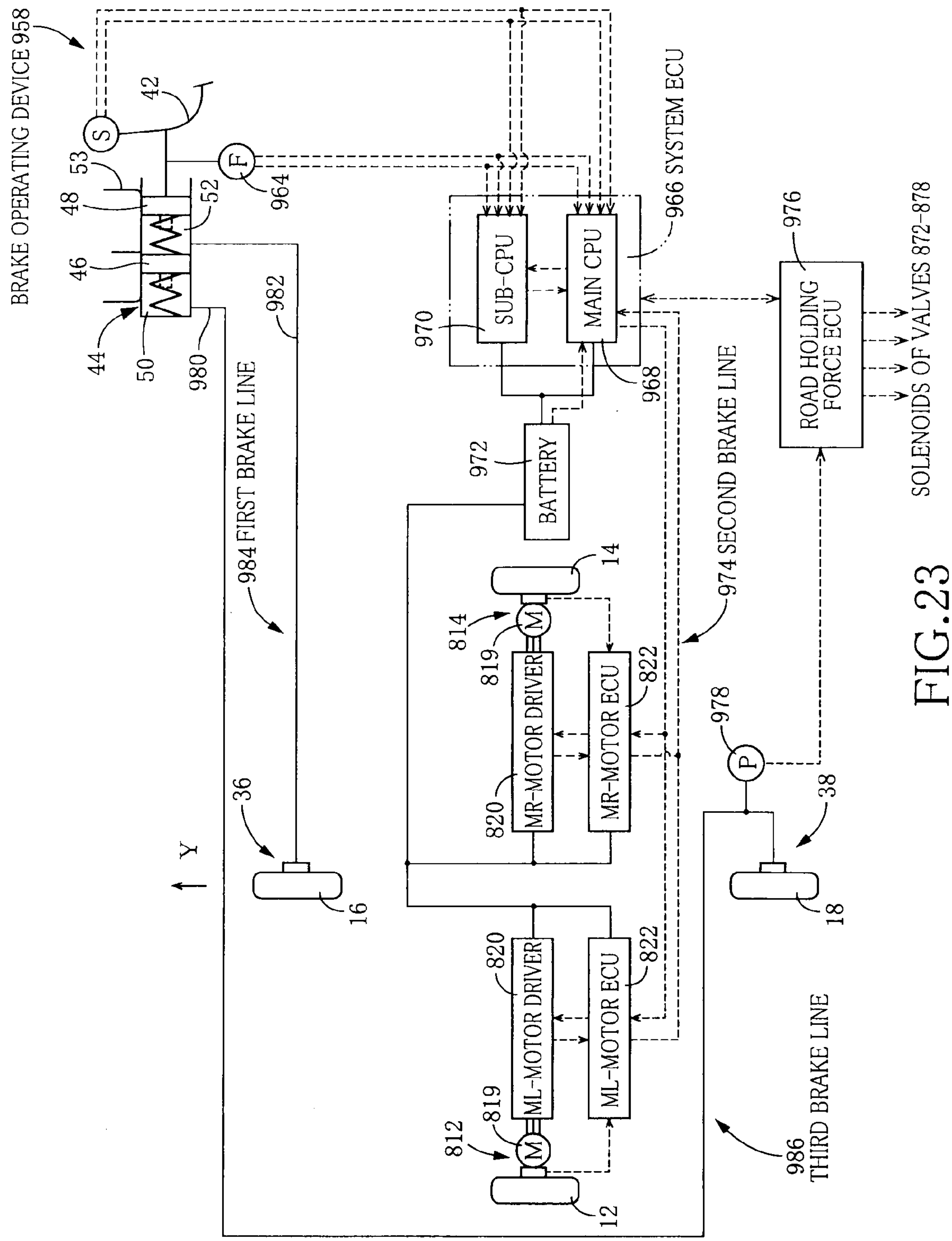
FIG. 23 is a view conceptually showing an entirety of a brake system according to still another embodiment of the present invention.
Figure 24:
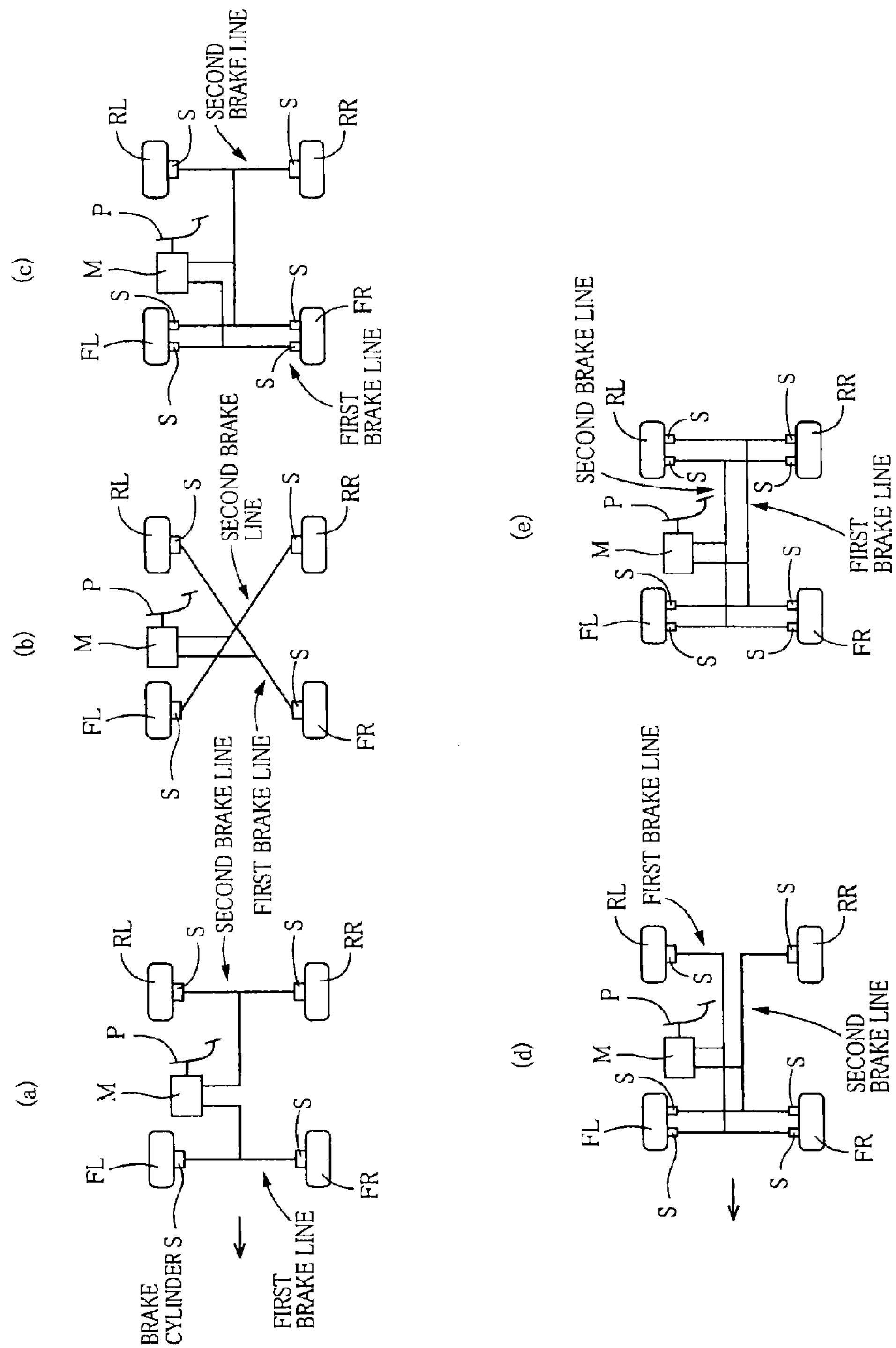
FIG. 24 is a set of views conceptually showing conventional brake systems.

For example, as shown in FIG. 23, the brake cylinders 54 provided for the respective rear and front wheels 18, 16 are connected to the respective pressurizing chambers 50, 52 of the master cylinder 44 of a tandem type, via respective fluid passages 980, 982. In this arrangement, a first brake line 984 is constricted to include the pressurizing chamber 52, fluid passage 980 and the brake cylinder 54 provided for the front wheel 16, and a third brake line 986 is constructed to include the pressurizing chamber 50, fluid passage 982 and the brake cylinder 54 provided for the rear wheel 18.

The above-described plurality of embodiments can be suitably combined to one another, so that the suitable combination thereof is employed.

Further, in each of the above-described embodiments, it is not essential that the road-holding-force share changing device be provided.

Further, the spring constants of the respective suspension springs 84 provided for the respective wheels may be different from one another. In this case, it is possible to increase a degree of freedom in design relating to, for example, shares of the road holding force, which are to be allotted to the respective wheels.

Further, the hydraulic pressure source may be provided by, in place of the master cylinder, a power hydraulic pressure source including a pump device. In this case, the hydraulic pressure in each brake cylinder is controlled by controlling the pump motor and an electromagnetic valve device including a plurality of electromagnetic valves disposed between the power hydraulic pressure source and the brake cylinder.

In each of the above-described embodiments, the brake lines include the actuators of the service brakes. However, in a brake system including parking brakes, the brake lines may be constructed to include the actuators of the parking brakes. Further, in a case where a plurality of service brakes are provided for each wheel, the brake lines may be provided as in the above-described embodiments.

Moreover, the present invention can be carried out with various modifications and improvements that will be made based on knowledge of a person skilled in the art.

DESCRIPTION OF REFERENCE SIGNS

12: left-side wheel 14: right-side wheel 16: front wheel 18: rear wheel 32-36: hydraulic brake 44, 950: master cylinder 50, 52, 952: pressurizing chamber 54: brake cylinder 56: friction member 58: rotatable body 60, 62, 604, 606, 702, 704: fluid passage 70, 72, 610, 612, 710, 712, 956, 984, 986: brake line 84: suspension spring 86: single-acting cylinder 100, 200, 300, 376: road-holding-force share changing device 812-816: electric brake 819: electric motor 820: motor driver 822: motor ECU 824, 826, 900, 902, 904, 972: battery 828, 830, 916, 966: system ECU 831, 918, 958: brake operating device 850, 852, 930, 932, 934, 974: brake line 860: road-holding-force share changing device

The invention claimed is:

1. A brake system that is to be provided in a vehicle including (i) a right-side wheel and a left-side wheel disposed to be spaced apart from each other in a width direction of the vehicle and (ii) a front wheel and a rear wheel disposed to be spaced apart from the right-side and left-side wheels in a longitudinal direction of the vehicle and located between the right-side and left-side wheels in the width direction, said brake system including at least two brake lines independent from each other, said brake system comprising:

brakes provided for the right-side wheel, the left-side wheel, the front wheel and the rear wheel, and configured to restrain rotations of the respective wheels by activations of brake actuators of said brakes; and at least two energy sources independent from each other and configured to supply energy to said brake actuators;

wherein one of said at least two brake lines serves as a first brake line, and includes (a) a first energy source as one of said at least two energy sources and (b) one of said brake actuators provided for the front wheel and activatable by the energy supplied from said first energy source, and wherein one of said at least two brake lines serves as a second brake line that is other than said first brake line, and includes (c) a second energy source as one of said at least two energy sources and (d) three of said brake actuators provided for the respective right-side, left-side and rear wheels and activatable by the energy supplied from said second energy source.

2. The brake system according to claim 1, wherein said brake actuators include respective brake cylinders, wherein said brakes include respective hydraulic brakes each of which is configured to restrain rotation of a corresponding one of the wheels by a corresponding one of said brake cylinders that is to be activated, by a hydraulic pressure, to press a friction member against a rotatable body rotatable together with the corresponding wheel, and wherein said energy sources include respective hydraulic pressure sources each of which is configured to generate the hydraulic pressure as the energy and to supply the generated hydraulic pressure to a corresponding one of said brake cylinder.

3. The brake system according to claim 1, to be provided in the vehicle in which each of the wheels is located in a position defined by a position defining point that corresponds to an intersection point between a rotary axis of the wheel and a plane passing through a center of the wheel in a width direction of the wheel, a distance between the position defining point of the front wheel and a lateral line interconnecting the position defining point of the right-side wheel and the position defining point of the left-side wheel being larger than a distance between the position defining point of the rear wheel and the lateral line, as seen in a plan view of the vehicle.

4. The brake system according to claim 1, to be provided in the vehicle further including suspension springs provided for the right-side wheel, the left-side wheel, the front wheel and the rear wheel such that each of the suspension springs is disposed between a body of the vehicle and a corresponding one of wheel-side members holding the respective wheels, the suspension springs having respective spring constants that are equal to one another.

5. The brake system according to claim 1, comprising a road-holding-force share changing device configured, in event of failure of either one of said first and second brake lines, to reduce a sum of a road holding force or forces given to at least one of the wheels which corresponds to one of said first and second brake lines that fails, and to increase a sum of a road holding force or forces given to another at least one of the wheels which corresponds to the other of said first and second brake lines that does not fail.

6. The brake system according to claim 5, to be provided in the vehicle including at least one single-acting cylinder and at least one suspension spring provided for each of at least one of the right-side wheel, left-side wheel, front wheel and rear wheel such that the single-acting cylinder and the suspension spring are disposed in series between a body of the vehicle and a corresponding one of wheel-side members holding the respective wheels, wherein said road-holding-force share changing device includes a hydraulic-pressure controlling portion configured, in event of failure of either one of said first and second brake lines, to control a hydraulic pressure in at least one of the at least one single-acting cylinder, so as to reduce a sum of the road holding force or forces given to at least one of the wheels whose rotation is to be restrained by one of said first and second brake lines that fails, and so as to increase a sum of the road holding force or forces given to another at least one of the wheels whose rotation is to be retrained by the other of said first and second brake lines that does not fail.

7. The brake system according to claim 6, wherein said brake actuators include respective brake cylinders, wherein said brakes include respective hydraulic brakes each of which is configured to restrain rotation of a corresponding one of the wheels, by a corresponding one of said brake cylinders that is to be activated, by a hydraulic pressure, to press a friction member against a rotatable body rotatable together with the corresponding wheel, wherein said at least one single-acting cylinder consists of a plurality of single-acting cylinders provided for the front wheel whose rotation is to restrained by said first brake line and at least one of the right-side, left-side and rear wheels whose rotations are to be restrained by said second brake line, and wherein said road-holding-force share changing device includes:

a differential mechanism including (a) two hydraulic chambers that are connected to said respective first and second brake lines and (b) a movable member that is movable by a difference between the hydraulic pressure in one of said two hydraulic chambers and the hydraulic pressure in the other of said two hydraulic chambers; and at least one of (c) a pressure-reducing mechanism configured to reduce, by activation of said differential mechanism, the hydraulic pressure in at least one of the at least one single-acting cylinder provided for at least one of the wheels whose rotation is to be restrained by one of said first and second brake lines that fails, and (d) a pressure-increasing mechanism configured to increase, by activation of said differential mechanism, the hydraulic pressure in another at least one of the at least one single-acting cylinder provided for another at least one of the wheels whose rotation is to be restrained by the other of said first and second brake lines that does not fail.

8. The brake system according to claim 1, to be provided in the vehicle in which a road holding force given to the front wheel is substantially equal to a sum of road holding forces given to the respective right-side, left-side and rear wheels.

9. The brake system according to claim 1, wherein each of said brakes provided for the respective right-side, left-side, front and rear wheels is a service brake.

* * * * *